(12) United States Patent
Hambardzumyan et al.

(10) Patent No.: US 10,857,923 B2
(45) Date of Patent: Dec. 8, 2020

(54) LOCKING ARM SYSTEM FOR A RETENTION RAMP OF A LIFT GATE

(71) Applicant: MAXON INDUSTRIES, INC., Santa Fe Springs, CA (US)

(72) Inventors: Levon Hambardzumyan, Glendale, CA (US); Karapet Ablabutyan, Glendale, CA (US)

(73) Assignee: MAXON INDUSTRIES, INC., Santa Fe Springs, CA (US)

(*) Notice: Subject to any disclaimer, the term of this patent is extended or adjusted under 35 U.S.C. 154(b) by 49 days.

(21) Appl. No.: 16/271,494

(22) Filed: Feb. 8, 2019

(65) Prior Publication Data

US 2019/0168655 A1 Jun. 6, 2019

Related U.S. Application Data

(63) Continuation-in-part of application No. 15/097,132, filed on Apr. 12, 2016, now Pat. No. 10,239,435, which is a continuation of application No. 13/689,582, filed on Nov. 29, 2012, now Pat. No. 9,341,212.

(60) Provisional application No. 61/565,454, filed on Nov. 30, 2011.

(51) Int. Cl.
*B60P 1/44* (2006.01)
*F16C 11/10* (2006.01)

(52) U.S. Cl.
CPC ........... *B60P 1/4457* (2013.01); *B60P 1/4421* (2013.01); *F16C 11/10* (2013.01)

(58) Field of Classification Search
CPC ........... F16C 11/10; F16C 11/103; B60P 1/43; B60P 1/44; B60P 1/4457; B60P 1/4492; B60P 1/4421
See application file for complete search history.

(56) References Cited

U.S. PATENT DOCUMENTS

| | | |
|---|---|---|
| 5,449,267 A | 9/1995 | Ablabutyan |
| 5,513,943 A | 5/1996 | Lugash et al. |
| 5,683,221 A | 11/1997 | Ablabutyan |
| 5,829,947 A | 11/1998 | Litten |
| 6,802,095 B1 | 10/2004 | Whitmarsh et al. |
| 9,669,749 B2 | 6/2017 | Walker |
| 2002/0197141 A1 | 12/2002 | Cohn |
| 2006/0104775 A1 | 5/2006 | Kasten et al. |
| 2006/0210383 A1 | 9/2006 | Hooker |
| 2012/0121369 A1 | 5/2012 | Ablabutyan |

*Primary Examiner* — Glenn F Myers
(74) *Attorney, Agent, or Firm* — Concept IP LLP; Michael Zarrabian

(57) ABSTRACT

A locking assembly for a ramp of a lift gate, the locking assembly including: an elongated adjustable locking arm pivotably disposed on a pivot point relative to the ramp, the locking arm including an adjustment mechanism for adjusting a length of the locking arm disposed on a proximal end for engaging a cam portion, where the length of the locking arm can be increased or decreased by adjusting the adjustment mechanism; and a resilient member for spring loading the locking arm, where a biasing tension in the resilient member urges the proximal end of the locking arm to pivotably engage with the cam portion to maintain the ramp in a selected position; and at least one fastener for coupling the locking assembly to a first surface of the ramp.

19 Claims, 41 Drawing Sheets

SECTION C-C

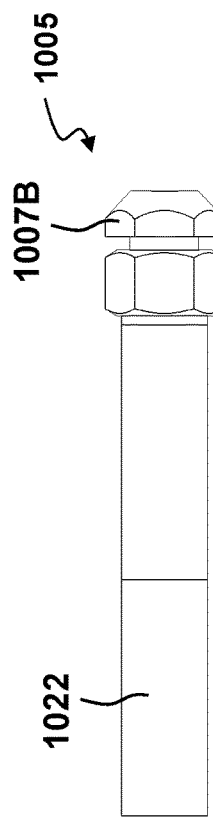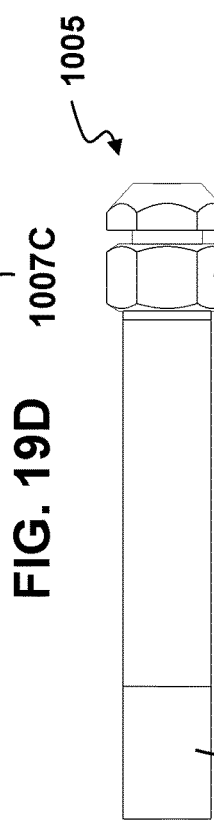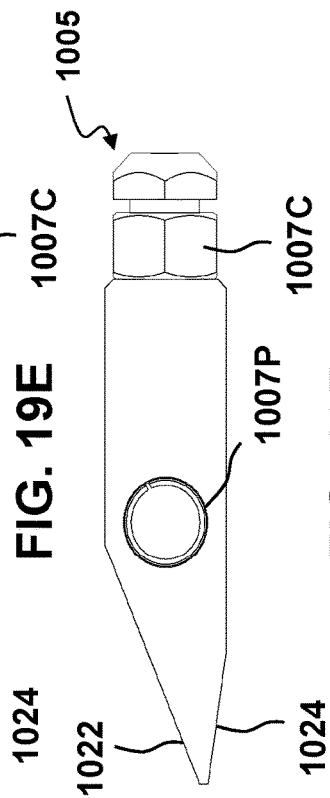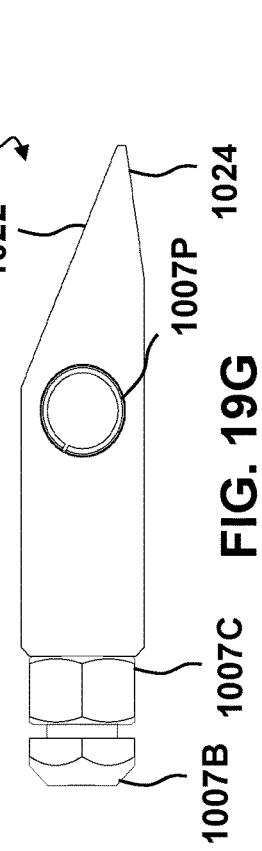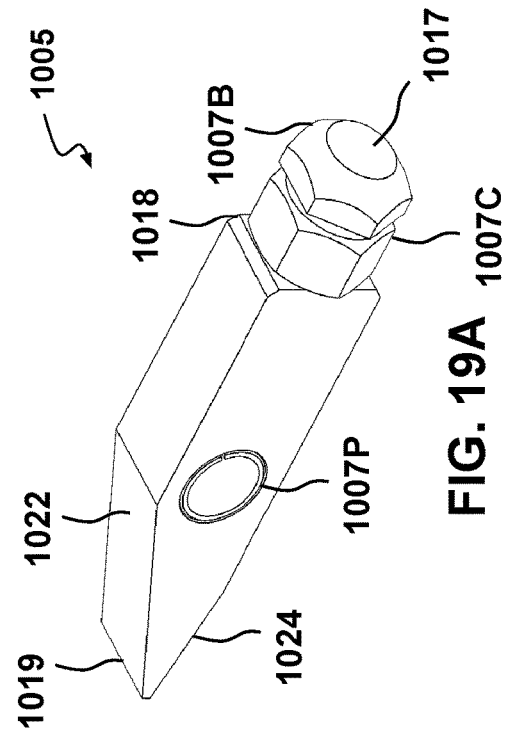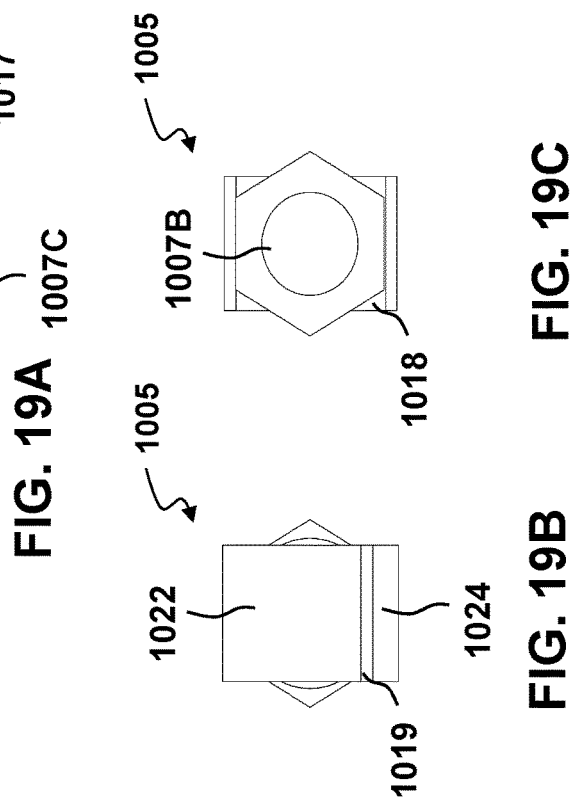

LOCKING ARM SYSTEM FOR A RETENTION RAMP OF A LIFT GATE

CROSS REFERENCE TO RELATED APPLICATIONS

This application is a continuation-in-part of U.S. patent application Ser. No. 15/097,132 filed Apr. 12, 2016, which is a continuation of U.S. patent application Ser. No. 13/689,582 filed Nov. 29, 2012, which issued as U.S. Pat. No. 9,341,212 on May 17, 2016, which claims the priority to and the benefit of U.S. Provisional Patent Application Ser. No. 61/565,454, filed Nov. 30, 2011, all of which are incorporated herein by reference in their entirety.

BACKGROUND OF THE INVENTION

Field of the Invention

The present invention relates generally to lift gates, and in particular, to retention assemblies for ramps of lift gates.

Description of Related Art

Lifts such as lift gates are typically mounted at a structure such as an opening at the rear of a vehicle to lift payloads on a lift platform from one level (e.g., ground level) up to another level (e.g., the bed of the vehicle), or vice versa.

One type of lift gate employs a parallel pair of vertically extending standards, posts or columns, each having a vertically disposed actuator for vertically raising and lowering a lift platform between ground level and the level of the bed of the vehicle. A collapsible linkage system interconnects the lift platform with the columns. The linkage system maintains the lift platform in a horizontal plane through the lifting range.

BRIEF SUMMARY OF THE INVENTION

The present invention provides a locking assembly for a retention ramp section of a lift gate. The locking assembly comprises an elongated locking arm and a spring for spring loading the locking arm. The locking arm is pivotably disposed on a pivot point relative to the ramp. A biasing tension in the spring urges a proximal end of the locking arm to engage with a cam portion of the ramp to maintain the ramp in a selected position. The cam portion has multiple engagement surfaces for individually engaging with the locking arm, wherein selectively engaging the locking arm with each engagement surface of the cam portion maintains the ramp in a corresponding selected position.

In a locking assembly embodiment for a ramp of a lift gate, the locking assembly may include: an elongated adjustable locking arm, where the locking arm may be pivotably disposed on a pivot point relative to the ramp, the locking arm may include an adjustment mechanism for adjusting a length of the locking arm disposed on a proximal end of the locking arm for engaging a cam portion, where the length of the locking arm may be increased or decreased by adjusting the adjustment mechanism at the proximal end of the locking arm; and a resilient member for spring loading the locking arm, where a biasing tension in the resilient member urges the proximal end of the locking arm to pivotably engage with the cam portion to maintain the ramp in a selected position; and at least one fastener for coupling the locking assembly to a first surface of the ramp, where the first surface of the ramp may be disposed opposite from a second surface of the ramp, and where the second surface of the ramp may be unobstructed in a ramp position of the selected position.

In additional embodiments of the locking assembly, the cam portion may have multiple engagement surfaces for individually engaging with the locking arm, such that selective engagement of the locking arm with each engagement surface of the cam portion maintains the ramp in the selected position. In additional embodiments of the locking assembly, the first surface of the ramp may be disposed distal from a lift platform section in a stowed position of the selected position. Additional embodiments of the locking assembly may include: a coupling member for rotatably coupling the ramp to the lift platform section of the lift gate, the coupling member including a channel in which the locking arm is pivotably disposed on a pivot axle along the length of the locking arm, such that the locking arm can pivot about the pivot axle for selectively engaging the cam portion. Additional embodiments of the locking assembly may include: the locking arm pivotably disposed on said pivot axle along the length of the locking arm between the proximal end of the locking arm and a distal end of the locking arm; and upon exerting a force on the distal end of the locking arm to overcome the tension in the spring, the locking arm pivots to disengage the proximal end of the locking arm from the cam portion and allows the ramp to be rotated relative to the lift platform section.

In additional embodiments of the locking assembly, when the proximal end of the locking arm engages with a first engagement surface of the cam portion, the ramp may be maintained in the stowed position by the locking arm, such that the ramp is folded against a section of the lift platform section, when the proximal end of the locking arm engages with a second engagement surface of the cam portion, the ramp may be maintained in a retention position by the locking arm, such that the ramp is substantially transverse to the lift platform section, and/or when the proximal end of the locking arm engages with a third engagement surface of the cam portion, the ramp may be maintained in a ramp position, such that the ramp is substantially aligned with the lift platform section.

In additional embodiments of the locking assembly, upon exerting a force on the distal end of the locking arm to overcome the tension in the spring, the locking arm may pivot to disengage the proximal end of the locking arm from the cam portion and allow the ramp to be rotated relative to the lift platform section between the stowed position, a retention position, the ramp position. In additional embodiments of the locking assembly, the distal end of the locking arm may rotate into the channel as the proximal end of the locking arm rotates away to disengage the cam portion due to exertion of the force on the distal end of the locking arm; and upon removing the force on the distal end of the locking arm, the resilient member pivots the locking arm to rotate the proximal end into engagement with the cam portion and maintain the ramp in the selected position relative to the lift platform section. In additional embodiments of the locking assembly, a bottom of the channel may limit the rotational range of the distal end of the locking arm.

In additional embodiments of the locking assembly, the adjustment mechanism may further include an adjustable screw threadably disposed on the proximal end of the locking arm for engaging the cam portion, where partially unscrewing or partially screwing the adjustable screw relative to the proximal end of the locking arm may increase or decrease the length of the locking arm. In additional embodiments of the locking assembly, the adjustment mechanism may be disposed on the proximal end of the locking arm, such that the adjustment mechanism may allow selective adjustment of the length of a portion of the locking arm between the pivot point and the cam portion. In additional embodiments of the locking assembly, the adjustment mechanism may allow adjusting the length of the locking arm to reduce a gap between the proximal end of the locking arm and an engagement surface of the cam portion. In additional embodiments of the locking assembly, when the proximal end of the locking arm engages with a first engagement surface of the cam portion, the ramp may be maintained in a stowed position by the locking arm, such that the ramp is folded against a section of the a lift platform section; and the adjustment mechanism may allow adjusting the length of the locking arm for engaging the cam portion to maintain the ramp fully folded against the lift platform section in a stowed position of the ramp.

A lift gate system may include: a lift platform section; a ramp, where the ramp may be rotatably coupled to the lift platform section; and a locking assembly for maintaining the ramp in a selected position relative to the lift platform section, where the locking assembly may include: an elongated adjustable locking arm, where the locking arm may be pivotably disposed on a pivot point relative to the ramp, where the locking arm may include an adjustment mechanism for adjusting a length of the locking arm disposed on a proximal end of the locking arm for engaging a cam portion, where the length of the locking arm may be increased or decreased by adjusting the adjustment mechanism at the proximal end of the locking arm; and a resilient member for spring loading the locking arm, where a biasing tension in the spring urges the proximal end of the locking arm to pivotably engage with the cam portion to maintain the ramp in a selected position; at least one fastener for coupling the locking assembly to a first surface of the ramp, where the first surface of the ramp may be disposed opposite from a second surface of the ramp, and where the second surface of the ramp may be unobstructed in a ramp position of the selected position.

In additional lift gate system embodiments, the cam portion may have multiple engagement surfaces for individually engaging with the locking arm, such that selective engagement of the locking arm with each engagement surface of the cam portion maintains the ramp in the selected position. Additional lift gate system embodiments may include a lifting mechanism for supporting and moving the lift platform section.

In additional lift gate system embodiments, when the proximal end of the locking arm engages with a first engagement surface of the cam portion, the ramp may be maintained in a stowed position by the locking arm, such that the ramp is folded against a section of the lift platform section; when the proximal end of the locking arm engages with a second engagement surface of the cam portion, the ramp may be maintained in a retention position by the locking arm, such that the ramp is substantially transverse to the lift platform section; and when the proximal end of the locking arm engages with a third engagement surface of the cam portion, the ramp may be maintained in a ramp position, such that the ramp is substantially aligned with the lift platform section.

A method embodiment may include: maintaining a ramp of a lift gate in a selected position by engaging an elongated adjustable locking arm with a cam portion, the locking arm including an adjustment mechanism for adjusting a length of the locking arm disposed on a proximal end of the locking arm for engaging a cam portion of the ramp; and increasing or decreasing the length of the locking arm by adjusting the adjustment mechanism at the proximal end of the locking arm; where the locking arm may be spring loaded by a resilient member having a biasing tension that urges the proximal end of the locking arm to pivotably engage with the cam portion to maintain the ramp in a selected position; where the cam portion may have multiple engagement surfaces for individually engaging with the locking arm, such that selective engagement of the locking arm with each engagement surface of the cam portion maintains the ramp in the selected position; and wherein the locking assembly may be coupled to a first surface of the ramp, where the first surface of the ramp may be disposed opposite from a second surface of the ramp, and where the second surface of the ramp may be unobstructed in a ramp position of the selected position.

These and other features, aspects and advantages of the present invention will become understood with reference to the following description, appended claims and accompanying figures.

BRIEF DESCRIPTION OF THE DRAWINGS

FIGS. 19A-19G illustrate perspective, front, back, top, bottom, right side, and left side views, respectively, of a locking arm bracket, in accordance with an embodiment of the invention.

DETAILED DESCRIPTION OF THE INVENTION

Figure 1:
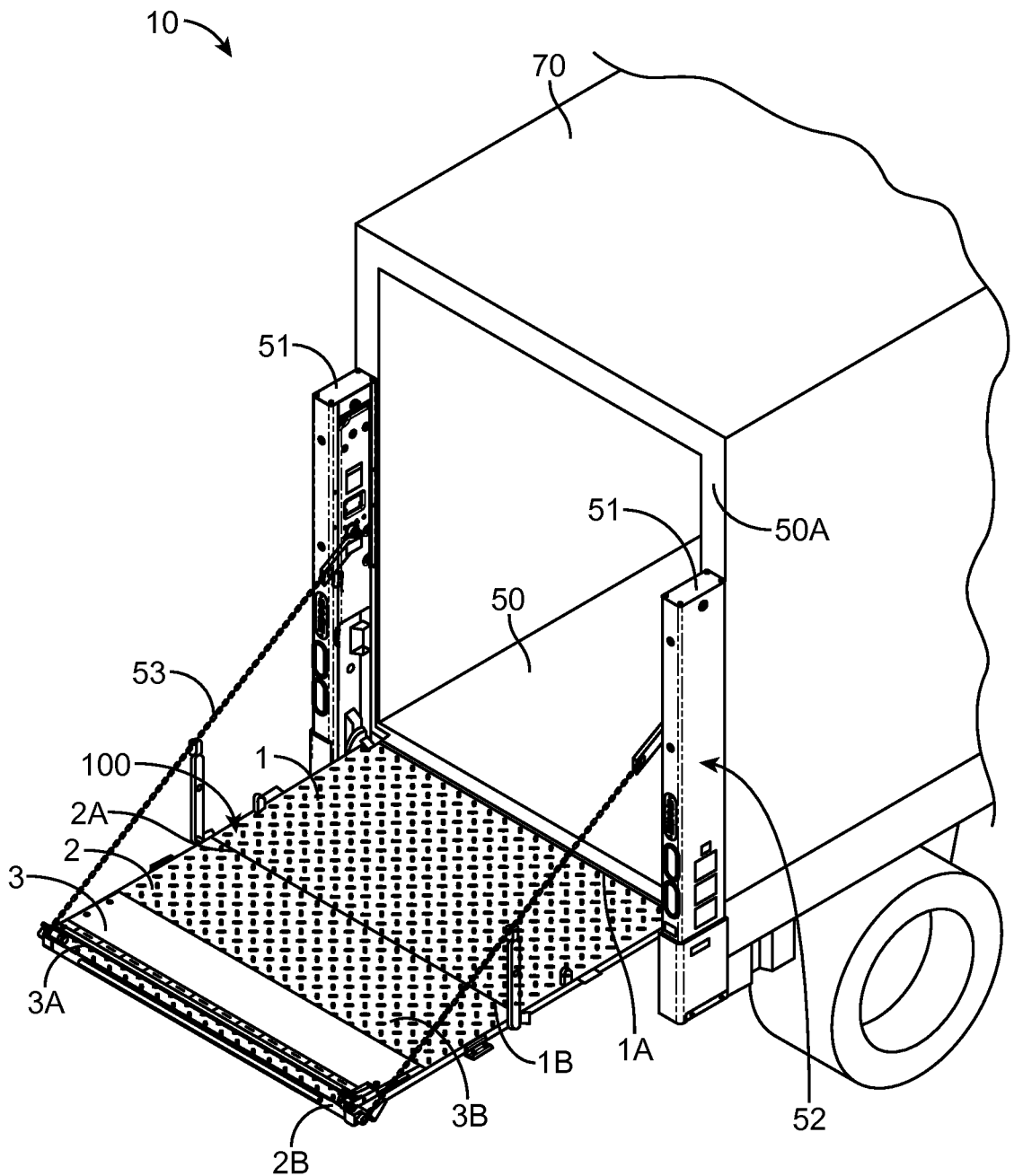
FIG. 1 illustrates a perspective view of a lift gate system, in accordance with an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The present invention relates to retention assemblies for ramps of lift gates. In one embodiment, the present invention provides a retention device comprising a locking assembly for a ramp of a lift gate. The locking assembly comprises an elongated locking arm and a spring for spring loading the locking arm. The locking arm is pivotably disposed on a pivot point relative to the ramp. A biasing tension in the spring urges a proximal end of the locking arm to engage with a cam portion of the ramp to maintain the ramp in a selected position. The cam portion has multiple engagement surfaces for individually engaging with the locking arm, wherein selectively engaging the locking arm with each engagement surface of the cam portion maintains the ramp in a corresponding selected position. Upon exerting a force on the distal end of the locking arm to overcome the tension in the spring, the locking arm pivots to disengage said proximal end of the locking arm from the cam portion and allows the ramp to be rotated relative to the lift platform section.

In one embodiment, a coupling member rotatably couples the ramp to a lift platform section of the lift gate. The coupling member includes a channel in which the locking arm is pivotably disposed on a pivot axle along the length of the locking arm, such that the locking arm can pivot about the pivot axle for selectively engaging the cam portion. In one embodiment, the locking arm is pivotably disposed on said pivot axle along the length of the locking arm between the proximal end and a distal end of the locking arm.

In one embodiment, the ramp is maintained in a stowed position by engaging the proximal end of the locking arm with a first engagement surface of the cam portion, such that the ramp is folded against a section of the lift platform section. The ramp is maintained in a retention position by engaging the proximal end of the locking arm with a second engagement surface of the cam portion, such that the ramp is substantially transverse to the lift platform section. The ramp is maintained in a ramp position by engaging the proximal end of the locking arm with a third engagement surface of the cam portion, such that the ramp is substantially aligned with the lift platform section.

Upon exerting a force on the distal end of the locking arm to overcome the tension in the spring, the locking arm pivots to disengage said proximal end of the locking arm from the cam portion and allows the ramp to be rotated relative to the lift platform section between said stowed position, retention position and ramp position. The distal end of the locking arm rotates into said channel as the proximal end of the locking arm rotates away to disengage the cam portion due to exertion of said force on the distal end of the locking arm. Upon removing said force on the distal end of the locking arm, the spring pivots the locking arm to rotate said proximal end into engagement with the cam portion and maintain the ramp in a selected position relative to the lift platform section. A bottom of the channel limits the rotational range of the distal end of the locking arm.

In one embodiment, the locking arm further includes an adjustment mechanism for adjusting the length of the locking arm. The adjustment mechanism is disposed on said proximal end of the locking arm, such that the adjustment mechanism allows selective adjustment of the length of a portion of the locking arm between said pivot point and the cam portion. The adjustment mechanism allows adjusting the length of the locking arm to reduce a gap between the proximal end of the locking arm and an engagement surface of the cam portion. When the proximal end of the locking arm engages with a first engagement surface of the cam portion, the ramp is maintained in a stowed position by the locking arm, such that the ramp is folded against a section of the lift platform section. The adjustment mechanism allows adjusting the length of the locking arm for engaging the cam portion to maintain the ramp fully folded against the lift platform section in said stowed position of the ramp.

In one embodiment, the adjusting mechanism comprises an adjustable screw threadably disposed on said proximal end of the locking arm for engaging the cam portion. The length of the locking arm can be increased by partially unscrewing the adjustable screw out of said proximal end of the locking arm. The length of the locking arm can be decreased by partially screwing the adjustable screw into said proximal end of the locking arm.

FIG. 1 illustrates a perspective view of a lift gate system ("lift gate") 10, in accordance with an embodiment of the invention. The lift gate 10 is configured for mounting at a structure such as a rear frame of a vehicle (e.g., a truck). For example, the lift gate 10 may be attached to a rear frame 50A of a vehicle 70 as shown in FIG. 1.

The lift gate 10 comprises a lifting mechanism 52 including a parallel pair of vertically extending columns 51 for moving a lift platform 100 between a raised position and a lowered position. Each column 51 includes a vertically disposed actuator therein for vertically raising and lowering the lift platform 100, such as between ground level 200 (FIG. 2B) and the level of a vehicle bed 50 of the vehicle 70. A pair of collapsible linkages 53 interconnect the lift platform 100 with the columns 51 along linkage points on sides of the lift platform 100. The linkages 53 maintain the lift platform 100 in a horizontal plane through the lifting range. In one embodiment, the cam 6 is a portion of the ramp. In another embodiment, the cam 6 is fixedly attached to the ramp via fastening devices such as screws or by welding.

The columns 51 raise/lower the lift platform 100 for lifting payloads thereon from one level (e.g., ground level 200 in FIG. 2B) to another level (e.g., the vehicle bed 50 of the vehicle 70), or vice versa. In FIG. 1, the lift platform 100 is shown in an unfolded position, wherein the lift platform 100 is substantially aligned with the vehicle bed 50 when the lift platform 100 is in the raised position, as shown in FIG. 1.

The lift platform 100 comprises at least one load-carrying surface including a platform section 1, a foldable section ("flipover") 2, and a retention ramp section ("ramp") 3.

The platform section 1 has a first edge 1A and a second edge 1B that is opposite of the first edge 1A. The flipover 2 has a first edge 2A and a second edge 2B that is opposite of the first edge 2A. The first edge 2A of the flipover 2 is pivotally coupled to the second edge 1B of the platform section 1.

Figure 6A:
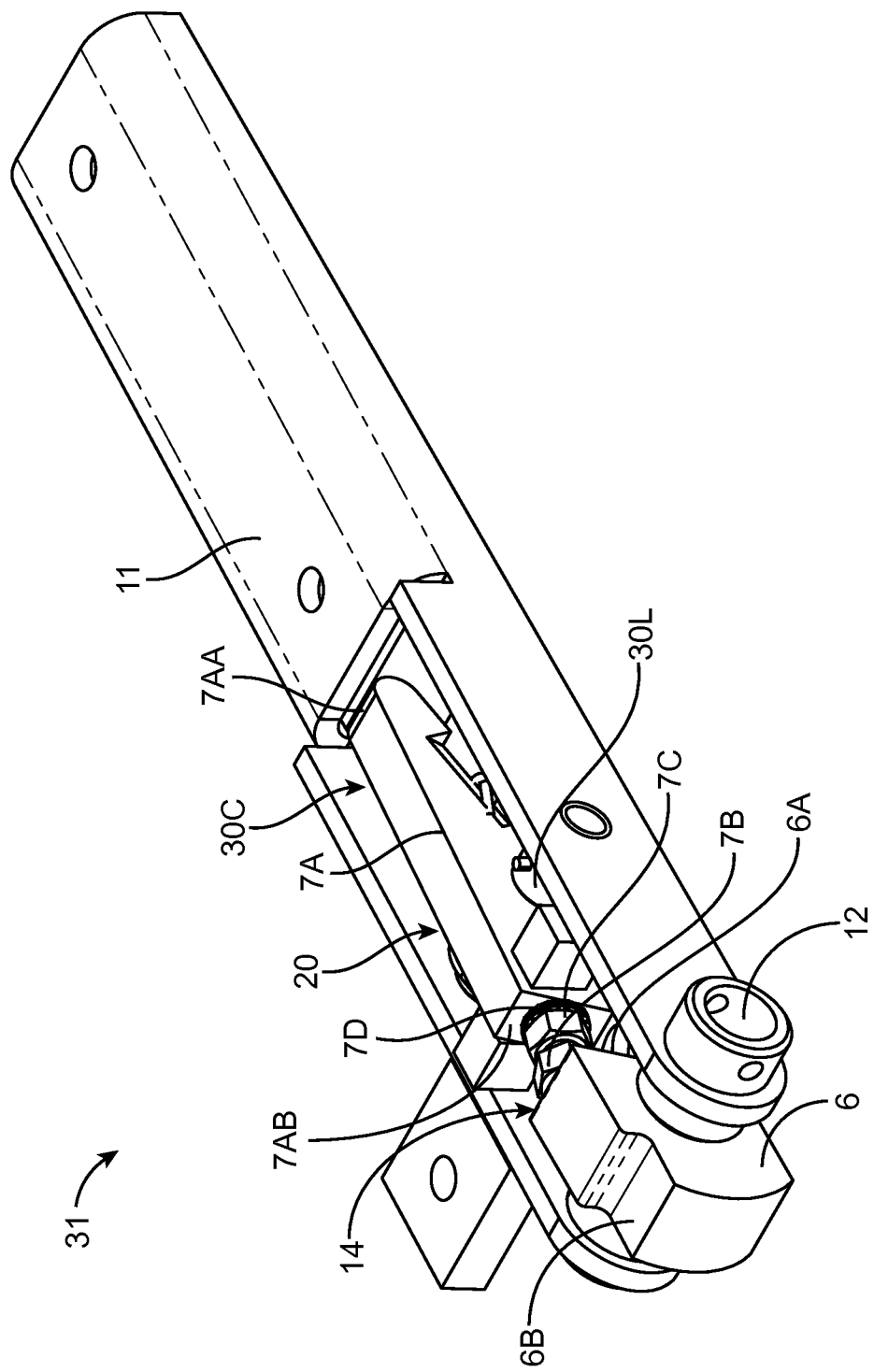
FIG. 6A illustrates an example locking assembly with an adjustable locking arm, in accordance with an embodiment of the invention.

The ramp 3 has a first edge 3A and a second edge 3B that is opposite of the first edge 3A. The first edge 3A of the ramp 3 is pivotally coupled to the second edge 2B of the flipover 2 via at least one locking assembly 30 (FIG. 3) or at least one locking assembly 31 (FIG. 6A). In one embodiment, the first edge 3A of the ramp 3 is pivotally coupled to the second edge 2B of the flipover 2 via a locking assembly 30 at one side and a hinge assembly 40 at another side (FIG. 2B), wherein the locking assembly 30 and the hinge assembly 40 are disposed at opposite ends (sides) 3E (FIG. 15) and 3F (FIG. 15), respectively, of the first edge 3A. In another embodiment, the first edge 3A of the ramp 3 is pivotally coupled to the second edge 2B of the flipover 2 via a locking assembly 31 at one side and a hinge assembly 40 at another side (FIG. 15), wherein the locking assembly 31 and the hinge assembly 40 are disposed at opposite ends (sides) 3E (FIG. 15) and 3F (FIG. 15), respectively, of the first edge 3A. In yet another embodiment, the first edge 3A of the ramp 3 is pivotally coupled to the second edge 2B of the flipover 2 via a pair of locking assemblies 31 (FIG. 16), wherein each locking assembly 31 is disposed at an opposite end 3E (FIG. 16), 3F (FIG. 16) of the first edge 3A.

The ramp 3 is connected to a coupling member that comprises a hinge member 11 for rotatably coupling the ramp 3 to the flipover 2. The coupling member further includes a pivot member 12 (FIG. 3) such as an axle pin for rotatably disposing the hinge member 11 relative to the flipover 2, thereby enabling the hinge member 12 (and the attached ramp 3) to freely rotate relative to the flipover 2 when the locking assembly is unlocked, as described herein.

Figure 2A:
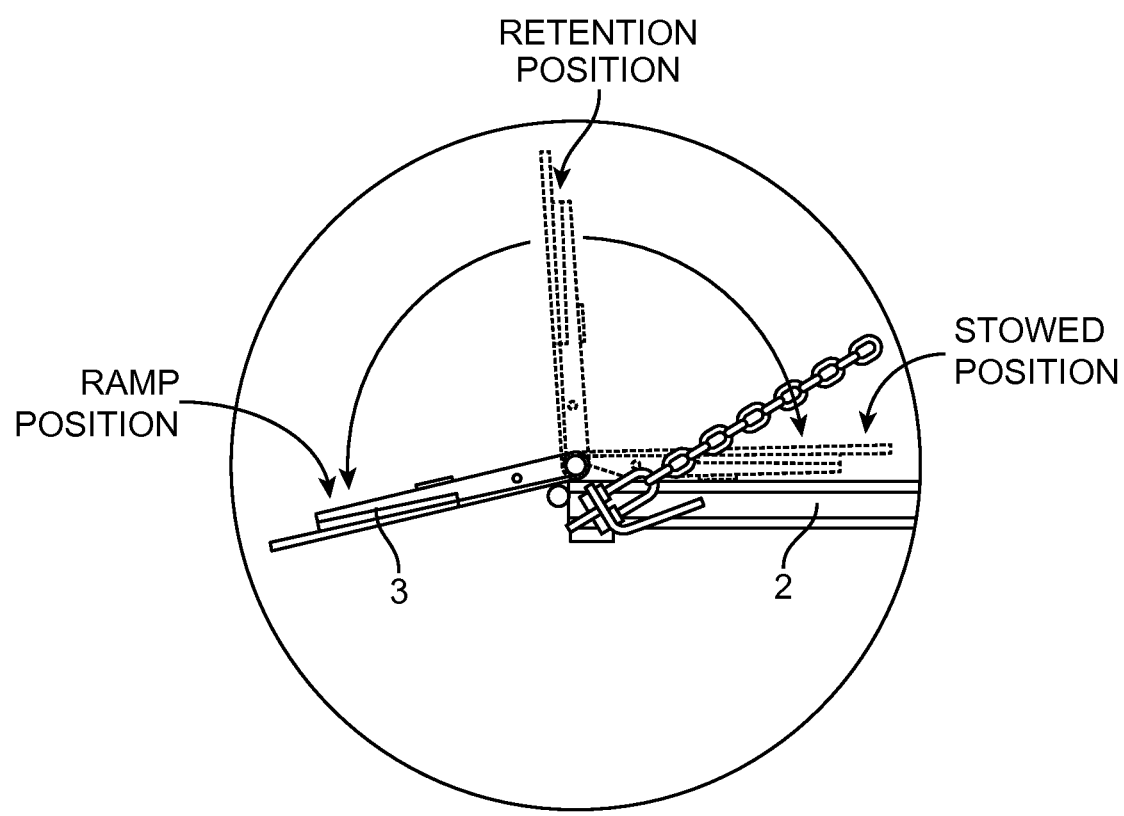
FIG. 2A illustrates the pivoting range of the ramp relative to the flipover, in accordance with an embodiment of the invention.

FIG. 2A illustrates the pivoting range of the ramp 3 relative to the flipover 2, in accordance with an embodiment of the invention. The ramp 3 pivots relative to the flipover 2. Each locking assembly 30, 31 that pivotally couples the ramp 3 to the flipover 2 maintains (i.e., locks) the ramp 3 in a selected position. In one embodiment, the ramp 3 may be maintained (i.e., locked) in a ramp position, a retention position, or a stowed position.

As shown in FIG. 2A, in the ramp position, the ramp 3 is lowered and substantially aligned with the flipover 2. In the retention position, the ramp 3 is raised and substantially transverse (i.e., perpendicular) to the flipover 2. In the stowed position, the ramp 3 is folded over and against the flipover 2.

Figure 2B:
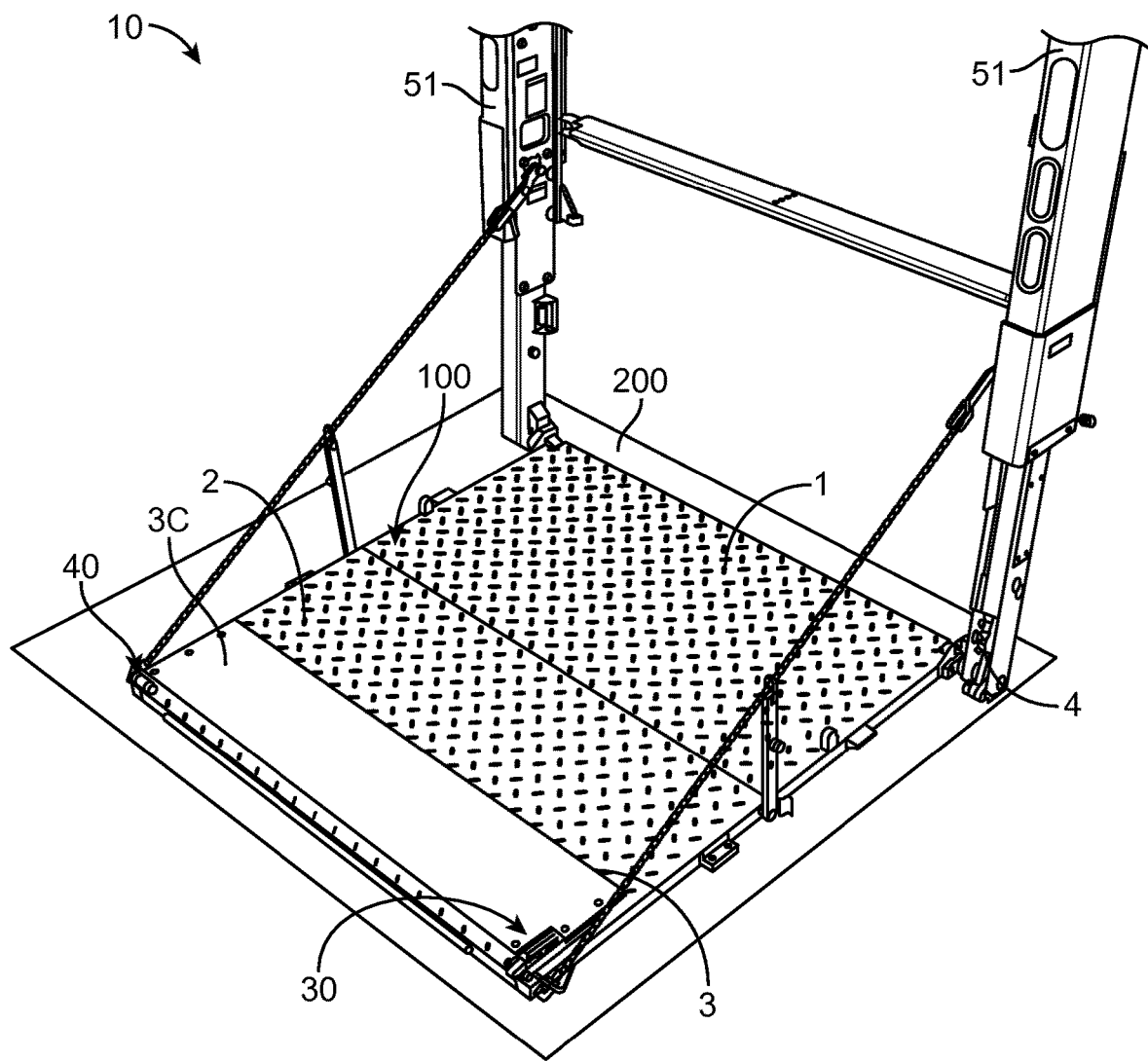
FIG. 2B illustrates the lift platform in the lowered position and the ramp maintained in the stowed position, in accordance with an embodiment of the invention.

FIG. 2B illustrates the lift platform 100 in the lowered position and the ramp 3 maintained in the stowed position, in accordance with an embodiment of the invention. In one embodiment, the lift platform 100 rests against a ground level 200 when the lift platform 100 is in the lowered position for placing loads thereon. The platform section 1 and the flipover 2 are unfolded and in substantial horizontal alignment with the ground level 200. When the lift platform 100 is in the lowered position, the ramp 3 may be maintained in the ramp position to function as a ramp, in the retention position to prevent objects from rolling off the edge of the flipover 2, or in the stowed position, as shown in FIG. 2B. The ramp 3 is folded over and against the flipover 2 when the ramp 3 is maintained in the stowed position, as shown in FIG. 2B.

Figure 2C:
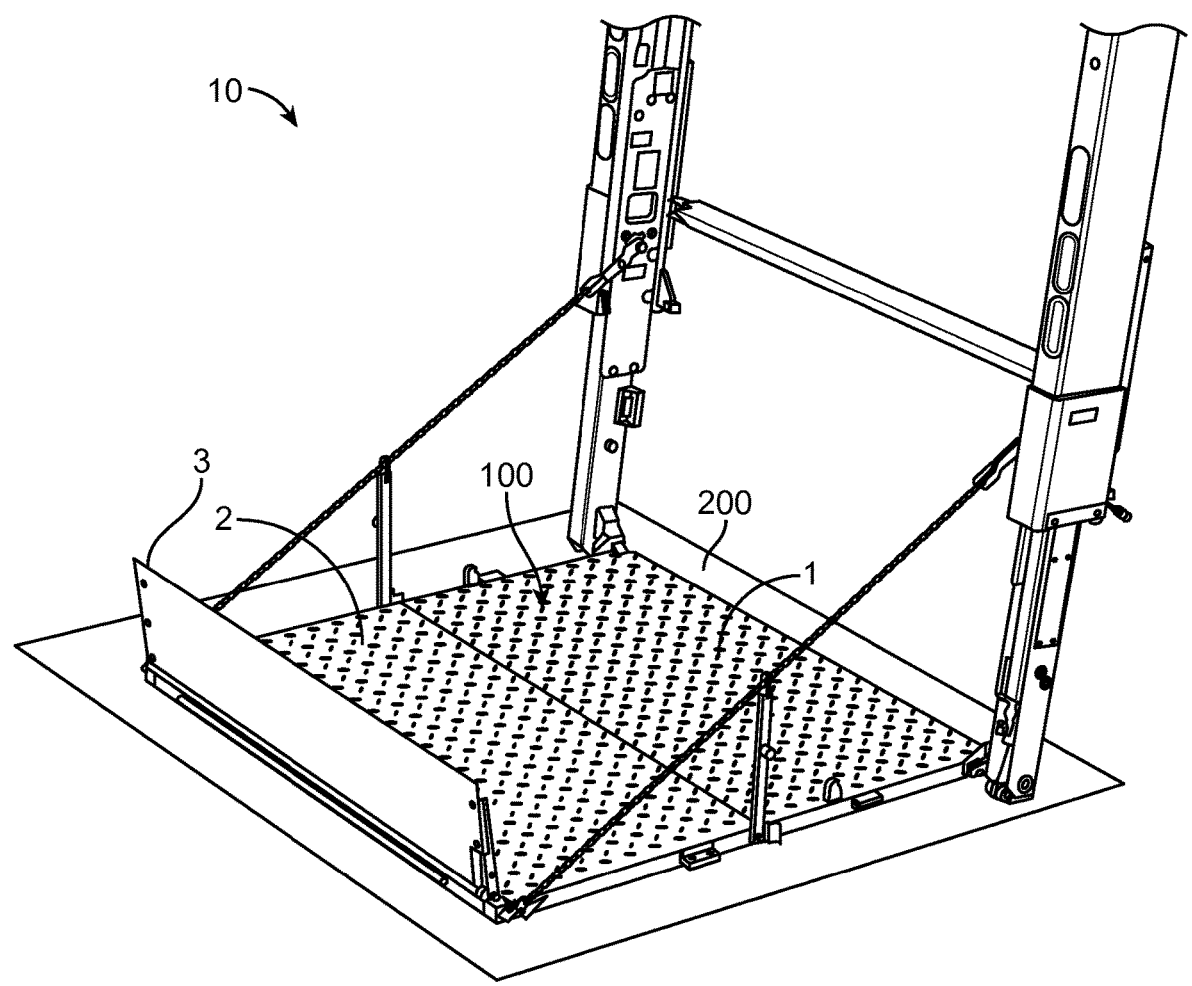
FIG. 2C illustrates the lift platform in the lowered position and the ramp maintained in the retention position, in accordance with an embodiment of the invention.

FIG. 2C illustrates the lift platform 100 in the lowered position and the ramp 3 maintained in the retention position, in accordance with an embodiment of the invention. The ramp 3 is raised and substantially transverse (i.e., perpendicular) to the flipover 2 when the ramp 3 is maintained in the retention position, as shown in FIG. 2C. In the retention position, the ramp 3 prevents loads (e.g., wheeled carts) from rolling off the lift platform 100.

Figure 2D:
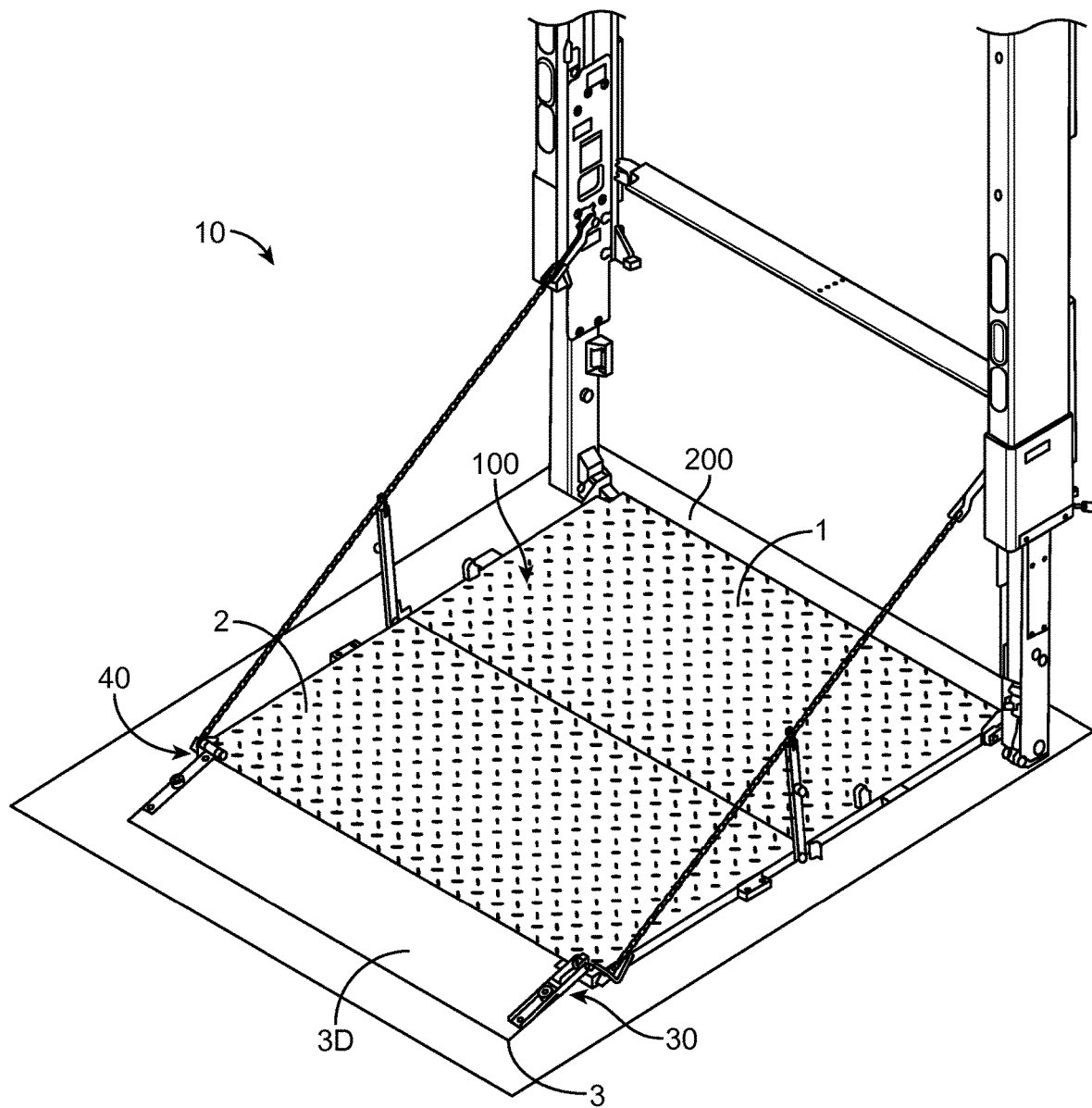
FIG. 2D illustrates the lift platform in the lowered position and the ramp maintained in the ramp position, in accordance with an embodiment of the invention.

FIG. 2D illustrates the lift platform 100 in the lowered position and the ramp 3 maintained in the ramp position, in accordance with an embodiment of the invention. The ramp 3 is lowered and substantially aligned with the flipover 2 when the ramp 3 is maintained in the ramp position, as shown in FIG. 2D. In the ramp position, load (e.g., wheeled carts) may be more easily rolled onto, or rolled off, the lift platform 100. The ramp 3 comprises a bottom side 3C (FIG. 2B) and a top side 3D.

Figure 3:
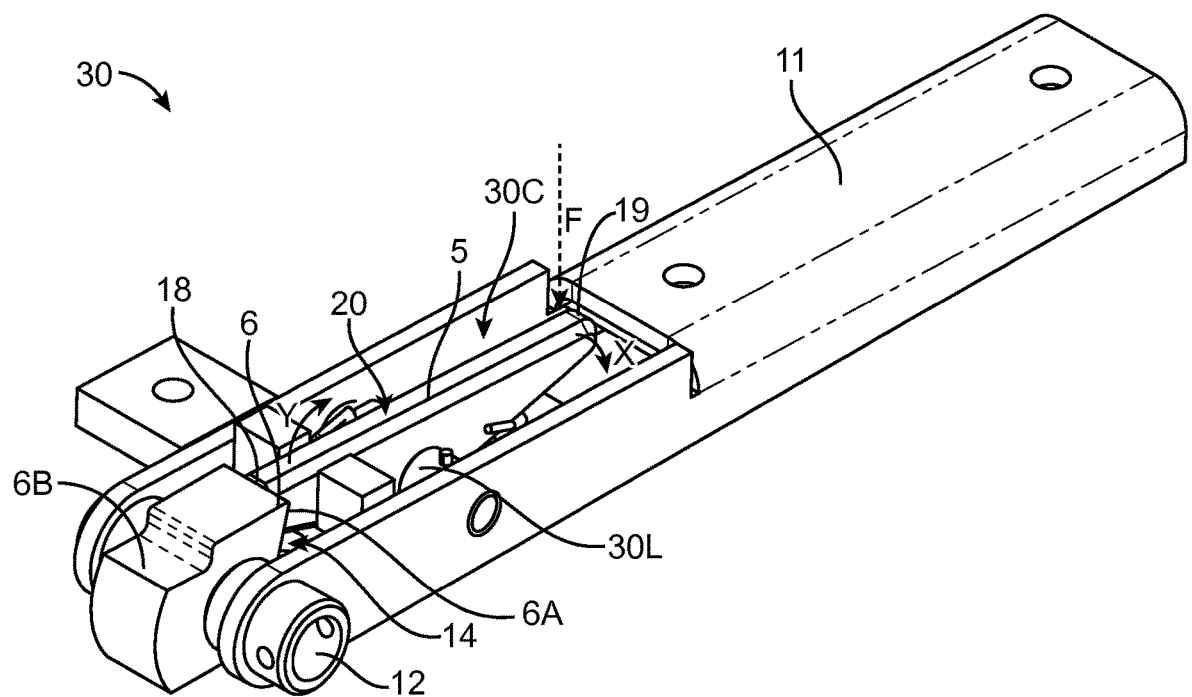
FIG. 3 illustrates an example locking assembly, in accordance with an embodiment of the invention.
Figure 13A:
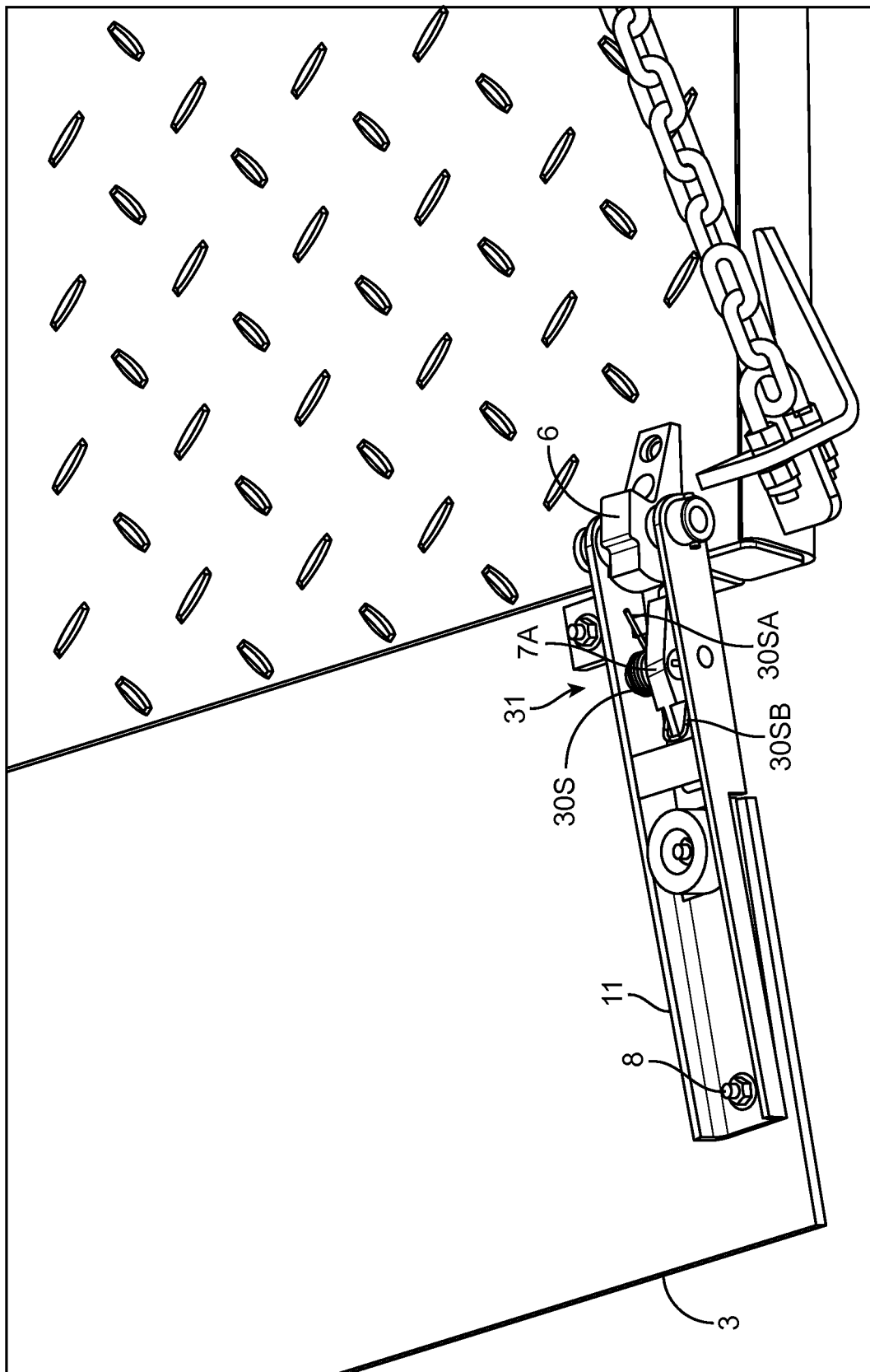
FIG. 13A illustrates a top perspective view of the ramp when the ramp is maintained in the ramp position, in accordance with an embodiment of the invention.

FIG. 3 illustrates an embodiment of a locking assembly 30, in accordance with an embodiment of the invention. The locking assembly 30 further comprises a hinge arm member ("hinge member") 11 coupled to the top side 3D of the ramp 3 using at least one fastener 8 (FIG. 13A). The hinge member 11 includes a channel (i.e., cavity) 30C.

The locking assembly 30 further comprises a locking mechanism 20 for maintaining the pivoting ramp 3 in a selected position (e.g., a ramp position, a retention position, or a stowed position) when the locking assembly 30 is locked. The locking mechanism 20 is disposed within the channel 30C of the hinge member 11. In one embodiment, the locking mechanism 20 comprises an elongated locking arm member ("locking arm") 5, a spring coil 30S (FIG. 6B), and a pivot axle 30L disposed on the opposing walls of the channel 30C.

A cam member/portion ("cam") 6 is fixedly attached to the flipover 2, such that the hinge member 11 (and the attached ramp 3) is rotatable on pivot member 12 relative to the cam 6 (and the flipover 2) when the locking assembly 30 is unlocked.

The elongated locking arm 5 has a first end 18 and a second end 19 that is distal from the first end 18. In relation to the cam 6, the first end 18 and the second end 19 of the locking arm 5 are the proximal end 18 and the distal end 19 of the locking arm 5, respectively.

The cam 6 includes different portions or locking engagement surfaces for engaging with the first end 18 of the locking arm 5 to lock the locking assembly 30 and maintain the ramp 3 in a selected position. The locking arm 5 is pivotably mounted on the pivot axle 30L, such that the locking arm 5 pivots on the axle 30L in relation to the channel 30C of the hinge member 11. The spring coil 30S is a torsion spring, which is disposed concentric with the pivot axle 30L, with one end engaging the locking arm 5 and another end engaging a portion of the channel 30C. The spring coil 30S is normally in torsion and pivots the locking arm 5 on the axle 30L to move the proximal end 18 of the locking arm 5 downwardly into the channel 30C and urged onto the cam 6. As such, the spring 30S always exerts a biasing force on the locking arm 5 such that the first end 18 of the locking arm 5 is spring-loaded on the cam 6.

The ramp 3 is maintained in a selected position when the locking arm 5 engages with an engagement surface of the cam 6 to lock the locking assembly 30. For example, the ramp 3 is maintained in the stowed position when the proximal end 18 of the locking arm 5 engages a first recess portion ("first recess") 14 (FIG. 13B) of the cam 6, as shown in FIG. 3. The proximal end 18 is in direct contact (i.e., flush) with engagement surface 6A of the first recess 14 of the cam 6 when the ramp 3 is maintained in the stowed position. This prevents rotation of the hinge member 11 and the attached ramp 3 on the pivot member 12 away from the flipover 2, thereby maintaining the ramp 3 in the stowed position.

To release (i.e., unlock) the ramp 3 from a selected position, a force F is applied to the distal end 19 of the locking arm 5 to overcome the biasing torsion of the spring 30S and push the distal end 19 downward into the channel 30C of the hinge member 11. As the distal end 19 rotates inside the channel 30C in direction X (e.g., clockwise in FIG. 3), the proximal end 18 of the locking arm 5 disengages from the first recess 14 of the cam 6 and rotates away from the cam 6 in direction Y (e.g., clockwise in FIG. 3).

Generally, when the proximal end 18 of the locking arm 5 is disengaged from the cam 6, this unlocks the locking assembly 30 and the ramp 3 is free to rotate relative to the flipover 2 on the pivot member 12 while the force F is maintained on the locking arm 5 to maintain the proximal end 18 of the locking arm 5 disengaged from the cam 6. For example, an operator can rotate the ramp 3 relative to the flipover 2.

Figure 4A:
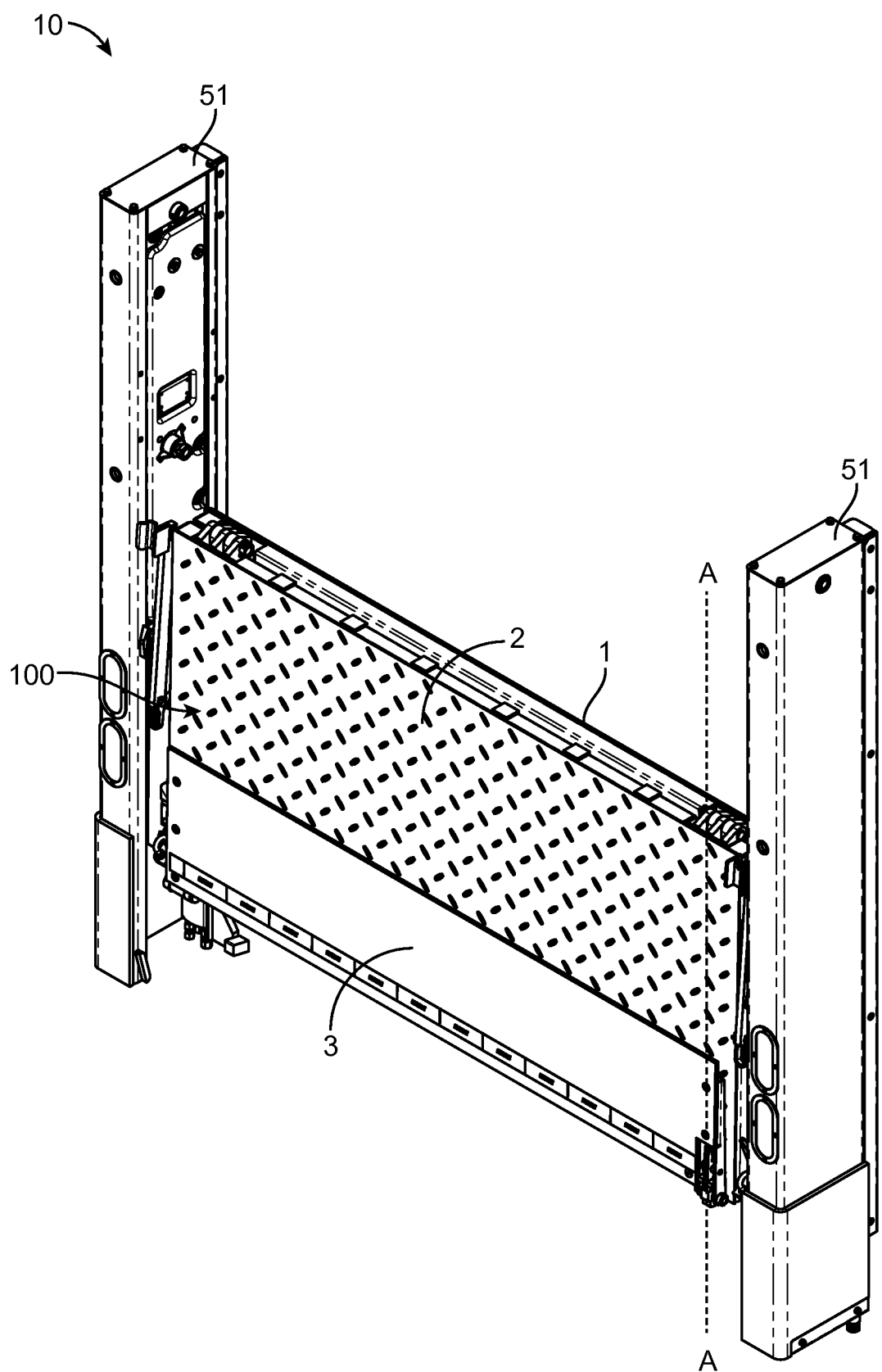
FIG. 4A illustrates a side perspective view of the lift platform in the stowed position, in accordance with an embodiment of the invention.

FIG. 4A shows a perspective view of the lift gate 10, wherein the lift platform 100 is in folded and stowed position between the columns 51, and the ramp 3 is maintained in the stowed position relative to the flipover 2 by the locking arm 5, in accordance with an embodiment of the invention. As noted, the lifting mechanism 52 comprises a parallel pair of vertically extending standards, posts or columns 51, each having a vertically disposed actuator 4 (FIG. 2B) for vertically raising and lowering the lift platform 100 between ground level 200 and the vehicle bed 50. The linkages 53 (e.g., chains) maintain the lift platform 100 in a horizontal plane through the lifting range of the platform 100. The lifting mechanism 52 may also rotate the lift platform 100 into a stowed position, as shown in FIG. 4A. In the stowed position, the lift platform 100 is fully folded, inverted, and vertically disposed between the columns 51.

Figure 4B:
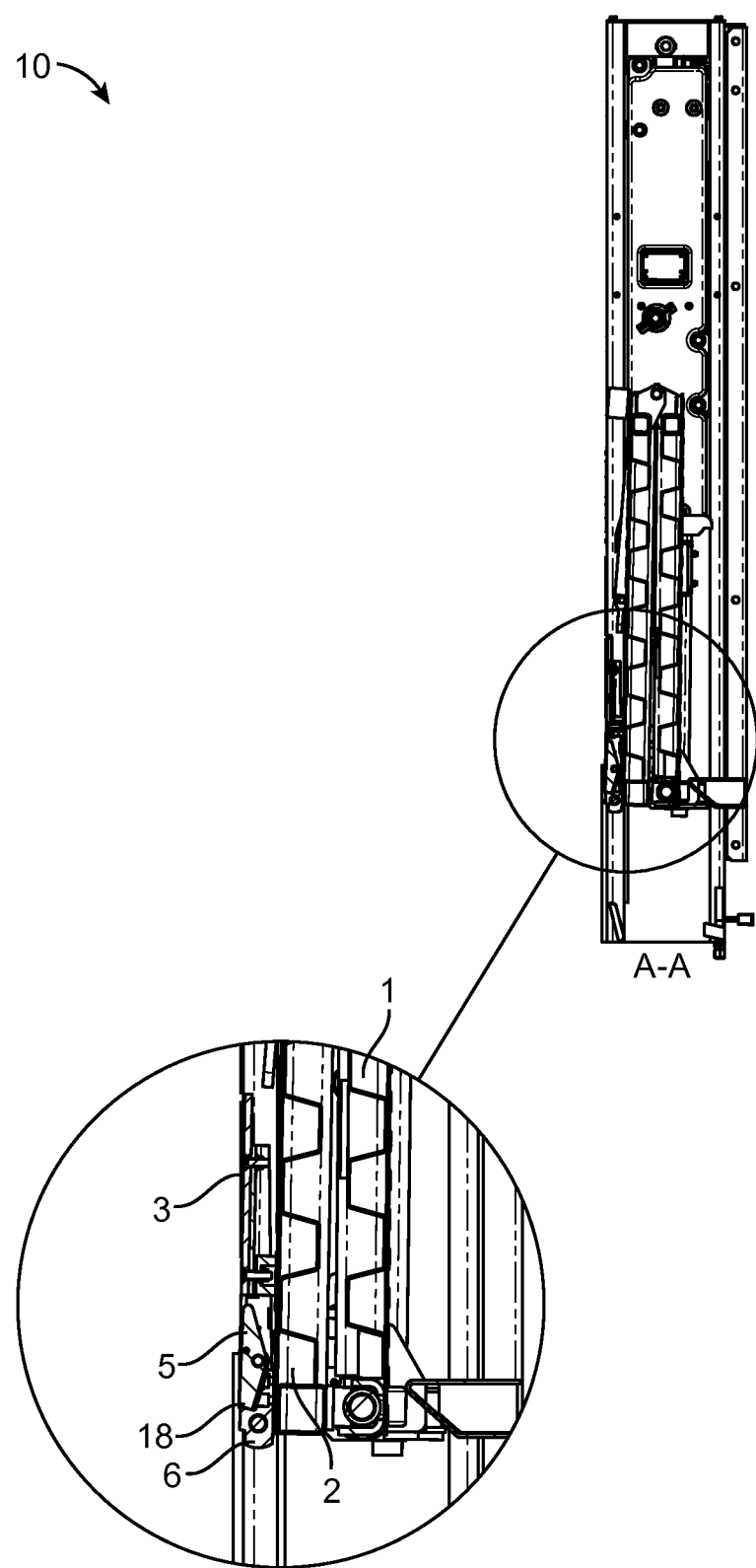
FIG. 4B illustrates a cross-sectional view of the lift gate in FIG. 4A about an axis A-A (FIG. 4A), in accordance with an embodiment of the invention.

FIG. 4B illustrates a cross-sectional view of the lift platform 100 in FIG. 4A about an axis A-A (FIG. 4A), in accordance with an embodiment of the invention. As shown in FIGS. 4A-4B, the flipover 2 is folded against the platform section 1 of the folded lift platform 100, and the ramp 3 is maintained by the locking arm 5 of the locking assembly 30 in the stowed position (i.e., folded against the flipover 2). The proximal end 18 of the locking arm 5 is in direct contact (i.e., flush) with recess 14 of the cam 6 to maintain (i.e., lock) the ramp 3 in the stowed position.

Repeatedly engaging the locking arm 5 with the cam 6 to maintain the ramp 3 in a selected position may cause wear and tear to the proximal end 18 of the locking arm 5 and/or the cam 6. Further, repeatedly disengaging the locking arm 5 from the cam 6 to release the ramp 3 from a selected position may also cause wear and tear to the proximal end 18 of the locking arm 5 and/or the cam 6.

Figure 5A:
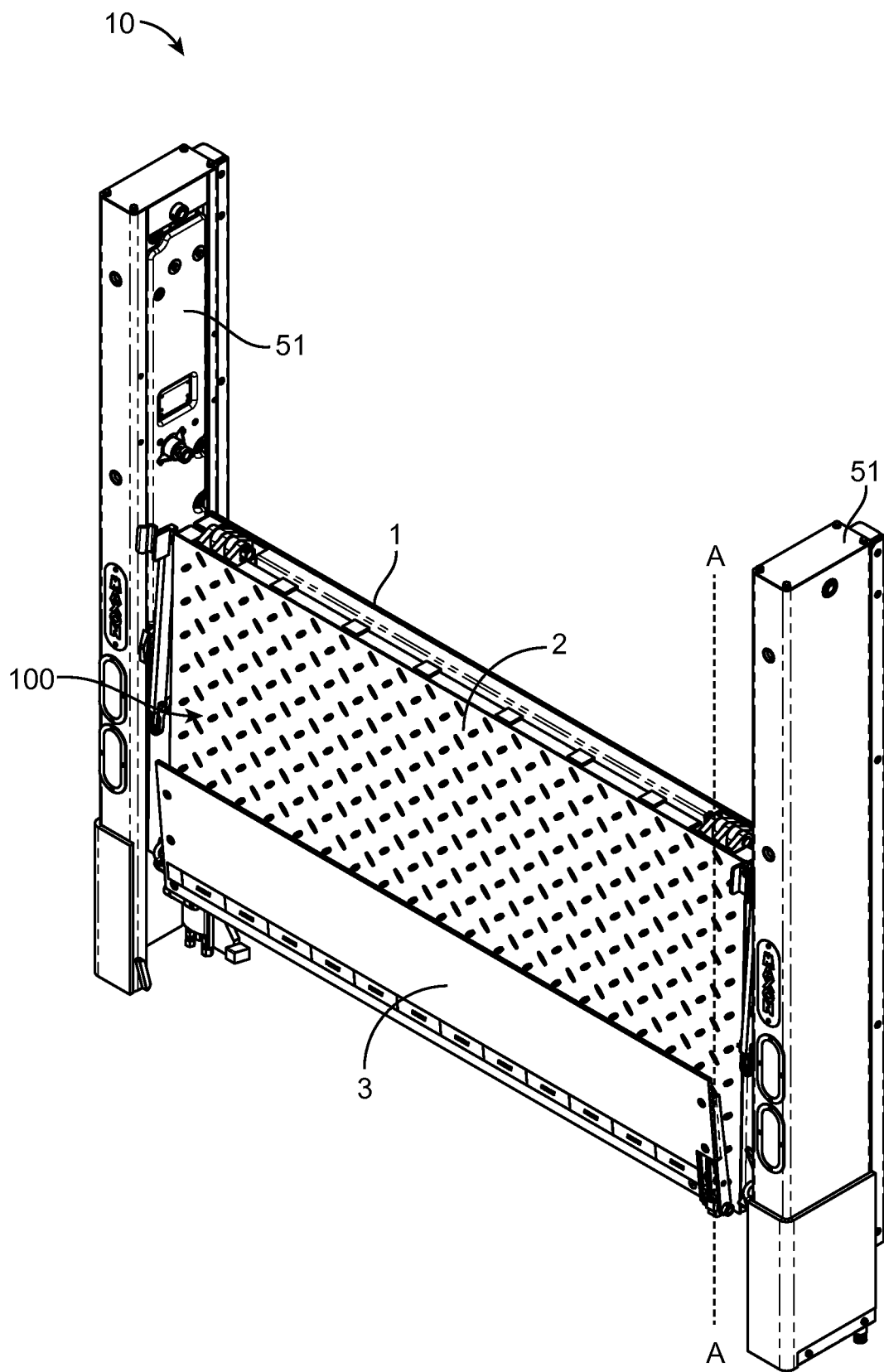
FIG. 5A illustrates a side perspective view of the lift gate in the stowed position after the lift gate has been used for a period of time, in accordance with an embodiment of the invention.
Figure 5B:
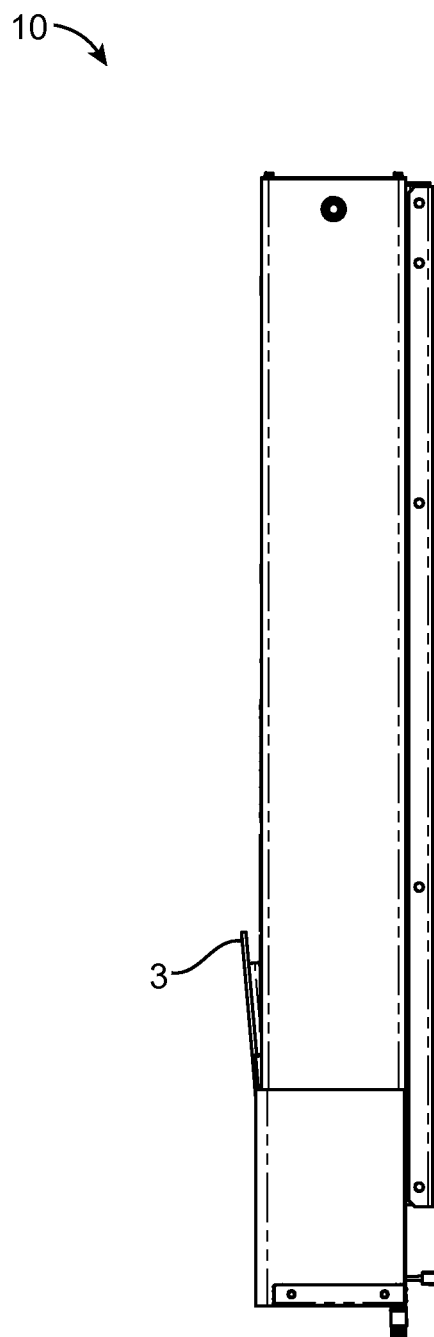
FIG. 5B illustrates a side view of the lift gate in FIG. 5A, in accordance with an embodiment of the invention.

As a result of such wear and tear to the locking assembly 30, over time the locking arm 5 may not properly engage the cam 6 to properly maintain the ramp 3 in a selected position. FIG. 5A illustrates a perspective view of the lift platform 100 in the stowed position after the lift gate 10 (FIG. 1) has been used for a period of time, causing wear and tear on the locking arm 5 and/or the locking engagement surfaces of the cam 6. FIG. 5B illustrates a side view of the lift platform 100 in FIG. 5A, wherein the ramp 3 is not properly maintained in the stowed position against the flipover 2 due to wear and tear on the locking arm 5 and/or the cam 6.

Figure 5C:
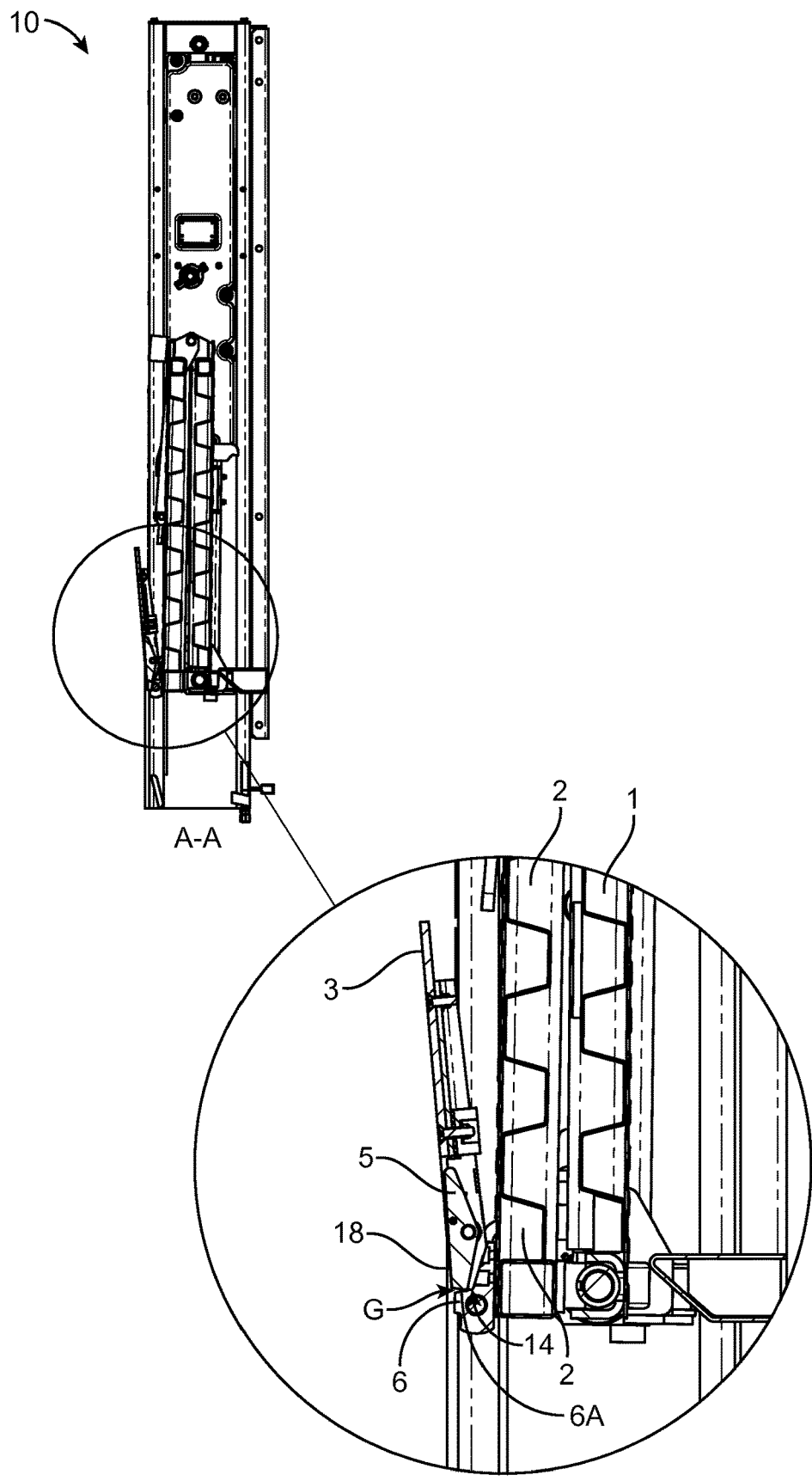
FIG. 5C illustrates a cross-sectional view of the lift gate in FIG. 5A about an axis A-A (FIG. 5A), in accordance with an embodiment of the invention.

FIG. 5C illustrates a cross-sectional view of the lift platform 100 in FIG. 5A about an axis A-A (FIG. 5A), wherein wear and tear wear on the locking arm 5 and/or the cam 6 resulted in a gap G between the proximal end 18 of the locking arm 5 and the locking engagement surface 6A of the cam 6. The gap G prevents the proximal end 18 of the locking arm 5 from properly engaging with the first recess 14 of the cam 6 to maintain the ramp 3 properly stowed against the flipover 2. As a result, the ramp 3 may jut out relative to the flipover 2 even when the ramp 3 is maintained in the stowed position, as shown in FIGS. 5A-5C. This is distinguishable from FIGS. 4A-4B where the ramp 3 is properly folded flat against the flipover 2 when the ramp 3 is maintained in the stowed position. The gap G may be minimized or closed by replacing the worn out locking arm 5 or the worn out cam 6 with a new locking arm 5 or a new cam 6, respectively.

According to another embodiment of the invention shown in FIG. 6A, a locking assembly 31 includes an adjustable locking arm 7A that allows reducing such a gap G as necessary. The locking assembly 31 is similar to the locking assembly 30, except that the adjustable locking arm 7A is used in the locking assembly 31 instead of the locking arm 5 of the locking assembly 30. The adjustable locking arm 7A has a first end 7AA and a second end 7AB that is opposite of the first end 7AA. In relation to the cam 6, the first end 7AA and the second end 7AB of the adjustable locking arm 7A are the distal end 7AA and the proximal end 7AB of the adjustable locking arm 7A, respectively. The cam 6 is fixedly attached to the flipover 2, such that the hinge member 11 (and the attached ramp 3) is rotatable on pivot member 12 relative to the cam 6 (and the flipover 2) when the locking assembly 31 is unlocked.

In one embodiment, the elongated adjustable locking arm 7A includes an adjusting mechanism for adjusting the length of the adjustable locking arm 7A. The adjusting mechanism allows selectively adjusting the length of the arm 7A between the axle 30L and the cam 6. In one implementation, the adjusting mechanism comprises an adjustable screw member 7B, a portion of which is threadably driven inside the adjustable locking arm 7A at the proximal end 7AB of the adjustable locking arm 7A, allowing adjustments to the length of the adjustable locking arm 7A. An adjustment may be made by unscrewing the screw 7B to lengthen the arm 7A, or further screwing in the screw 7B to shorten the length of the arm 7A.

The cam 6 includes locking engagement surfaces for engaging the adjustable screw 7B of the adjustable locking arm 7A in different positions relative to the cam 6. The spring coil 30S exerts a biasing force on the adjustable locking arm 7A such that the adjustable screw 7B and the proximal end 7AB of the adjustable locking arm 7A are spring-loaded towards the cam 6. As described in detail later herein, the ramp 3 is maintained in a selected position when the adjustable screw 7B of the adjustable locking arm 7A engages an engagement surface (i.e., a locking surface) of the cam 6.

Figure 6B:
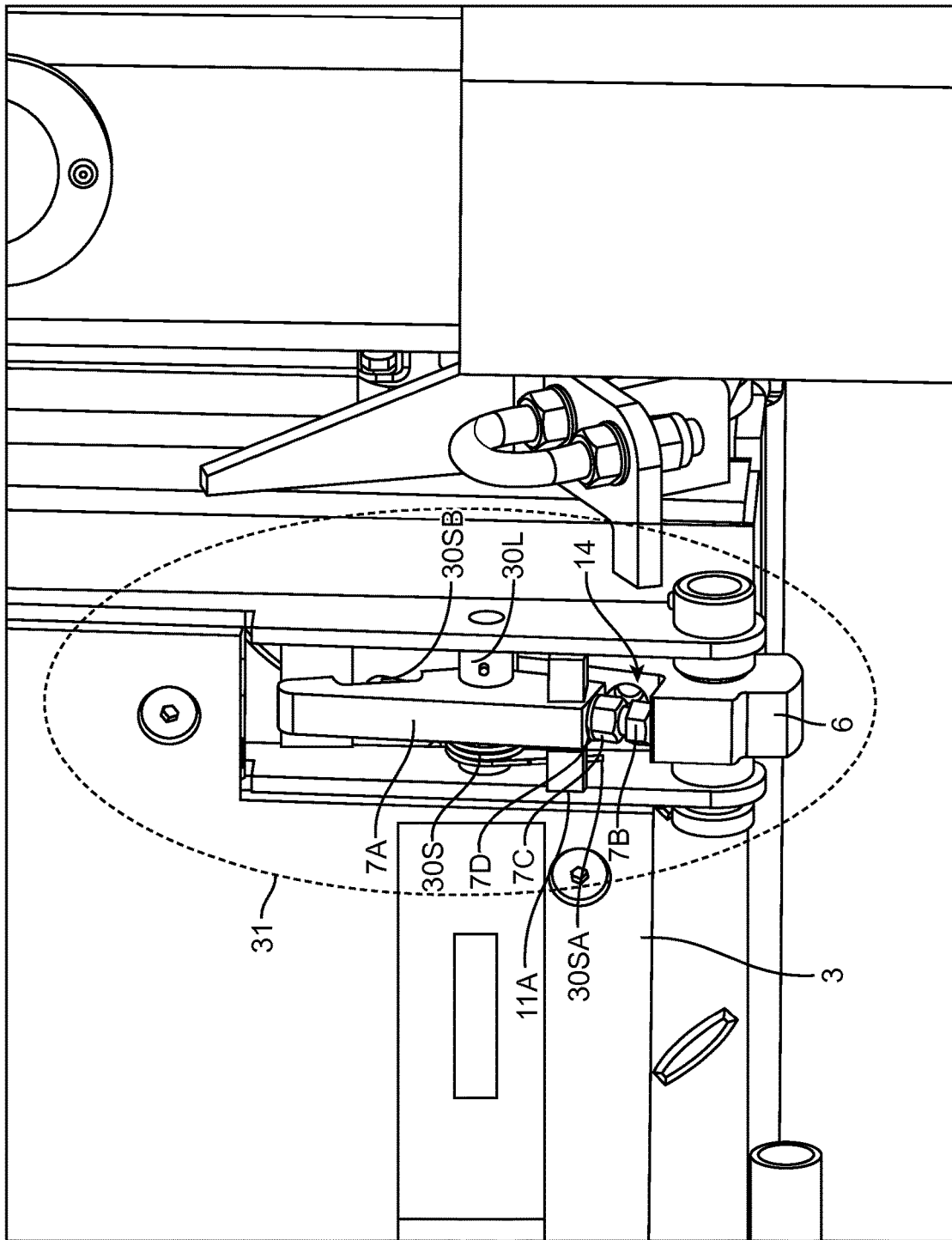
FIG. 6B illustrates an example locking assembly with an adjustable locking arm, wherein the ramp is maintained in the stowed position, in accordance with an embodiment of the invention.

FIG. 6B illustrates the locking assembly 31, wherein the ramp 3 is maintained in the stowed position against the flipover 2, in accordance with an embodiment of the invention. As shown in FIG. 6B, the adjustable screw 7B engages engagement surface 6A of the first recess 14 of the cam 6 to maintain the ramp 3 in the stowed position. A first end 30SA of the torsion spring coil 30S is fixedly attached to a protrusion 11A of the hinge member 11. A second end 30SB of the torsion spring coil 30S is fixedly attached to a recess 7R (FIG. 7I) of the adjustable locking arm 7A. In this manner, the proximal end 7AB of the arm 7A is spring-loaded against the cam 6. The spring coil 30S governs the rotational range of the adjustable locking arm 7A, as described above in relation of the locking assembly 30.

Figure 7A:
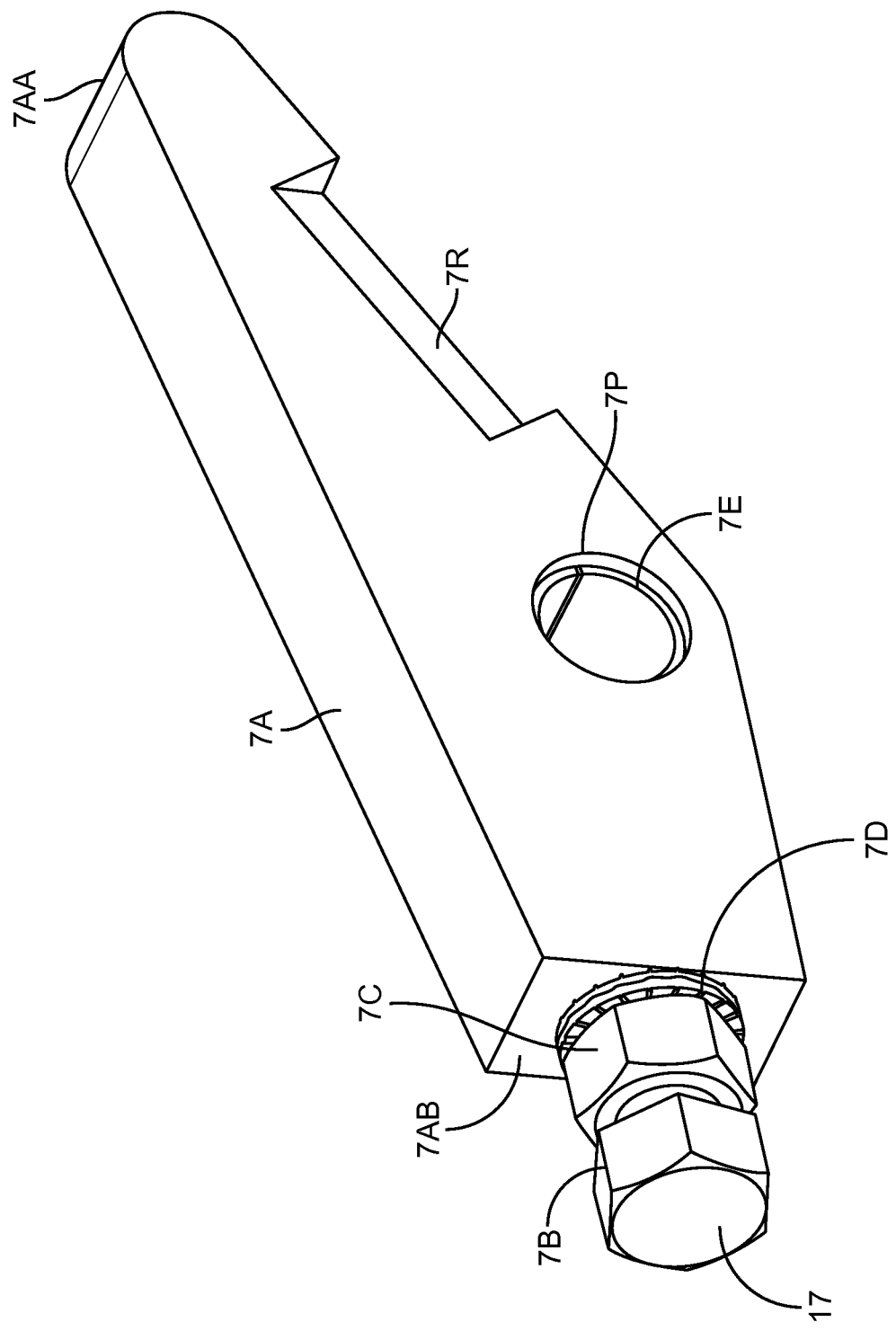
FIG. 7A illustrates a top perspective view of the adjustable locking arm, in accordance with an embodiment of the invention.
Figure 7B:
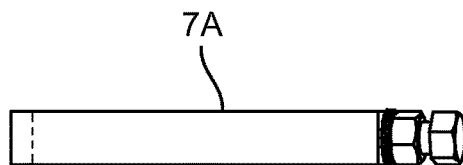
FIG. 7B illustrates a top view of the adjustable locking arm, in accordance with an embodiment of the invention.
Figure 7C:
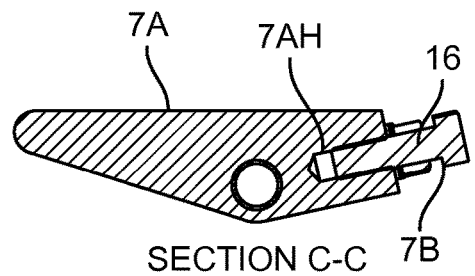
FIG. 7C illustrates a cross-sectional view of the adjustable locking arm, in accordance with an embodiment of the invention.
Figure 7D:
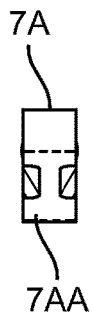
FIG. 7D illustrates a back view of the adjustable locking arm, in accordance with an embodiment of the invention.
Figure 7E:
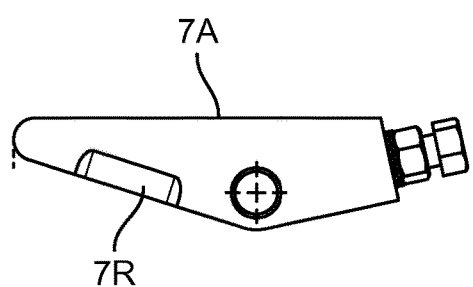
FIG. 7E illustrates a side view of the adjustable locking arm, in accordance with an embodiment of the invention.
Figure 7F:
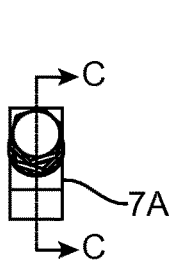
FIG. 7F illustrates a front view of the adjustable locking arm, in accordance with an embodiment of the invention.
Figure 7G:
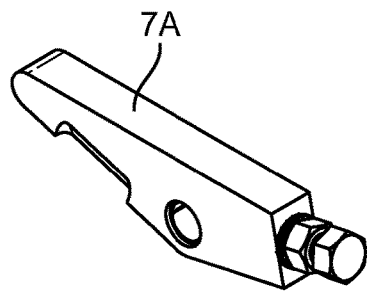
FIG. 7G illustrates a front perspective view of the adjustable locking arm, in accordance with an embodiment of the invention.
Figure 7H:
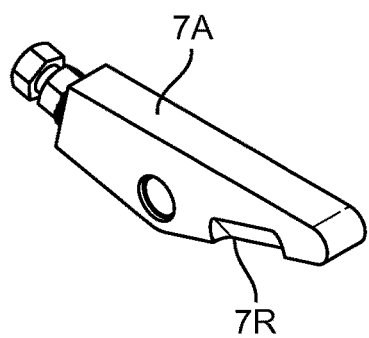
FIG. 7H illustrates a back perspective view of the adjustable locking arm, in accordance with an embodiment of the invention.
Figure 7I:
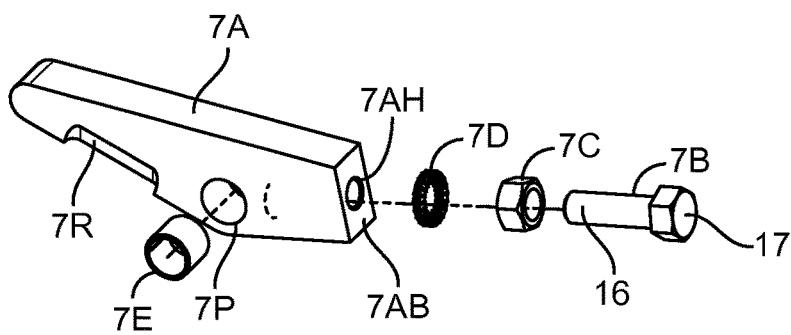
FIG. 7I illustrates an exploded view of the adjustable locking arm, in accordance with an embodiment of the invention.

FIGS. 7A-7I illustrate different views of the adjustable locking arm 7A of the locking assembly 31, in accordance with an embodiment of the invention. Specifically, FIG. 7A illustrates a perspective view of the adjustable locking arm 7A, apart from the hinge member 11. FIG. 7B illustrates a top view of the adjustable locking arm 7A. FIG. 7C illustrates a cross-sectional view of the adjustable locking arm 7A. FIG. 7D illustrates a back view of the adjustable locking arm 7A. FIG. 7E illustrates a side view of the adjustable locking arm 7A. FIG. 7F illustrates a front view of the adjustable locking arm 7A. FIG. 7G illustrates a front perspective view of the adjustable locking arm 7A. FIG. 7H illustrates a back perspective view of the adjustable locking arm 7A. FIG. 7I illustrates an exploded view of the adjustable locking arm 7A.

The proximal end 7AB of the arm 7A includes a threaded cavity 7AH for threadably receiving the adjustable screw 7B. The adjustable screw 7B has a threaded body 16 (FIG. 7B) and a head 17. A portion of the body 16 is threadably driven (i.e., screwed) inside the cavity 7AH of the adjustable locking arm 7A. In one embodiment, a securing nut 7C and a washer 7D further secure the adjustable screw 7B to the adjustable locking arm 7A. The securing nut 7C may be loosened to adjust the adjustable screw 7B. For example, the securing nut 7C may be loosened to screw the body 16 of the adjustable screw 7B further inside the cavity 7AH of the adjustable locking arm 7A (i.e., shorten the arm 7A). The securing nut 7C may also be loosened to unscrew the body 16 of the adjustable screw 7B out of the cavity 7AH of the adjustable locking arm 7A (i.e., lengthen the arm 7A).

An aperture 7P extends axially through the adjustable locking arm 7A. The aperture 7P is shaped for receiving a bearing 7E, wherein the bearing 7E receives the pivot axle (pin) 30L for assembling the arm 7A on the hinge member 11. The adjustable locking arm 7A is mounted on the pivot axle 30L (FIG. 6A) by inserting the pivot axle 30L through the bearing 7E.

The locking arm 7A further includes a recess 7R. As noted, the second end 30SB of the torsion spring coil 30S is fixedly attached to the recess 7R.

Figure 8A:
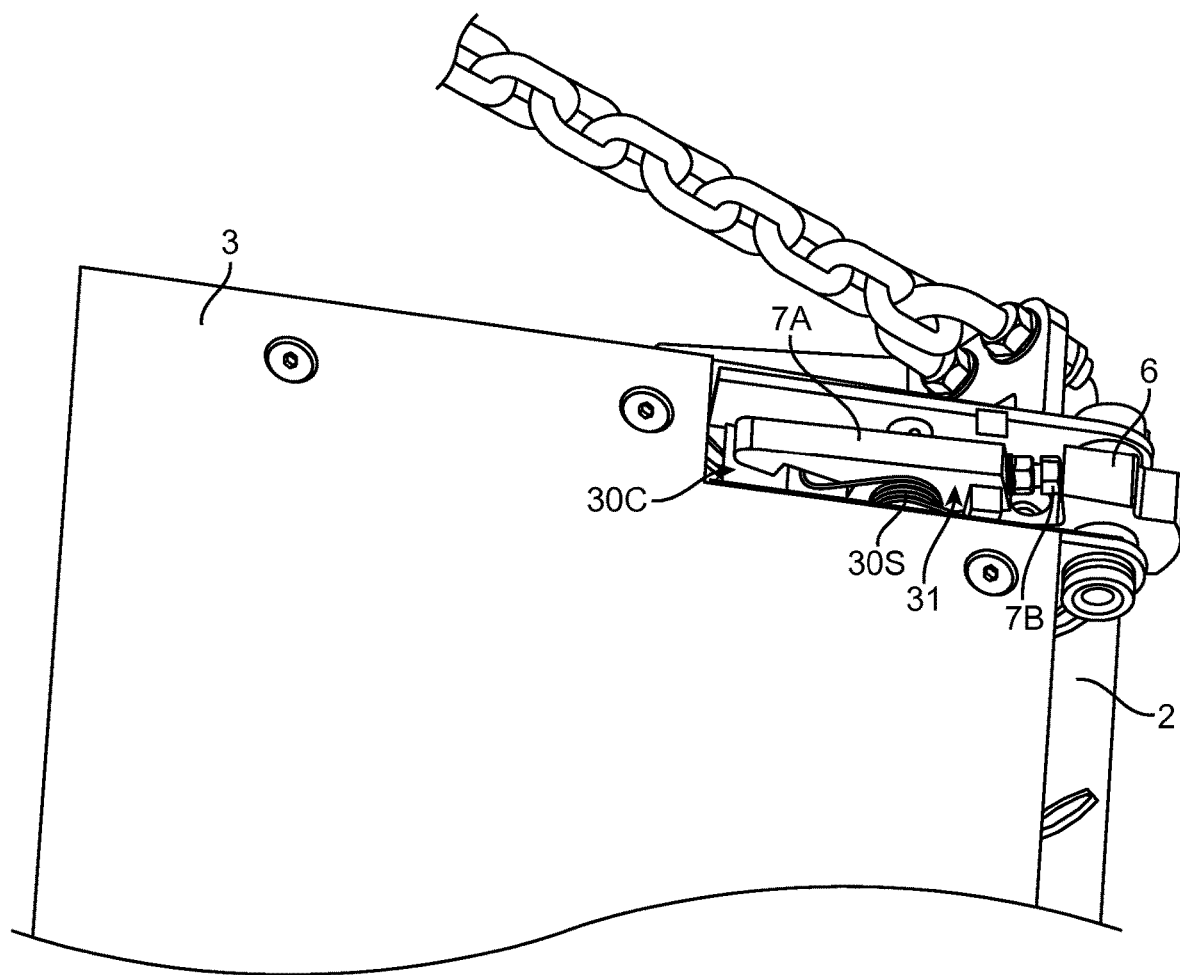
FIG. 8A illustrates a top perspective view of the ramp when the ramp is maintained in the stowed position, in accordance with an embodiment of the invention.

FIG. 8A illustrates a top perspective view of the ramp 3 and the locking mechanism 31, wherein the ramp 3 is maintained in the stowed position, in accordance with an embodiment of the invention. As noted, the ramp 3 is in the stowed position when the ramp 3 is folded over and against the flipover 2. The ramp 3 is maintained in the stowed position when the adjustable screw 7B of the arm 7A engages with the first recess 14 of the cam 6, as shown in FIG. 8A.

Figure 8B:
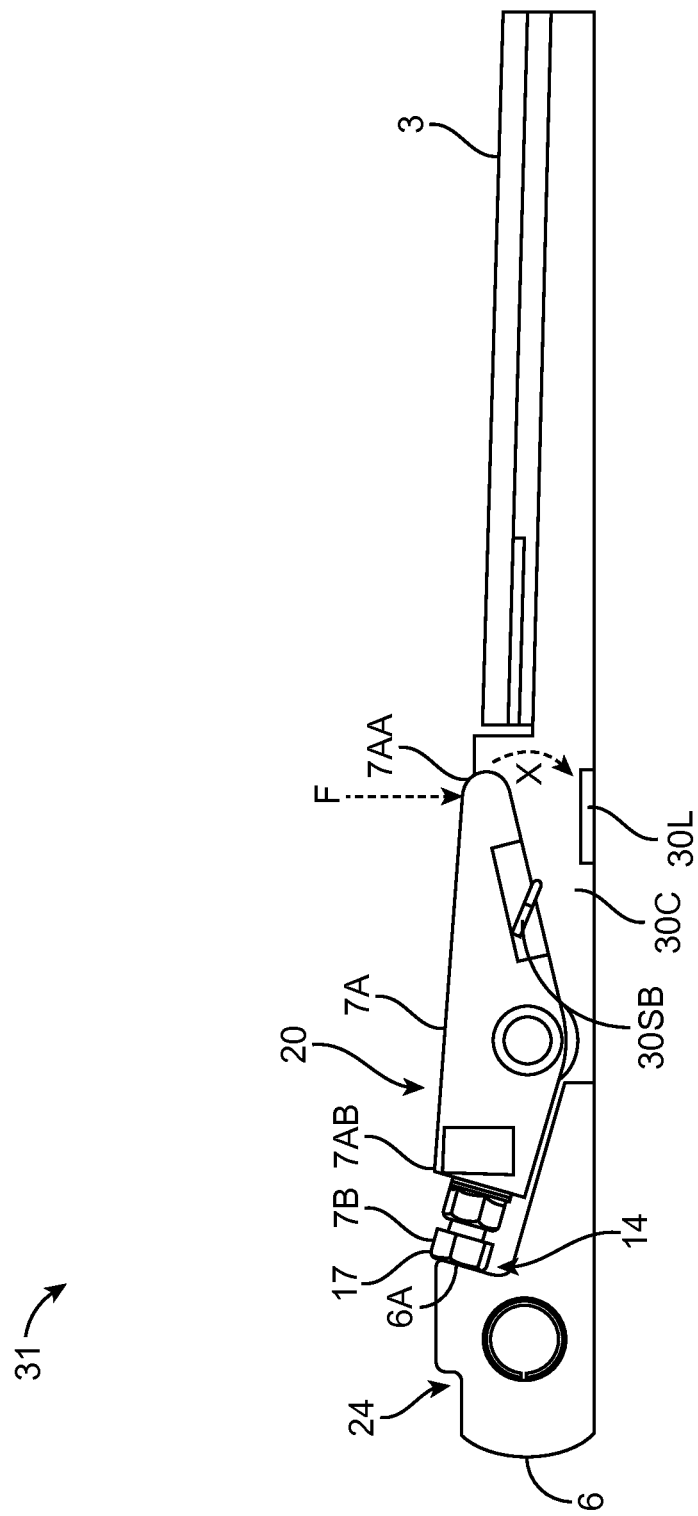
FIG. 8B illustrates a side view of the ramp when the ramp is maintained in the stowed position, in accordance with an embodiment of the invention.

FIG. 8B illustrates a side view of the ramp 3 when the ramp 3 is maintained in the stowed position by the locking mechanism 31, in accordance with an embodiment of the invention. Specifically, the ramp 3 is maintained in the stowed position when the head 17 of the adjustable screw 7B engages with the engagement surface 6A of the first recess 14 of the cam 6 to lock the locking mechanism 31. As shown in FIG. 8B, the head 17 of the adjustable screw 7B is in direct contact (e.g., flush) with the engagement surface 6A of the cam 6. The length of the arm 7A has been adjusted using the screw 7B such that there is no gap (i.e., no spacing) between the head 17 of the adjustable screw 7B and the engagement surface 6A of the cam 6 when the ramp 3 is maintained in the stowed position by the locking mechanism 31. As a result, the ramp 3 remains properly folded against the flipover 2.

The ramp 3 may be released (i.e., unlocked) from the stowed position by applying, and maintaining, a force F to the distal end 7AA of the adjustable locking arm 7A to push the distal end 7AA inside the channel 30C of the hinge member 11. The distal end 7AA rotates inside the channel 30C in direction X (e.g., clockwise in FIG. 8B) until the screw 7B is no longer in contact with the cam 6, allowing rotation of the hinge member 11 and the attached ramp 3. The distal end 7AA of the arm 7A contacts a stop member 30L of the hinge member 11, such that the stop member 30L limits the rotational range of the distal end 7AA.

Figure 9:
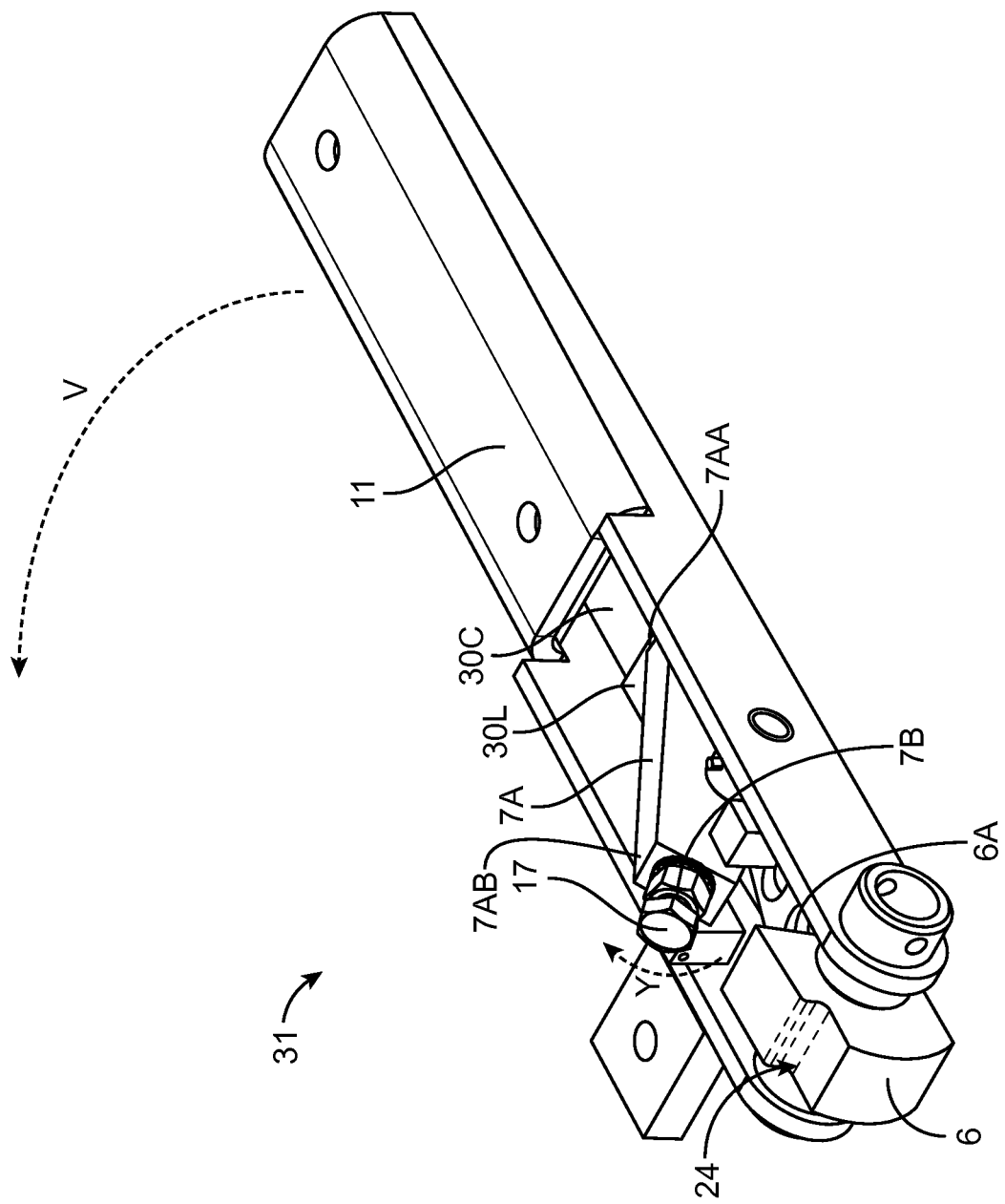
FIG. 9 illustrates a top perspective view of the locking assembly when the ramp is released from the stowed position, in accordance with an embodiment of the invention.

FIG. 9 illustrates a top perspective view of the locking assembly 31 when the locking arm 7A is unlocked such that the ramp 3 is released from the stowed position, in accordance with an embodiment of the invention. As the distal end 7AA of the adjustable locking arm 7A is pushed inside the channel 30C of the hinge member 11, the head 17 of the adjustable screw 7B disengages from the engagement surface 6A of the cam 6, and the adjustable screw 7B and the proximal end 7AB of the adjustable locking arm 7A rotate away from the cam 6 in direction Y (e.g., clockwise).

The ramp 3 is free to pivot relative to the flipover 2 when the locking assembly 31 is unlocked. For example, the ramp 3 may be positioned in the retention position by an operator rotating the ramp 3 in direction V (e.g., counter-clockwise) to a raised position, and ceasing the force F on the locking arm 7A, whereby the torsion spring 30S causes the arm 7A to pivot such that screw 7B engages locking engagement surface 6B of the cam 6, as shown by example in FIGS. 10, 11A and 11B.

Figure 10:
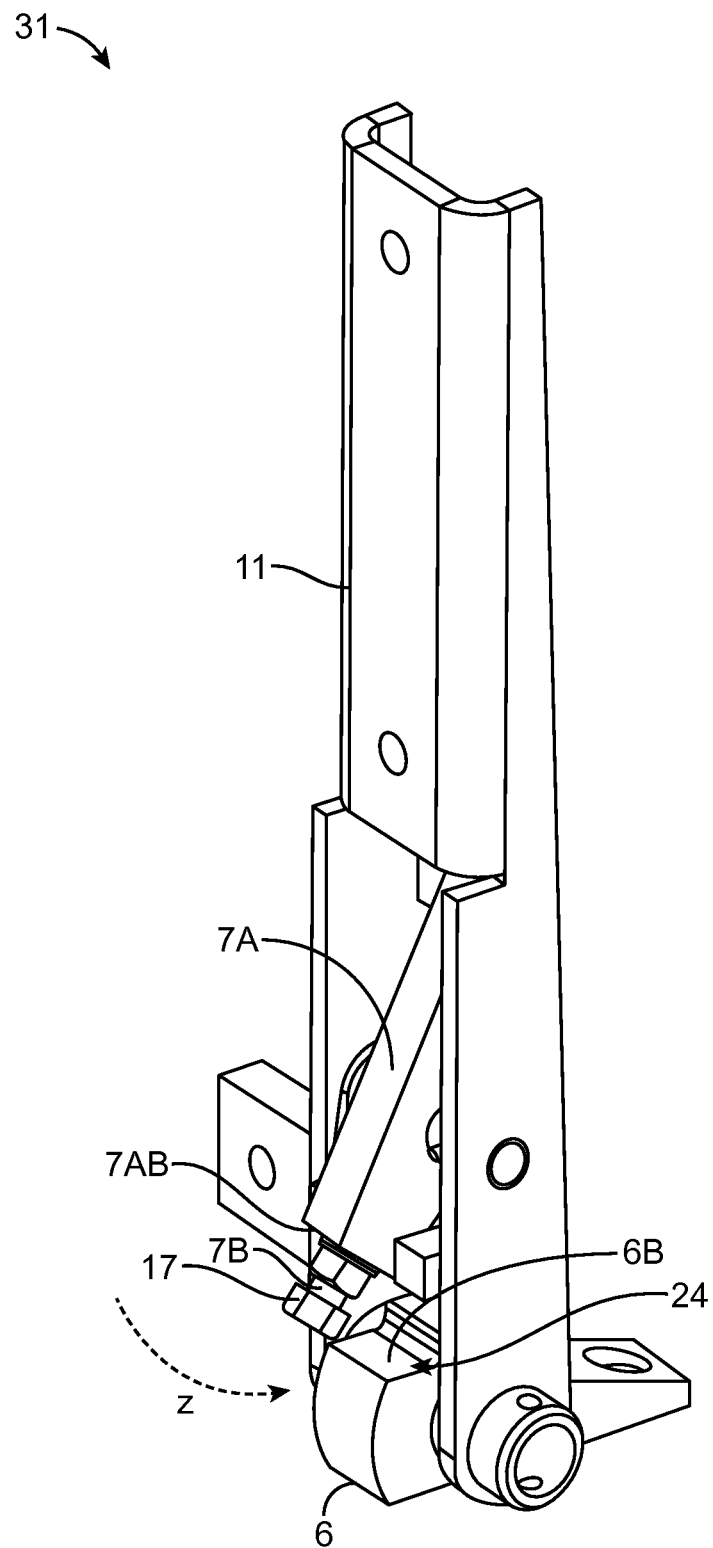
FIG. 10 illustrates a side perspective view of the locking assembly when the ramp is moved to the retention position, in accordance with an embodiment of the invention.

Specifically, FIG. 10 illustrates a side perspective view of the locking assembly 31 with the hinge member 11 (and the attached ramp 3) moved to the retention position, in accordance with an embodiment of the invention. The ramp 3 may be maintained in the retention position by removing the pressure F applied to the distal end 7AA of the adjustable locking arm 7A. When the pressure F is removed, the spring coil 30S biases the adjustable screw 7B and the proximal end 7AB of the adjustable locking arm 7A towards the cam member 6 in direction Z (e.g., counter-clockwise in FIG. 10), whereby the screw 7B of the arm 7A engages with engagement surface 6B of a second recess 24 of the cam 6 to maintain the ramp 3 in the retention position.

Figure 11A:
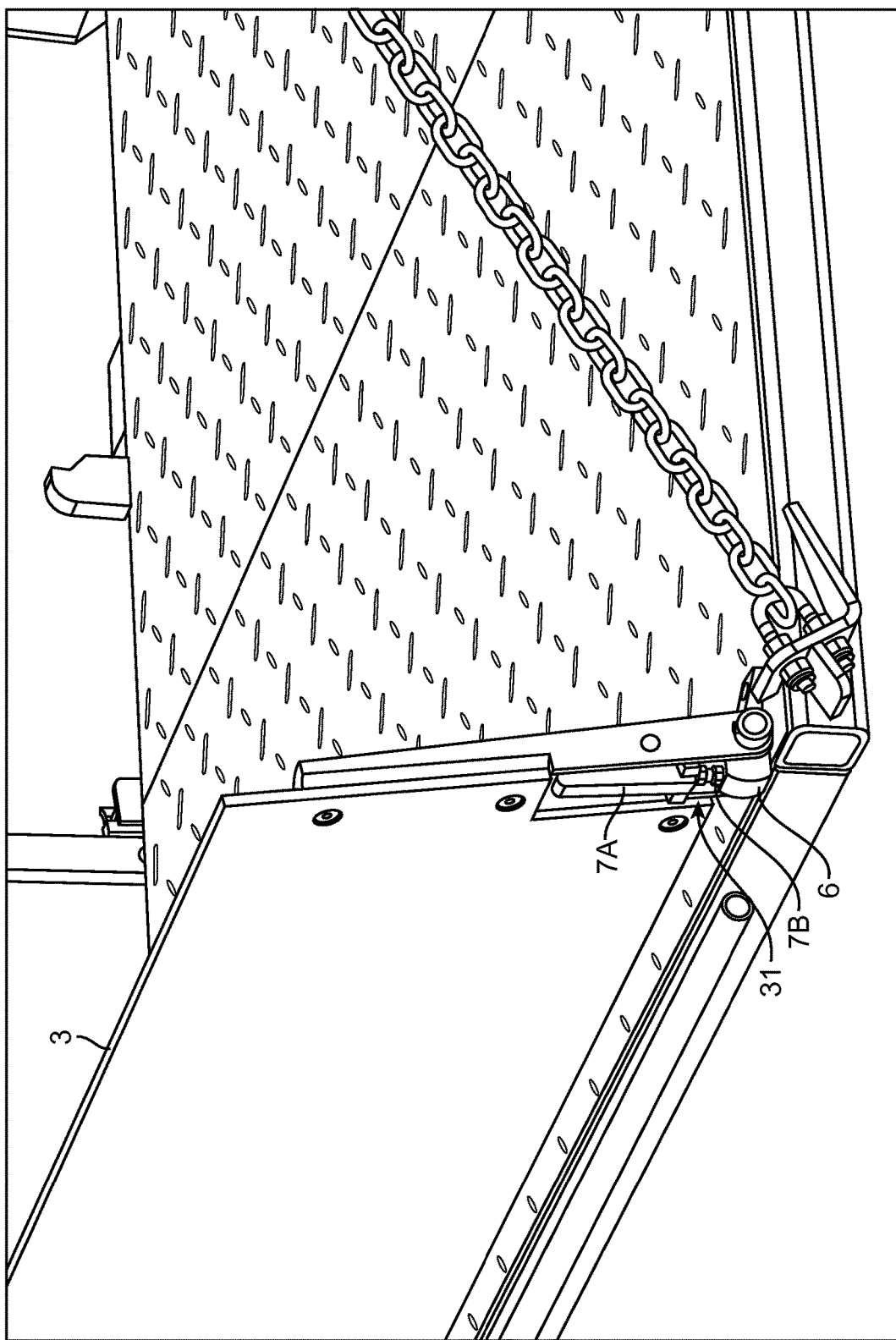
FIG. 11A illustrates a side perspective view of the ramp when the ramp is maintained in the retention position, in accordance with an embodiment of the invention.

FIG. 11A illustrates a side perspective view of the ramp 3 when the ramp 3 is maintained in the retention position, in accordance with an embodiment of the invention. In the retention position, the ramp 3 is substantially transverse to the flipover 2. The ramp 3 is maintained in the retention position when the adjustable screw 7B engages the second recess 24 of the cam 6, as shown in FIG. 11B.

Figure 11B:
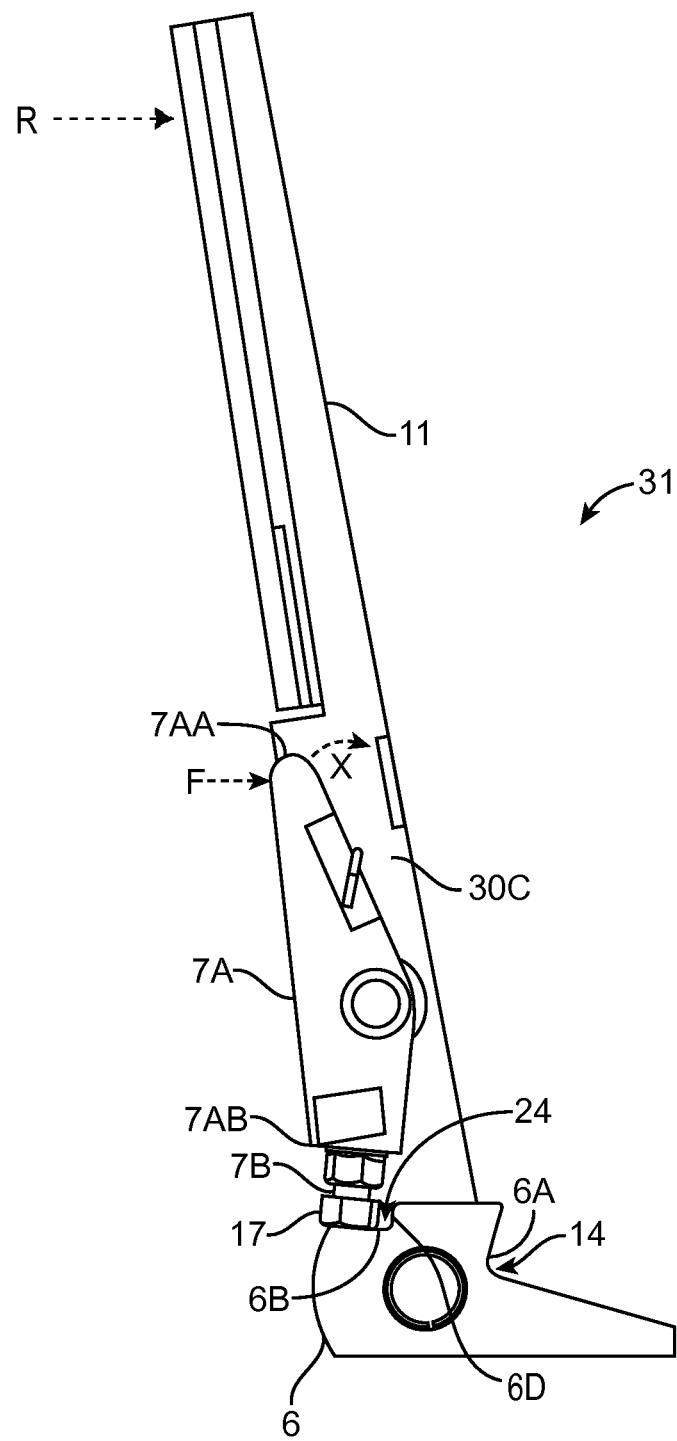
FIG. 11B illustrates a side view of the ramp when the ramp is maintained in the retention position, in accordance with an embodiment of the invention.

Specifically, FIG. 11B illustrates a side view of the ramp 3 when the ramp 3 is maintained in the retention position, in accordance with an embodiment of the invention. Specifically, the hinge member 11 supporting the ramp 3 is maintained in the retention position by the locking assembly 31 when the head 17 of the adjustable screw 7B engages with the engagement surface 6B of the second recess 24 of the cam 6. As shown in FIG. 11B, the head 17 of the adjustable screw 7B of the arm 7A is in direct contact (i.e., flush) with the engagement surface 6B of the cam 6. There is no gap (i.e., no spacing) between the head 17 of the adjustable screw 7B and the engagement surface 6B of the cam 6. In the retention position, the arm 7A maintains the hinge member 11 (and ramp 3) in a transverse angle relative the flipover 2, such that the ramp 3 cannot be rotated (e.g., to the ramp position) relative to the flipover 2 without disengaging the proximal end 7AB of the arm 7A from the recess 24.

The ramp 3 may be released from the retention position and rotated to the ramp position or the stowed position by applying a force F to the distal end 7AA of the adjustable locking arm 7A to push the distal end 7AA inside the channel 30C and unlock the locking arm 7A. The arm 7A pivots on axle 30L, such that distal end 7AA of the arm 7A rotates inside the channel 30C in direction X (e.g., clockwise) and the proximal end 7AB of the arm 7A rotates away and disengages from engagement surface 6B of the recess 24, while the force F is applied, as shown in FIG. 12.

In another embodiment, the ramp 3 is released from the retention position and rotated to the stowed position by applying a force R against the ramp 3 to rotate the ramp 3 to the stowed position relative to the flipover 2. The applied force R creates stress/tension between an engagement surface (e.g., engagement surface 6D) of the cam 6 and the adjustable screw 7B of the locking arm 7A. The stress/tension created overcomes the spring-loading biasing force of the spring 30S and rotates the distal end 7AA of the adjustable locking arm 7A inside the channel 30C in direction X (e.g., clockwise in FIG. 13B). The adjustable screw 7B and the proximal end 7AB of the adjustable locking arm 7A disengage from the recess 24 of the cam 6 as the distal end 7AA of the adjustable locking arm 7A rotates inside the channel 30C.

Figure 12:
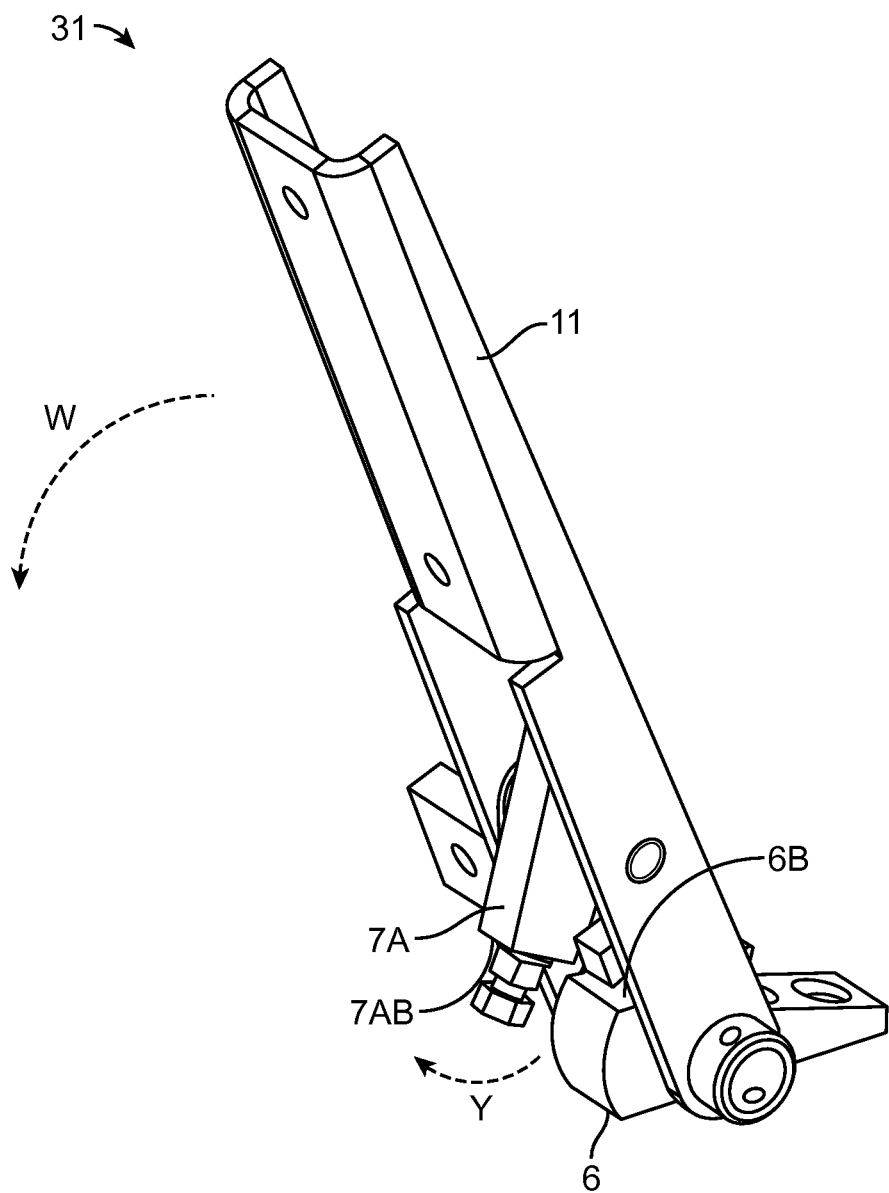
FIG. 12 illustrates a side perspective view of the locking assembly when the ramp is released from the retention position, in accordance with an embodiment of the invention.

FIG. 12 illustrates a side perspective view of the locking assembly 31 with the locking arm 7A unlocked, allowing the hinge member 11 (and the attached ramp 3) to rotate from the retention position towards the ramp position, as may be desired by an operator. In another example, with the locking arm 7A unlocked, the hinge member 11 (and the attached ramp 3) may also be rotated back toward the stowed position, as may be desired by an operator.

As the distal end 7AA of the adjustable locking arm 7A rotates inside the channel 30C of the hinge member 11, the head 17 of the adjustable screw 7B disengages from the engagement surface 6B of the cam 6, and the adjustable screw 7B and the proximal end 7AB of the adjustable locking arm 7A rotate away from the cam 6 in direction Y (e.g., clockwise in FIG. 12).

The hinge member 11 (and ramp 3) can pivot on pivot member 12 relative to the flipover 2 when the locking arm 7A is unlocked. For example, the ramp 3 may be positioned in the ramp position by rotating the ramp 3 in direction W to a lowered position. As another example, the ramp 3 may be positioned in the stowed position by rotating the ramp 3 in a direction opposite of W, as noted above.

FIG. 13A illustrates a top perspective view of the ramp 3 in the ramp position and maintained in that position by the locking arm 7A, in accordance with an embodiment of the invention. The ramp 3 is substantially aligned with the flipover 2 when the ramp 3 is in the ramp position. The ramp 3 is maintained in the ramp position when the force F is removed, allowing the spring 30S to pivot the locking arm 7A on axle 30L, such that adjustable screw 7B may essentially engage with engagement surface 6C of the cam 6 (FIG. 13B).

Figure 13B:
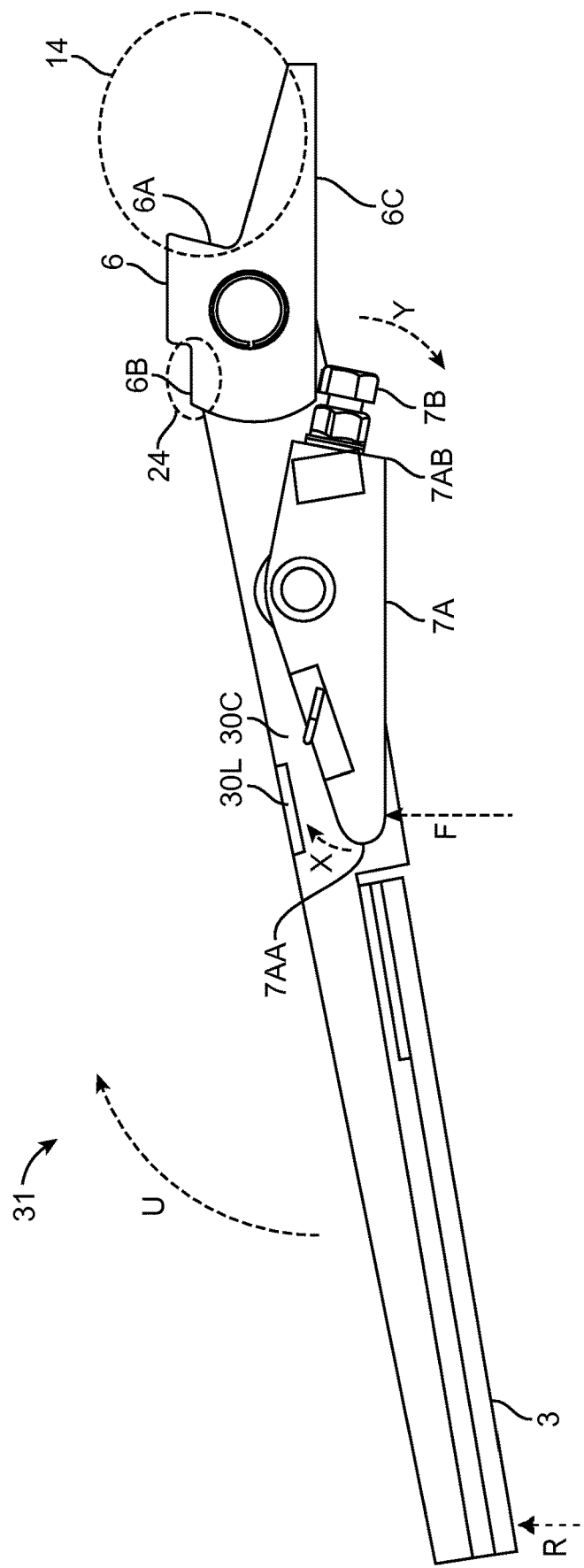
FIG. 13B illustrates a side view of the ramp when the ramp is maintained in the ramp position, in accordance with an embodiment of the invention.

FIG. 13B illustrates a side view of the ramp 3 maintained in the ramp position when the locking arm 7A is locked, in accordance with an embodiment of the invention. The adjustable screw 7B is positioned underneath the cam 6 when the ramp 3 is rotated to the ramp position. When the pressure F is removed from the distal end 7AA of the adjustable locking arm 7A, the spring coil 30S biases the adjustable screw 7B and the proximal end 7AB of the adjustable locking arm 7A towards the cam 6 to maintain the ramp 3 in the ramp position. In one embodiment, the adjustable screw 7B rests against engagement surface 6C of the cam 6, as shown in FIG. 13B.

In one embodiment, the ramp 3 is released from the ramp position by applying a force F to the distal end 7AA of the adjustable locking arm 7A to overcome the spring-loading biasing force of the spring 30S and pivot the arm 7A on the axle 30L, such that the distal end 7AA rotates inside the channel 30C. As the distal end 7AA of the adjustable locking arm 7A rotates inside the channel 30C in direction X (e.g., clockwise in FIG. 13B), the adjustable screw 7B and the proximal end 7AB of the adjustable locking arm 7A rotates away from the cam 6 in direction Y (e.g., clockwise in FIG. 13B).

The ramp 3 is free to rotate relative to the flipover 2 when the locking arm 7A is unlocked from the cam 6. For example, the ramp 3 may be moved to the retention position or the stowed position by rotating the ramp 3 in direction U relative to the flipover 2.

In another embodiment, the ramp 3 is released from the ramp position by applying a force R against the ramp 3 to rotate the ramp 3 to the retention position or the stowed position. As the ramp 3 rotates in direction U to the retention position or the stowed position, the applied force R creates stress/tension between the engagement surface 6C of the cam 6 and the adjustable screw 7B of the locking arm 7A. The stress/tension created overcomes the spring-loading biasing force of the spring 30S and rotates the distal end 7AA of the adjustable locking arm 7A inside the channel 30C in direction X (e.g., clockwise in FIG. 13B). The adjustable screw 7B and the proximal end 7AB of the adjustable locking arm 7A rotate away from the engagement surface 6C of the cam 6 in direction Y (e.g., clockwise in FIG. 13B) as the distal end 7AA of the adjustable locking arm 7A rotates inside the channel 30C.

Figure 14:
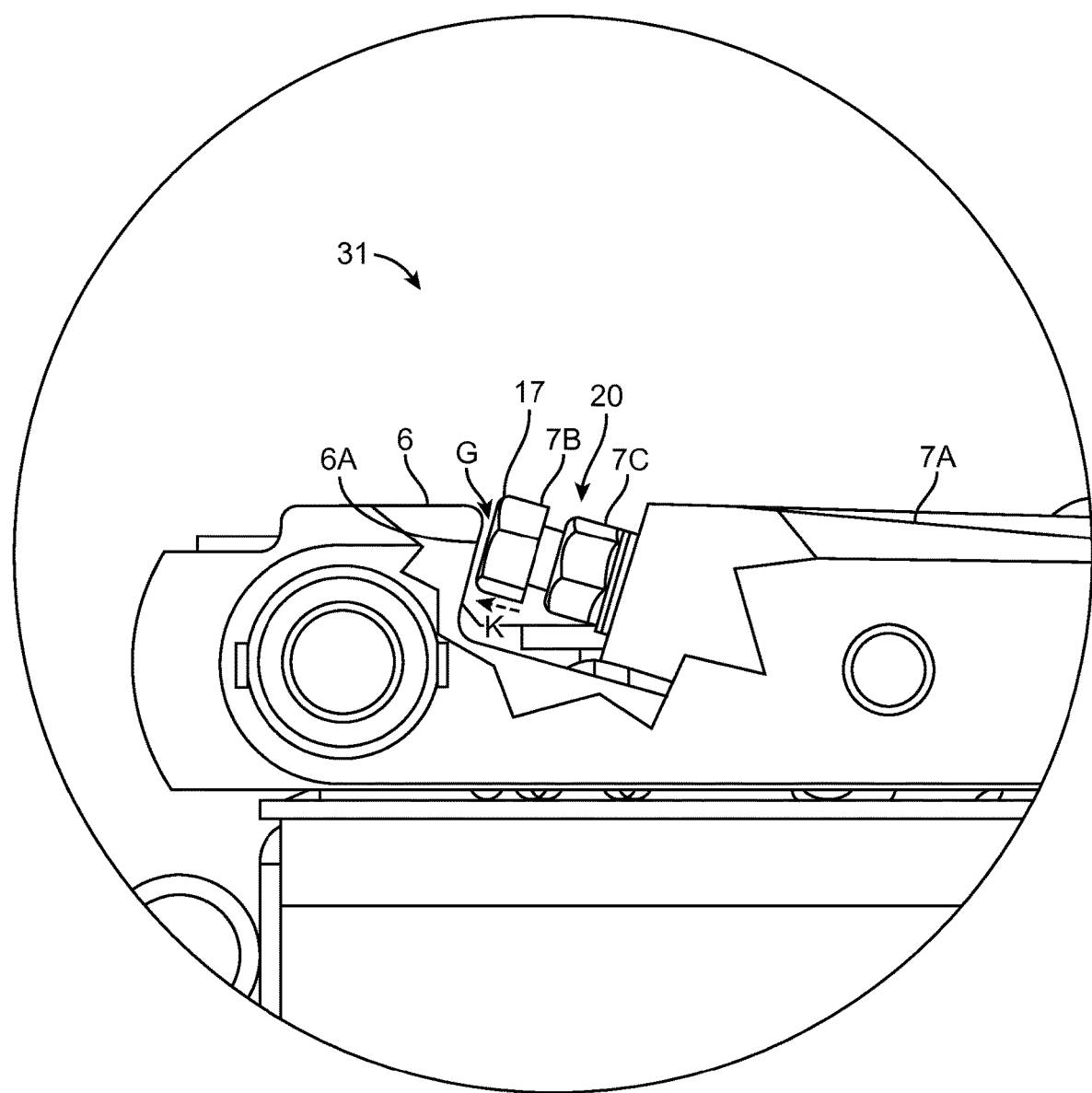
FIG. 14 illustrates a side view of the locking mechanism when the ramp is maintained in the stowed position, in accordance with an embodiment of the invention.

FIG. 14 illustrates a side view of the locking mechanism 20 of the locking assembly 31 when the locking arm 7A engages engagement surface 6A of the cam 6 to maintain the ramp 3 in the stowed position, in accordance with an embodiment of the invention. Repeated engagement of the adjustable screw 7B and the adjustable locking arm 7A with the cam 6 to maintain the ramp 3 in a selected position causes wear and tear to the adjustable screw 7B of the adjustable locking arm 7A, or the cam 6. Further, repeatedly disengaging the adjustable screw 7B and the adjustable locking arm 7A from the cam 6 to release the ramp 3 from a selected position may also cause wear and tear to the adjustable screw 7B, the adjustable locking arm 7A, or the cam 6.

As a result of wear and tear to the locking mechanism 20, a gap G may develop between the cam 6 and the adjustable screw 7B when the adjustable locking arm 7A is biased by the spring coil 30S to lock the arm 7A and maintain the ramp 3 in a selected position, such as the stowed position. FIG. 14 shows a gap G between the engagement surface 6A of the cam 6 and the head 17 of the adjustable screw 7B when the adjustable locking arm 7A is biased by the spring coil 30S to lock the arm 7A and maintain the ramp 3 in the stowed position. The gap G may be due to said wear and tear, or other reasons, such as needs to adjusting the length of the locking arm 7A to maintain a proper engagement between the arm 7A and the cam 6. The gap G prevents adjustable screw 7B from properly engaging with the engagement surface 6A of the cam 6. As a result, the ramp 3 may jut out relative to the flipover 2 when the lift platform 100 is in the stowed position, as shown in FIG. 5C.

According to embodiments of the invention, the gap G may be minimized or closed by adjusting the adjustable screw 7B. Specifically, the securing nut 7C is loosened to allow the body 16 of the adjustable screw 7B to be partially unscrewed from the cavity 7AH (FIG. 7I) of the adjustable locking arm 7A. As the body 16 of the adjustable screw 7B is unscrewed, the head 17 of the adjustable screw 7B moves towards the cam 6 in direction K to minimize or close the gap G (essentially lengthening the arm 7A). The adjustable screw 7B is adjusted until the head 17 of the adjustable screw 7B is in direct contact with the cam 6, and the ramp 3 is properly folded against the flipover 2 (as in FIGS. 4A-4B). Once the gap G is closed, the securing nut 7C is tightened to secure the adjustable screw 7B to the adjustable locking arm 7A. Closing the gap G reduces/eliminates the ramp 3 from jutting out relative to the flipover 2 when the ramp 3 is maintained in the stowed position.

Figure 15:
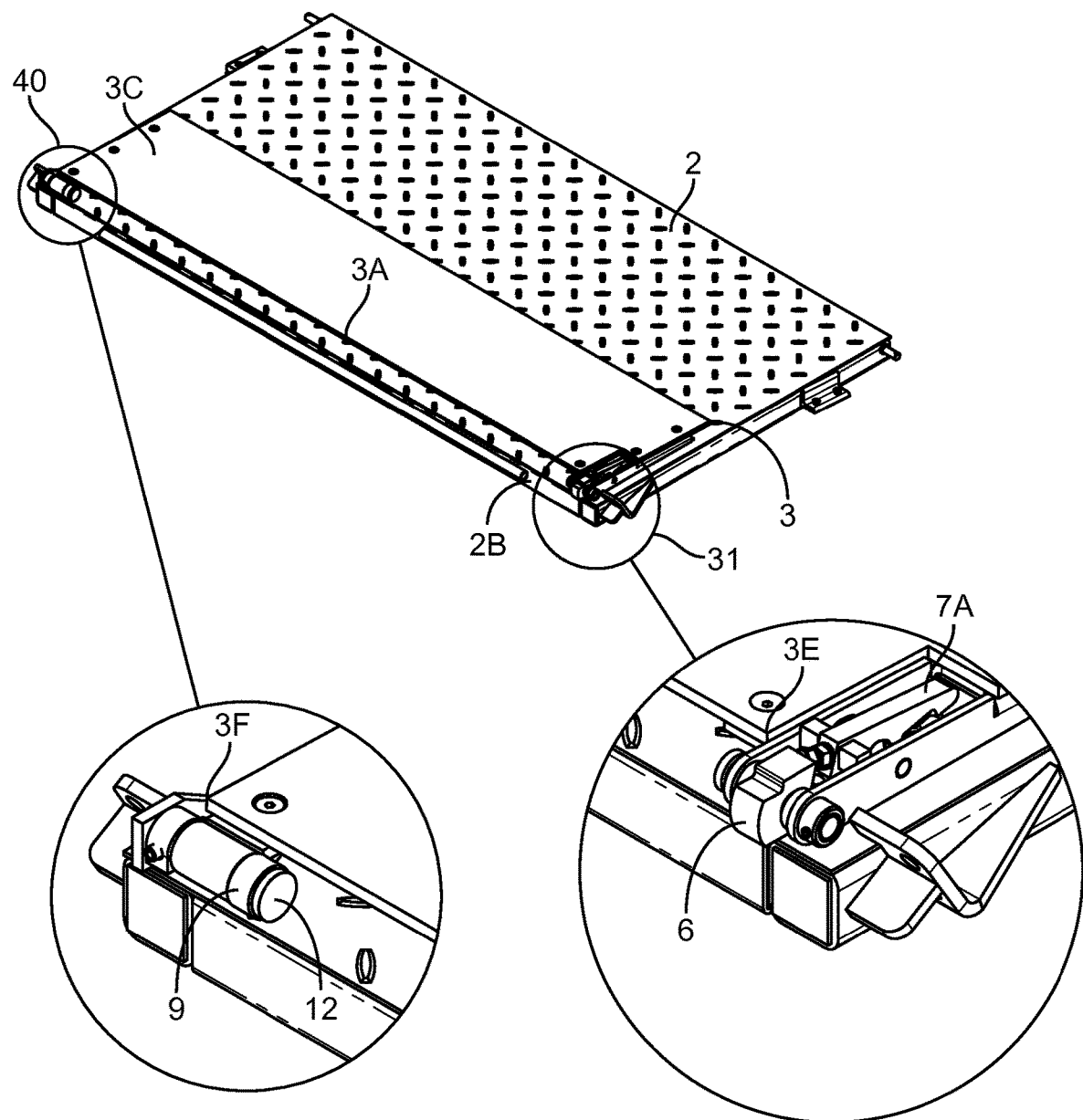
FIG. 15 illustrates a top perspective view of an example locking assembly and an example hinge assembly that pivotally couples the ramp to the flipover, in accordance with an embodiment of the invention.

FIG. 15 illustrates a top perspective view of an example locking assembly 31 and a hinge assembly 40 that pivotally couple the ramp 3 to the flipover 2, in accordance with an embodiment of the invention. In one embodiment, the first edge 3A of the ramp 3 is pivotally coupled to the second edge 2B of the flipover 2 via a locking assembly 31 at one end 3E and a hinge assembly 40 at opposing end 3F of the ramp 3 (the locking assembly 31 and the hinge assembly 40 are disposed at opposite ends 3E of the first edge 3A). In this embodiment, the lift gate 10 includes one locking assembly for the ramp 3.

The hinge assembly 40 comprises a hinge member 9 that is coupled to the top side 3D of the ramp 3 using at least one fastener 8. The hinge assembly 40 further includes at least pivot member 12 that enables the ramp 3 to pivot relative to the flipover 2.

Figure 16:
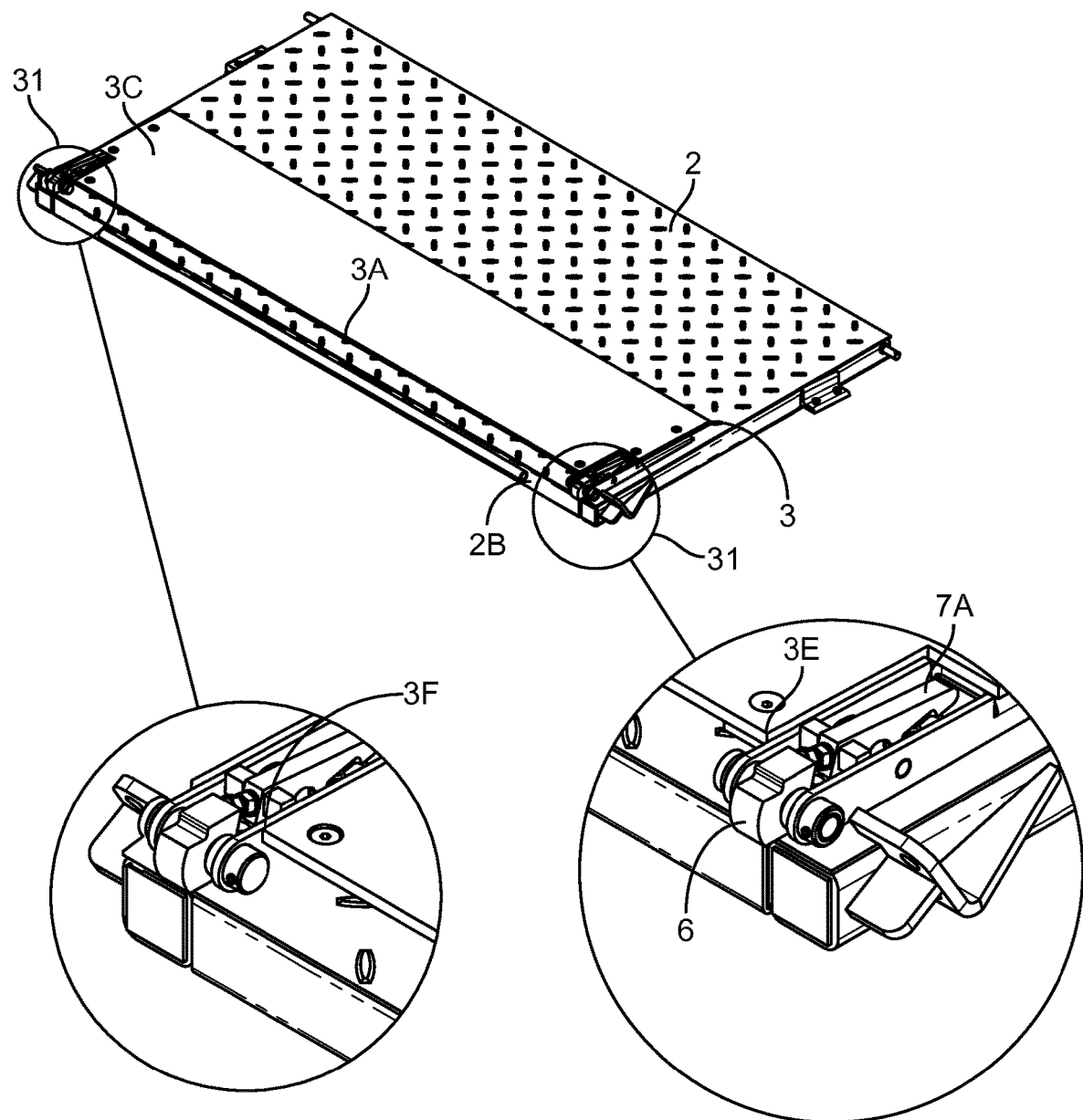
FIG. 16 illustrates a top perspective view of example locking assemblies that pivotally couple the ramp to the flipover, in accordance with an embodiment of the invention.

FIG. 16 illustrates another embodiment of a lift gate including a pair of locking assemblies for the ramp 3, according to an embodiment of the invention. FIG. 16 shows locking assemblies 31 that pivotally couple the ramp 3 to the flipover 2, wherein the first edge 3A of the ramp 3 is pivotally coupled to the second edge 2B of the flipover 2 via a pair of locking assemblies 31, wherein a locking assembly 31 is disposed at one end 3E of the first edge 3A of the ramp 3, and another locking assembly 31 is disposed at one end 3F of the second edge 3A of the ramp 3.

In another embodiment of the invention, an adjusting mechanism may include at least one adjustable screw 7B is driven inside the cam 6 instead. In yet another embodiment, the proximal end 7AB of the adjustable locking arm 7A includes a first adjustable screw 7B, and the cam 6 also has at least one adjustable screw 7B. Embodiments of the invention are useful in different types of lift gate systems.

Figure 17A:
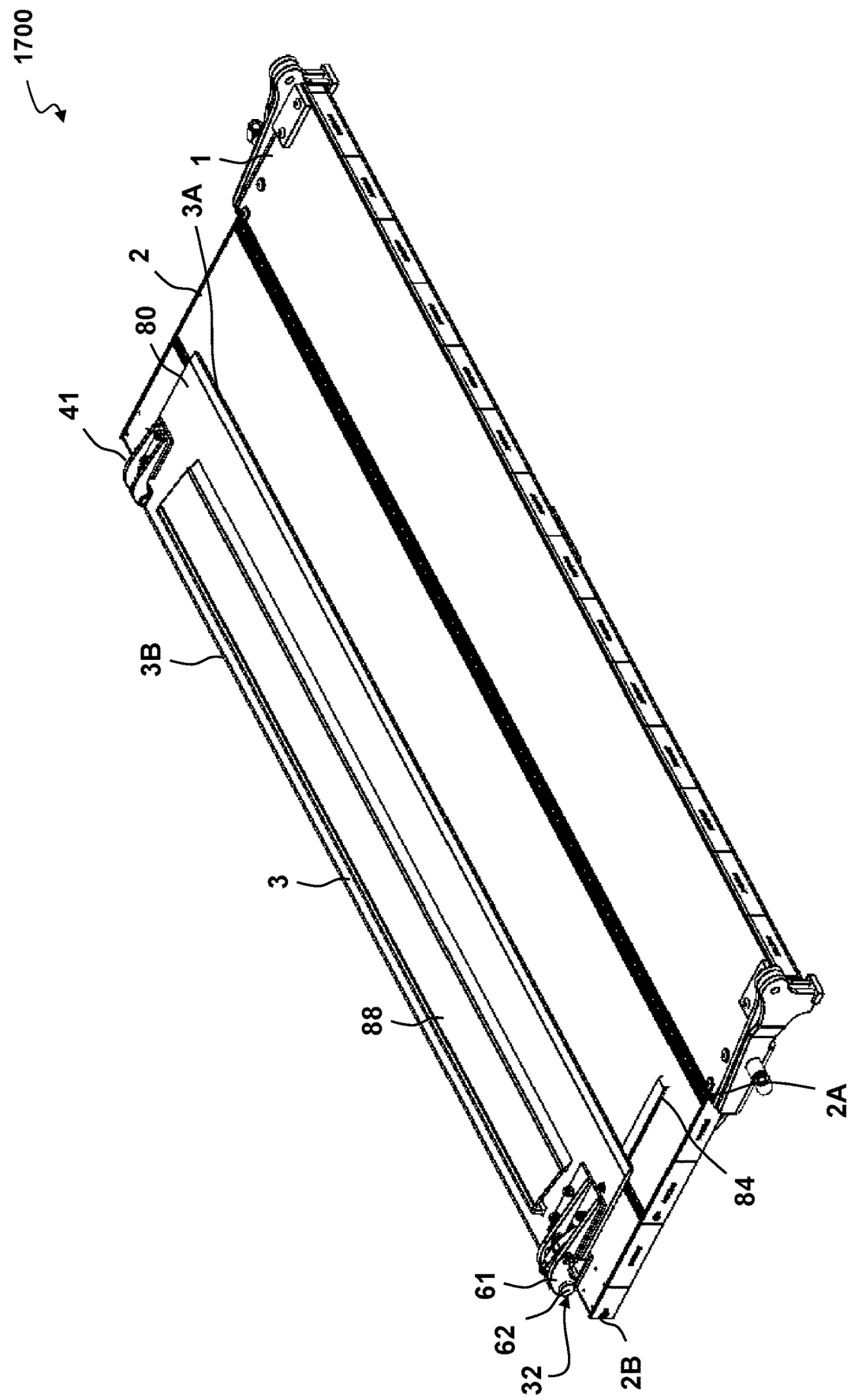
FIG. 17A illustrates a perspective view of the ramp in a stowed position relative to the flipover, in accordance with an embodiment of the invention.
Figure 17B:
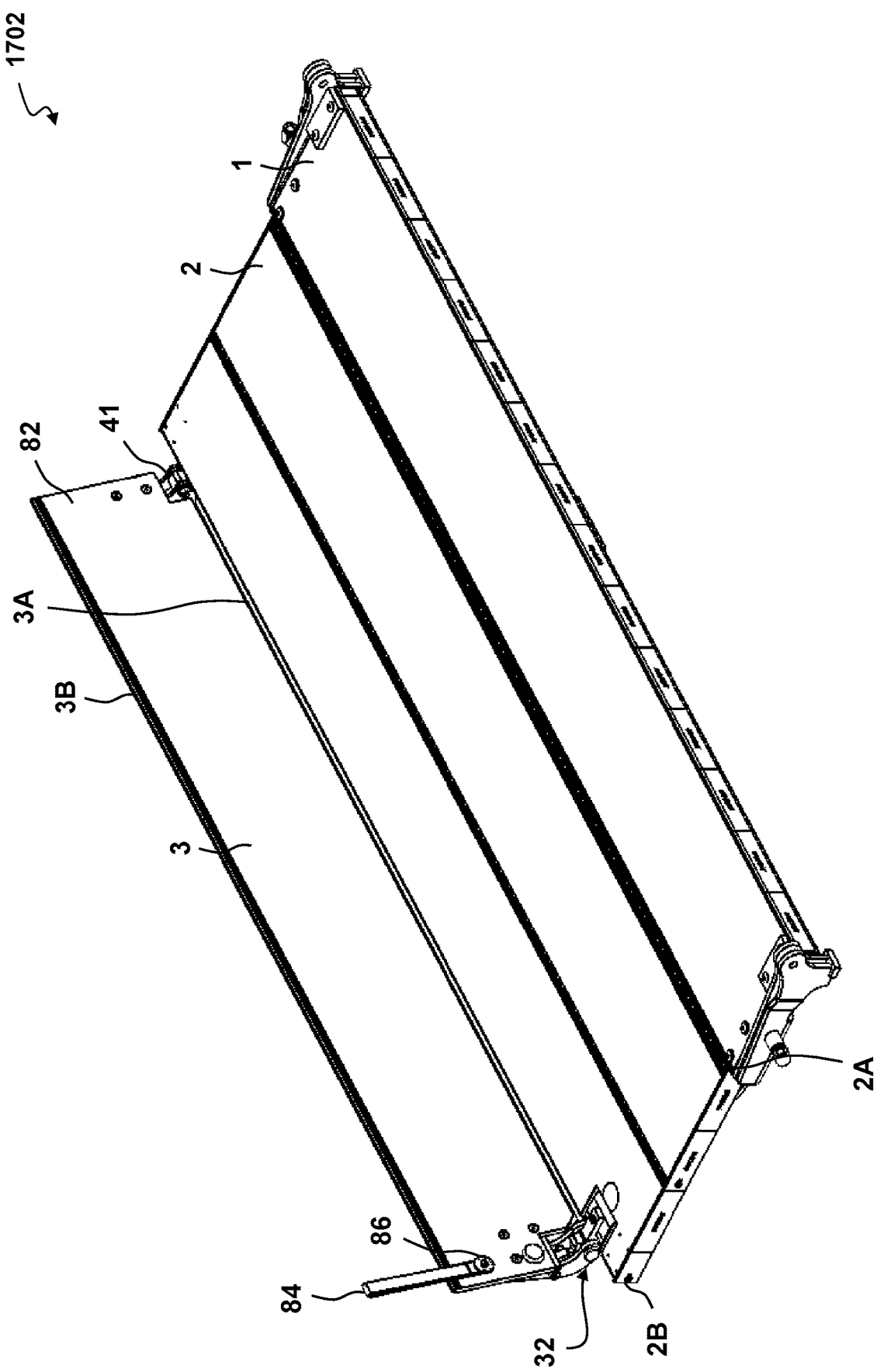
FIG. 17B illustrates a perspective view of the ramp in a retention position relative to the flipover, in accordance with an embodiment of the invention.
Figure 17C:
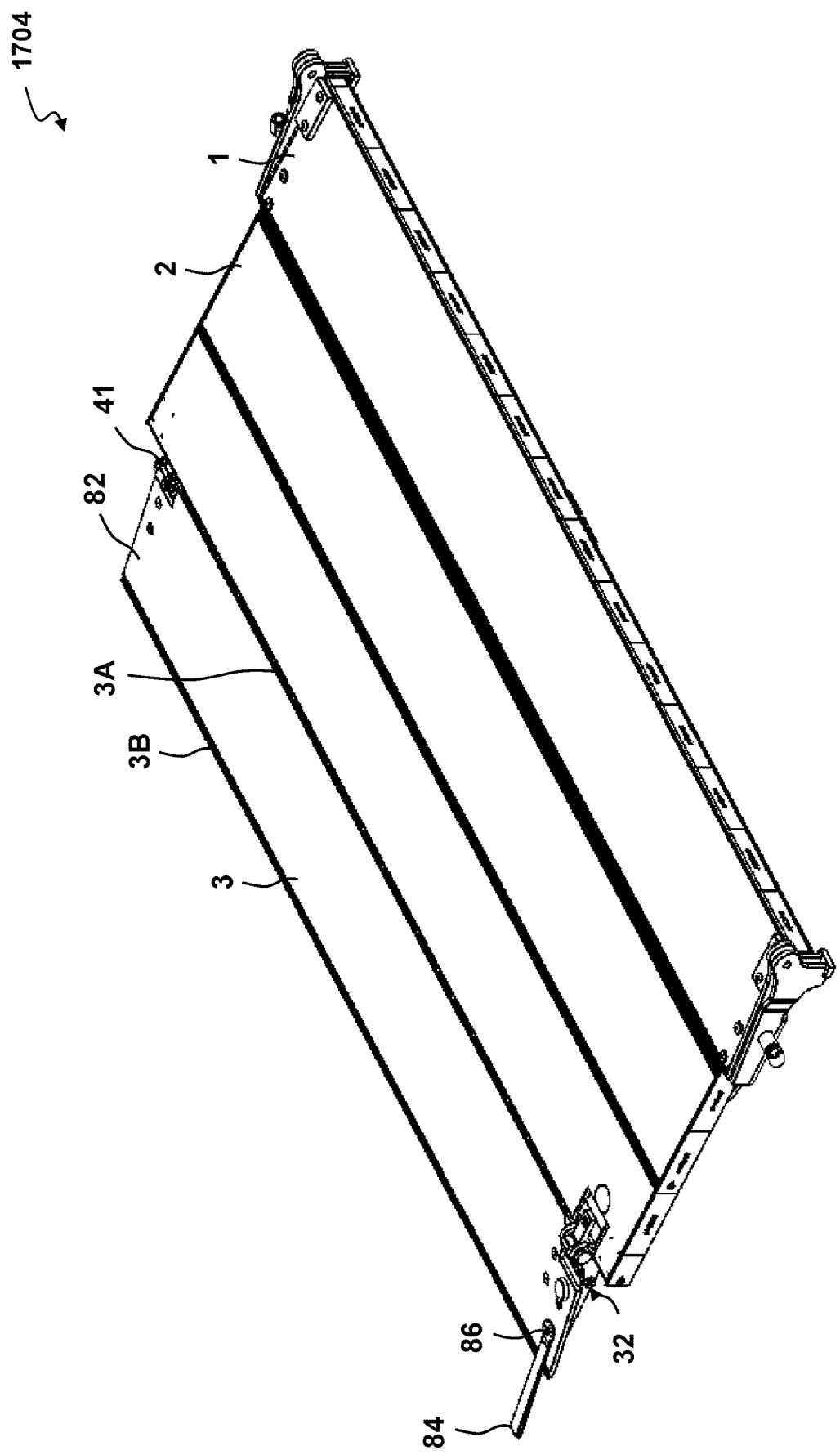
FIG. 17C illustrates a perspective view of the ramp in a ramp position relative to the flipover, in accordance with an embodiment of the invention.

FIG. 17A illustrates a perspective view of the ramp 3 in a stowed position 1700 relative to the lift platform section 2 such as a flipover, in accordance with an embodiment of the invention. FIG. 17B illustrates a perspective view of the ramp 3 in a retention position 1702 relative to the flipover 2, in accordance with an embodiment of the invention. FIG. 17C illustrates a perspective view of the ramp 3 in a ramp position 1704 relative to the flipover 2, in accordance with an embodiment of the invention.

The lift platform is shown in an unfolded position, wherein the lift platform may be attached to and/or substantially aligned with a vehicle bed when the lift platform 100 is in the raised position. The lift platform may include at least one load-carrying surface including a platform section 1, a foldable section ("flipover") 2, and/or a retention ramp section ("ramp") 3. The flipover 2 may include the platform section 1 and the flipover 2.

The platform section 1 may have a first edge and a second edge that is opposite of the first edge. The flipover 2 may have a first edge 2A and a second edge 2B that is opposite of the first edge 2A. The first edge 2A of the flipover 2 may be pivotally coupled to the second edge of the platform section 1. The ramp 3 may have a first edge 3A and a second edge 3B that is opposite of the first edge 3A. The first edge 3A of the ramp 3 may be pivotally coupled to the second edge 2B of the flipover 2 via at least one locking assembly 32. In one embodiment, the first edge 3A of the ramp 3 may be pivotally coupled to the second edge 2B of the flipover 2 via the locking assembly 32 at one side and a hinge assembly 41 at another side. The locking assembly 32 and the hinge assembly 41 may be disposed at opposite ends (sides), respectively, of the first edge 3A. In another embodiment, the first edge 3A of the ramp 3 may be pivotally coupled to the second edge 2B of the flipover 2 via a pair of locking assemblies 32. Each locking assembly 32 may be disposed at an opposite end of the first edge 3A of the ramp 3.

The ramp 3 may be connected to a coupling member that comprises a hinge member 61 for rotatably coupling the ramp 3 to the flipover 2. The coupling member may further include a pivot member 62 such as an axle pin for rotatably disposing the hinge member 61 relative to the flipover 2, thereby enabling the hinge member 61 (and the attached ramp 3) to freely rotate relative to the flipover 2 when the locking assembly 32 is unlocked, as described herein.

The ramp 3 may have a first surface 80 and a second surface 82. The first surface 80 may be disposed opposite from the second surface 82. The first surface 80 may be disposed distal from the lift platform section 2 in the stowed position 1700. The second surface 82 may be proximate and/or in contact with the lift platform section 2 in the stowed position. The second surface 82 may be proximate the flipover 2 in the stowed position 1700, as shown in FIG. 17A. The second surface 82 may be aligned with a top surface of the flipover 2 and form an extension of the top surface of the flipover in the ramp position 1704, as shown in FIGS. 17A-17C. The locking assembly 32 and/or the hinge assembly 41 may be attached to the first surface 80 of the ramp 3 such that the second surface 82 of the ramp is unobstructed in the ramp position 1704.

A handle 84 may be attached to the ramp 3 via a handle attachment point 86, such as a rivet, bolt, adhesive, or the like. In some embodiments, the handle attachment point 86 may be disposed on the second surface 82 of the ramp 3. In other embodiments, the handle attachment point 86 may be disposed proximate the second edge 3B of the ramp 3. The handle 84 may be used to rotate the ramp 3 between the stowed position 1700, the retention position 1702, and/or the ramp position 1704. The handle 84 may allow a user or operator to control a speed of rotation of the ramp 3 between the stowed position 1700, the retention position 1702, and/or the ramp position 1704. In some embodiments, the ramp 3 may be locked at the stowed position 1700, the retention position 1702, and/or the ramp position 1704 to prevent movement of the ramp 3.

An angled bracket 88 may be disposed on the first surface 80 of the ramp 3. The angled bracket 88 may be angled such that the angled bracket 88 protrudes farther from the first surface of the ramp proximate the second edge 3B of ramp. The angled bracket 88 may contact the ground or other surface in the ramp position 1704. In some embodiments, the angled bracket 88 may provide support to the ramp 3, such as when objects are being loaded onto the lift platform via travel from the ground or other surface, over the second surface 82 of the ramp 3, and onto the flipover 2. In other embodiments, the angled bracket 88 may make the ramp 3 sturdier. The angled bracket 88 may prevent the ramp 3 from potentially bending when it is impacted, such as by a cart.

Figure 18A:
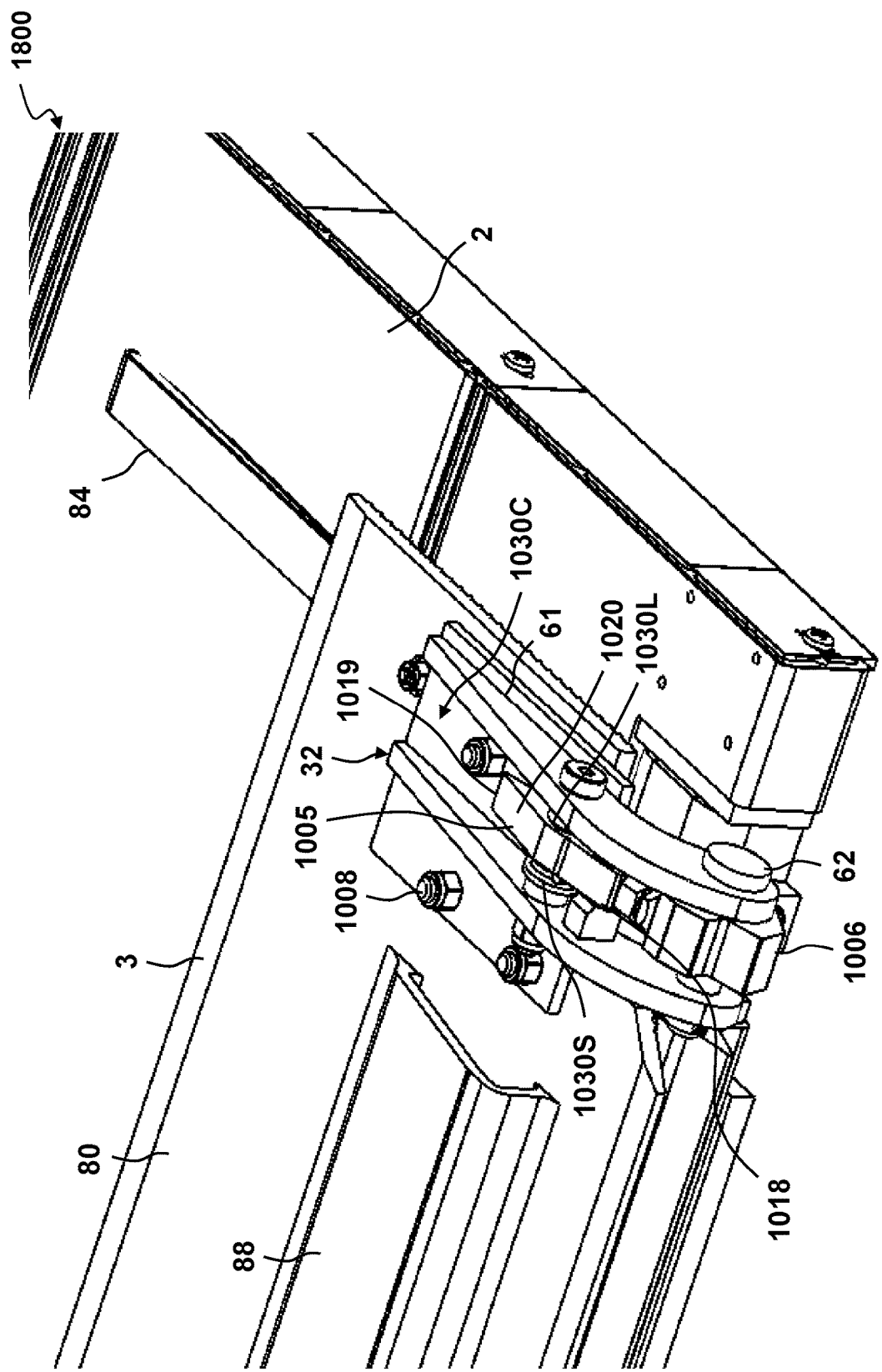
FIG. 18A illustrates a perspective close-up view of the ramp in a locked stowed position relative to the flipover, in accordance with an embodiment of the invention.

FIG. 18A illustrates a perspective close-up view of the ramp 3 in a locked stowed position 1800 relative to the flipover 2, in accordance with an embodiment of the invention. The locking assembly 32 includes a hinge arm member ("hinge member") 61 coupled to the first surface 80 of the ramp 3 using at least one fastener 1008, such as a bolt, screw, threadable fastener, adhesive, weld, or the like. The hinge member 61 includes a channel 1030C.

The locking assembly 32 further includes a locking mechanism 1020 for maintaining the ramp 3 in a selected position (e.g., a ramp position as shown in FIG. 17C, a retention position as shown in FIG. 17B, or a stowed position as shown in FIG. 17A) when the locking assembly 32 is locked. The locking mechanism 1020 may be disposed within the channel 1030C of the hinge member 61. In one embodiment, the locking mechanism 1020 may include an elongated locking arm member ("locking arm") 1005, a resilient member 1030S such as a spring coil, and a pivot point 1030L, such as a pivot axle, disposed on the opposing walls of the channel 1030C. The elongated locking arm 1005 may have a first end 1018 and a second end 1019 that is distal from the first end 1018. In relation to the cam 1006, the first end 1018 and the second end 1019 of the locking arm 1005 may be the proximal end and the distal end of the locking arm 1005, respectively.

A cam member/portion ("cam") 1006 may be fixedly attached to the flipover 2, such that the hinge member 61 (and the attached ramp 3) may be rotatable on pivot member 62 relative to the cam 1006 (and the flipover 2) when the locking assembly 32 is unlocked. The cam 1006 may include different portions or locking engagement surfaces for engaging with the first end 1018 of the locking arm 1005 to lock the locking assembly 32 and maintain the ramp 3 in a selected position. The locking arm 1005 may be pivotably mounted on the pivot axle 1030L, such that the locking arm 1005 pivots on the axle 1030L in relation to the channel 1030C of the hinge member 61. The resilient member 1030S may be a torsion spring, which may be disposed concentric with the pivot axle 1030L, with one end engaging the locking arm 1005 and another end engaging a portion of the channel 1030C. In other embodiments, the resilient member 1030S may be any tension device that maintains and/or returns the locking arm 1005 to a set position relative to the hinge member 61. The resilient member 1030S may normally be in torsion and pivot the locking arm 1005 on the axle 1030L to move the proximal end 1018 of the locking arm 1005 downwardly into the channel 1030C and urged onto the cam 1006. As such, the resilient member 1030S may always be exerting a biasing force on the locking arm 1005 such that the first end 1018 of the locking arm 1005 may be spring-loaded on the cam 1006.

The ramp 3 may be maintained in a selected position when the locking arm 1005 engages with an engagement surface of the cam 1006 to lock the locking assembly 32. For example, the ramp 3 may be maintained in the stowed position when the proximal end 1018 of the locking arm 1005 engages a first recess portion of the cam 1006. The proximal end 1018 may be in direct contact (i.e., flush) with an engagement surface of the first recess of the cam 1006 when the ramp 3 is maintained in the stowed position. This prevents rotation of the hinge member 61 and the attached ramp 3 on the pivot member 62 away from the flipover 2, thereby maintaining the ramp 3 in the stowed position.

Figure 18B:
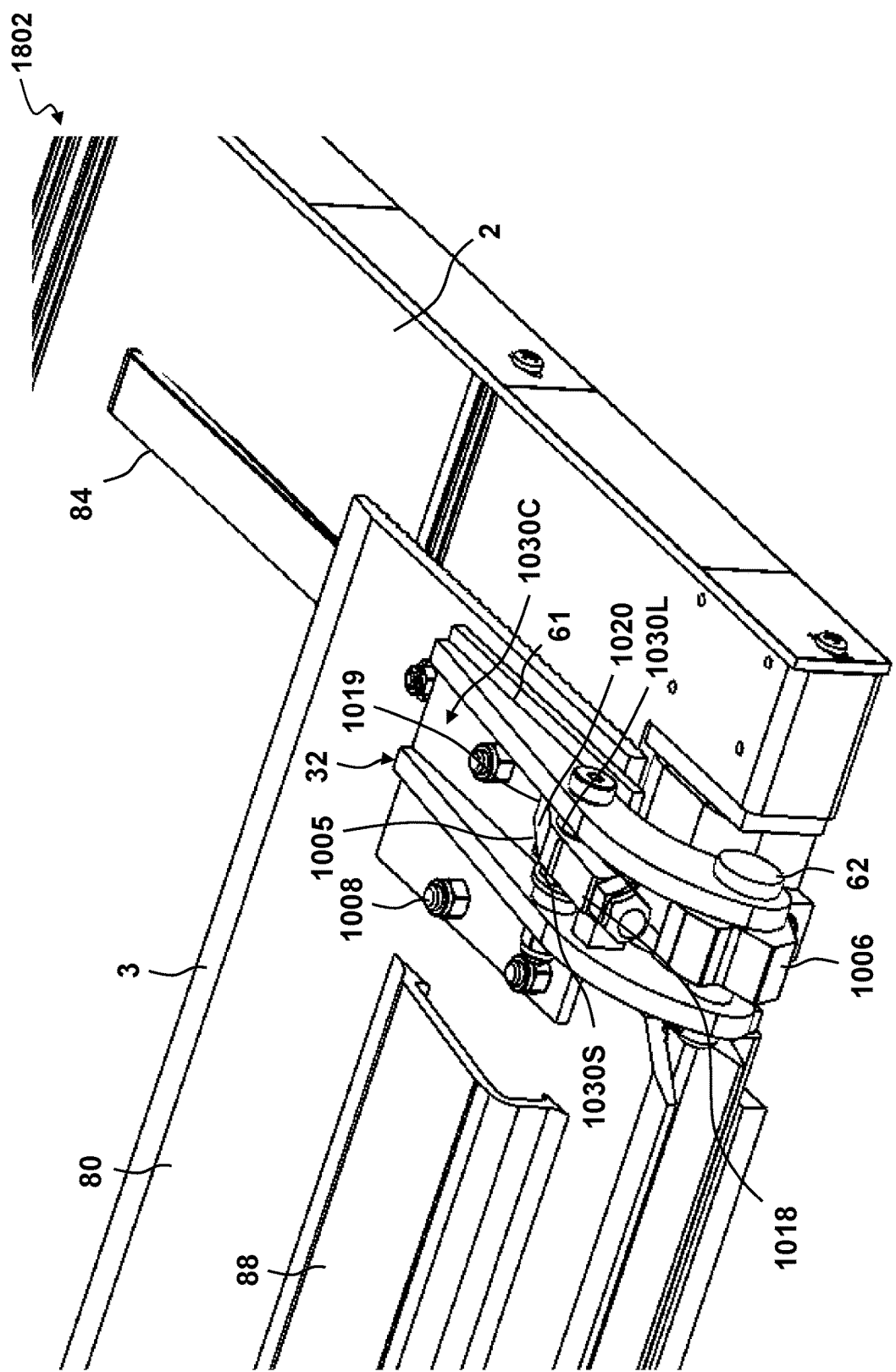
FIG. 18B illustrates a perspective close-up view of the ramp in an unlocked stowed position relative to the flipover, in accordance with an embodiment of the invention.

FIG. 18B illustrates a perspective close-up view of the ramp in an unlocked stowed position 1802 relative to the flipover, in accordance with an embodiment of the invention. To release (i.e., unlock) the ramp 3 from a selected position, a force may be applied to the distal end 1019 of the locking arm 1005 to overcome the biasing torsion of the resilient member 1030S, such as a spring coil, and push the distal end 1019 downward into the channel 1030C of the hinge member 61. As the distal end 1019 rotates inside the channel 1030C such that the distal end 1019 is moved toward the ramp 3, the proximal end 1018 of the locking arm 5 disengages from the first recess of the cam 1006 and rotates away from the cam 1006 such that the proximal end 1018 is moved away from the ramp 3.

Generally, when the proximal end 1018 of the locking arm 1005 is disengaged from the cam 1006, this unlocks the locking assembly 32 and the ramp 3 is free to rotate relative to the flipover 2 on the pivot member 62 while the force is maintained on the locking arm 1005 to maintain the proximal end 1018 of the locking arm 1005 disengaged from the cam 1006. For example, a user or operator can rotate the ramp 3 relative to the flipover 2.

Figure 18C:
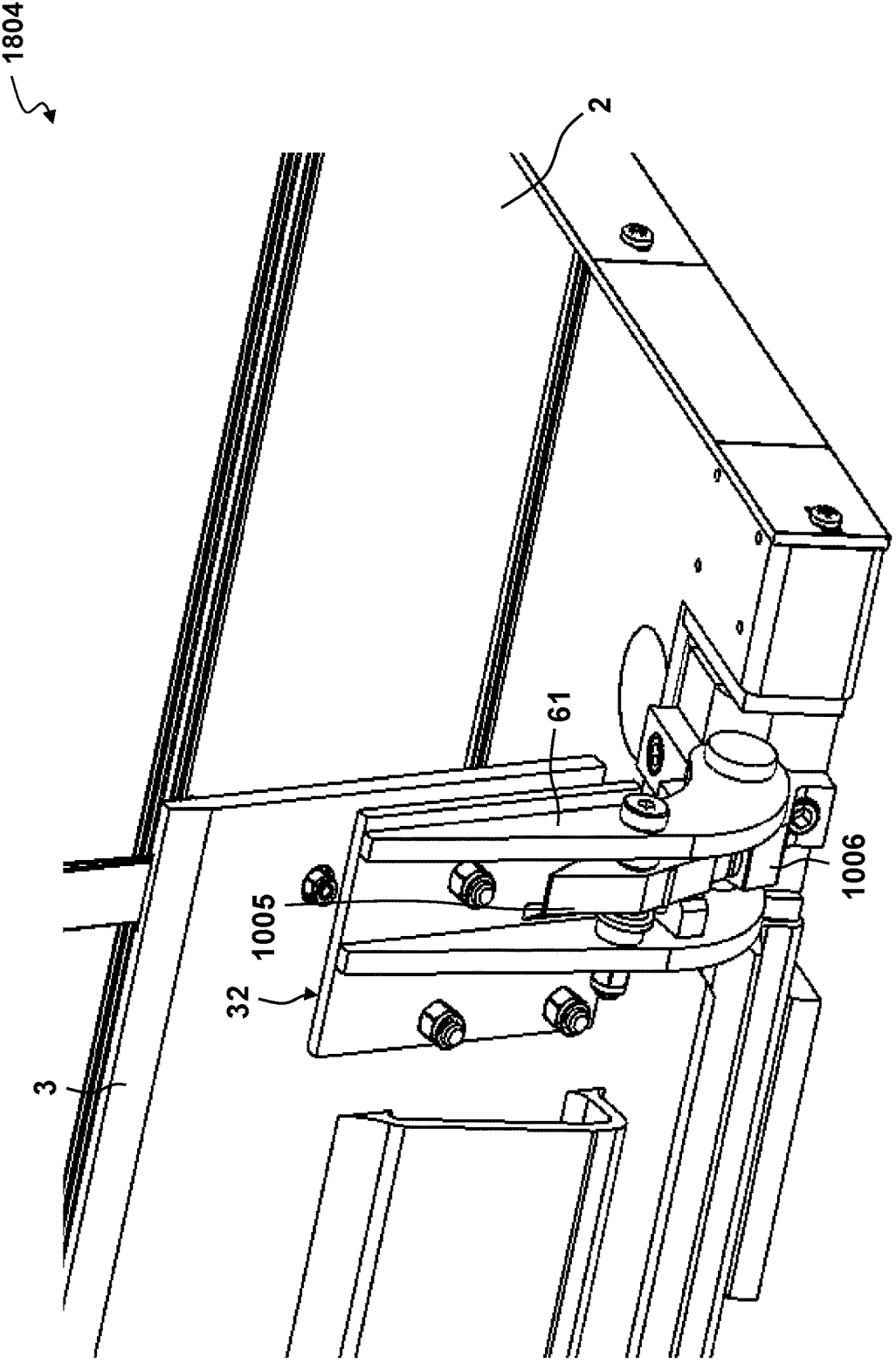
FIG. 18C illustrates a perspective close-up view of the ramp in a locked retention position relative to the flipover, in accordance with an embodiment of the invention.

FIG. 18C illustrates a perspective close-up view of the ramp 3 in a locked retention position 1804 relative to the flipover 2, in accordance with an embodiment of the invention. The locking arm 1005 engages the cam 1006 to hold the ramp 3 in place.

Figure 18D:
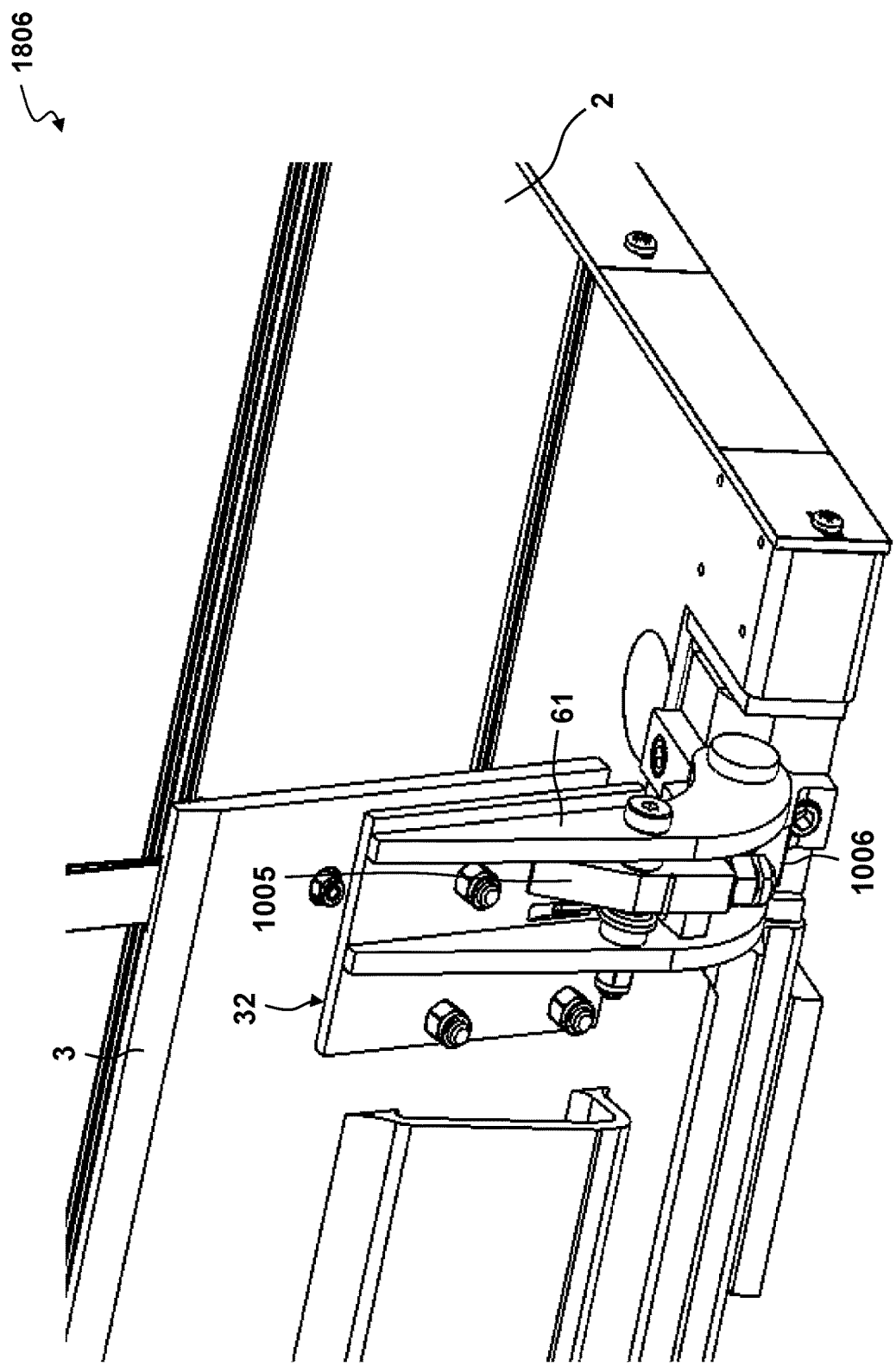
FIG. 18D illustrates a perspective close-up view of the ramp in an unlocked retention position relative to the flipover, in accordance with an embodiment of the invention.

FIG. 18D illustrates a perspective close-up view of the ramp 3 in an unlocked retention position 1806 relative to the flipover 2, in accordance with an embodiment of the invention. The locking arm 1005 is disengaged from the cam 1006 to allow the ramp 3 to be moved to the stowed position or the ramp position.

Figure 18E:
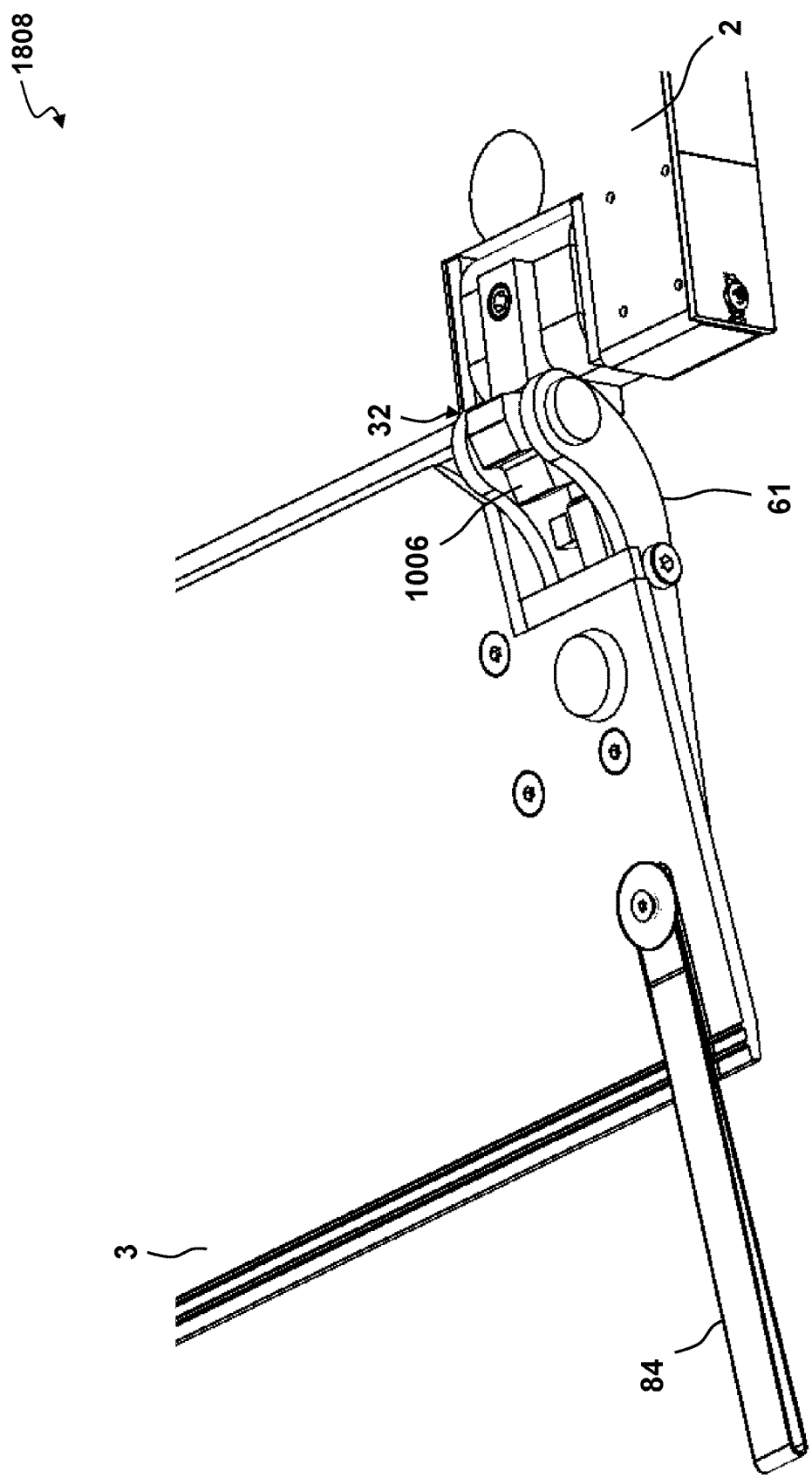
FIG. 18E illustrates a perspective close-up view of the ramp in a ramp position relative to the flipover, in accordance with an embodiment of the invention.

FIG. 18E illustrates a perspective close-up view of the ramp 3 in a ramp position 1808 relative to the flipover 2, in accordance with an embodiment of the invention. The locking arm 1005 may engage or disengage the cam 1006 to hold the ramp 3 in place.

FIGS. 19A-19E illustrate perspective, front, back, top, bottom, right side, and left side views, respectively, of a locking arm bracket 1005, in accordance with an embodiment of the invention. The proximal end 1018 of the arm 1005 includes a threaded cavity for threadably receiving the adjustment mechanism 1007B, such as an adjustable screw. The adjustment mechanism 1007B may have a threaded body and a head 1017. A portion of the body may be threadably driven (i.e., screwed) inside the cavity of the adjustable locking arm 1005. In one embodiment, a securing nut 1007C may further secure the adjustment mechanism 1007B to the adjustable locking arm 1005. The securing nut 1007C may be loosened to adjust the adjustment mechanism 1007B. For example, the securing nut 1007C may be loosened to screw the body of the adjustment mechanism 1007B further inside the cavity of the adjustable locking arm 1005 (i.e., shorten the arm 1005). The securing nut 1007C may also be loosened to unscrew the body of the adjustment mechanism 1007B out of the cavity of the adjustable locking arm 1005 (i.e., lengthen the arm 1005).

An aperture 1007P may extend axially through the adjustable locking arm 1005. The aperture 1007P may be shaped for receiving a bearing. The bearing may receive the pivot axle (pin) 1030L for assembling the arm 1005 on the hinge member 61, as shown in FIG. 18A. The adjustable locking arm 1005 may be mounted on the pivot axle 1030L by inserting the pivot axle 1030L through the bearing, as shown in FIG. 18A.

The locking arm 1005 may further include an angled portion 1022 on a top portion of the locking arm 1005. The locking arm 1005 may further include an angled portion 1024 on a bottom portion of the locking arm 1005. The angled portions 1022, 1024 are such that the locking arm 1005 does not protrude outside of the channel 1030C and/or above the hinge member 61 when the locking arm 1005 is in a locked position.

Figure 20A:
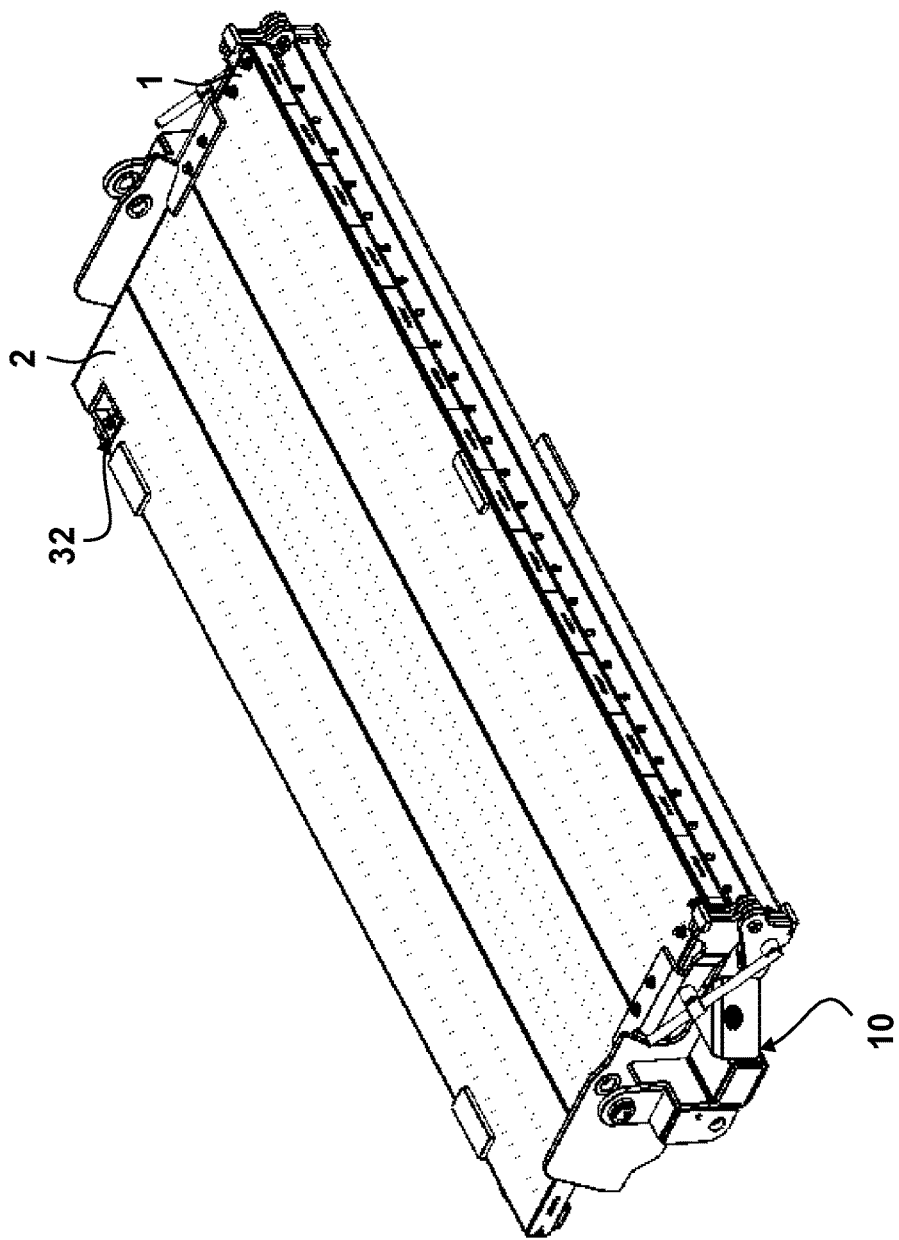
FIG. 20A illustrates a perspective view of the liftgate in a stowed position, in accordance with an embodiment of the invention.
Figure 20B:
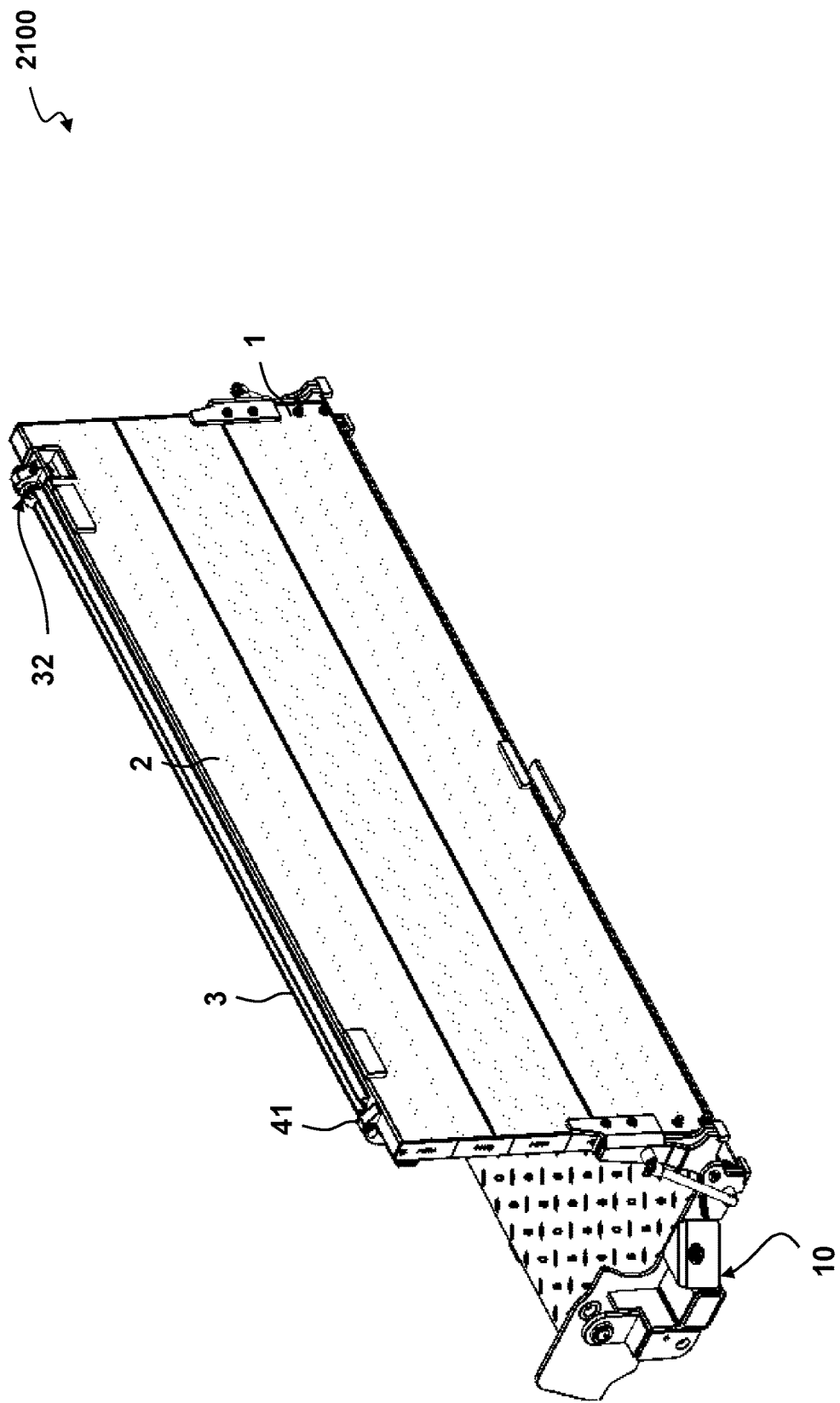
FIG. 20B illustrates a perspective view of the liftgate in a partially unstowed position, in accordance with an embodiment of the invention.
Figure 20C:
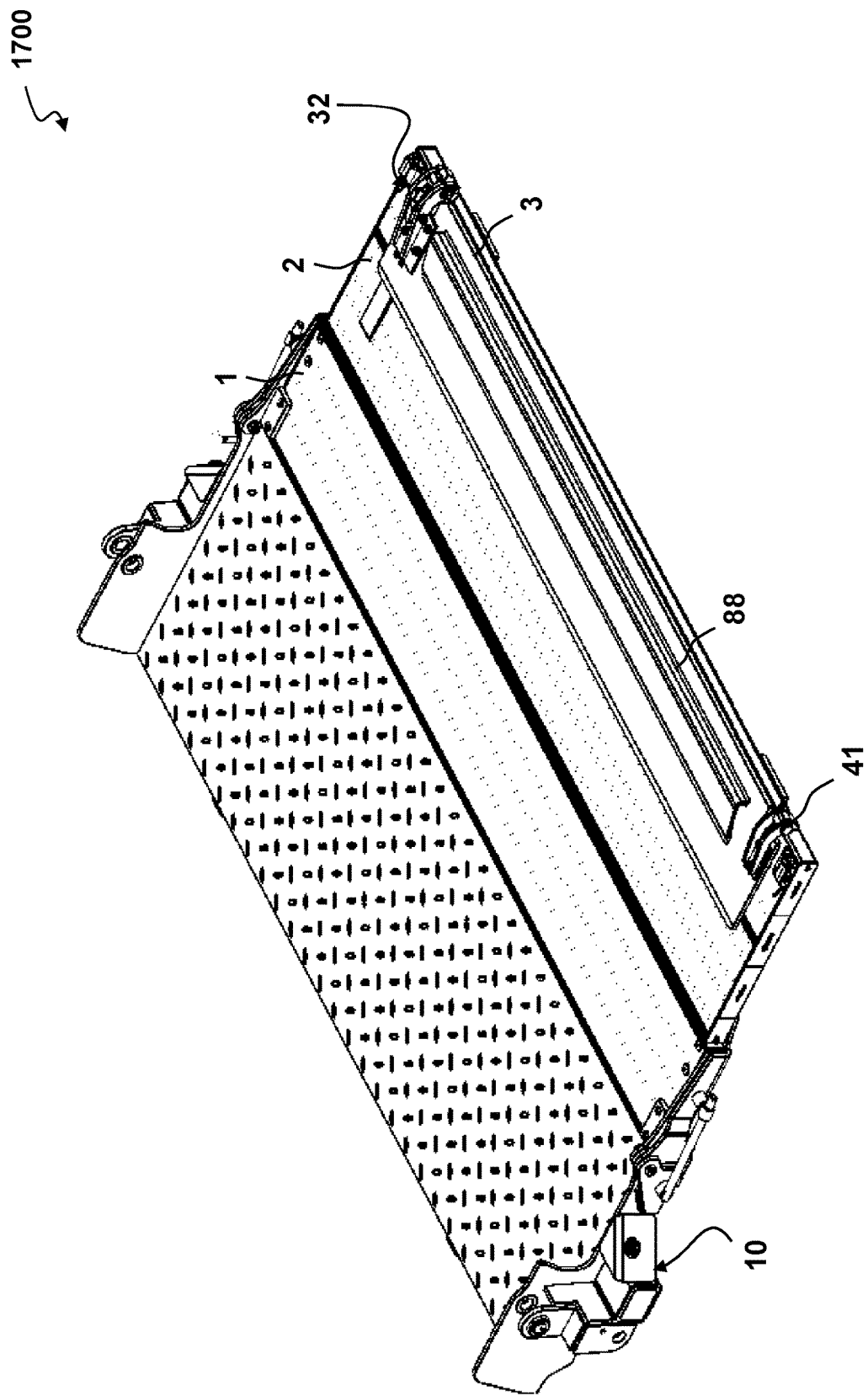
FIG. 20C illustrates a perspective view of the liftgate in an unstowed position with the ramp in a stowed position relative to the flipover, in accordance with an embodiment of the invention.
Figure 20D:
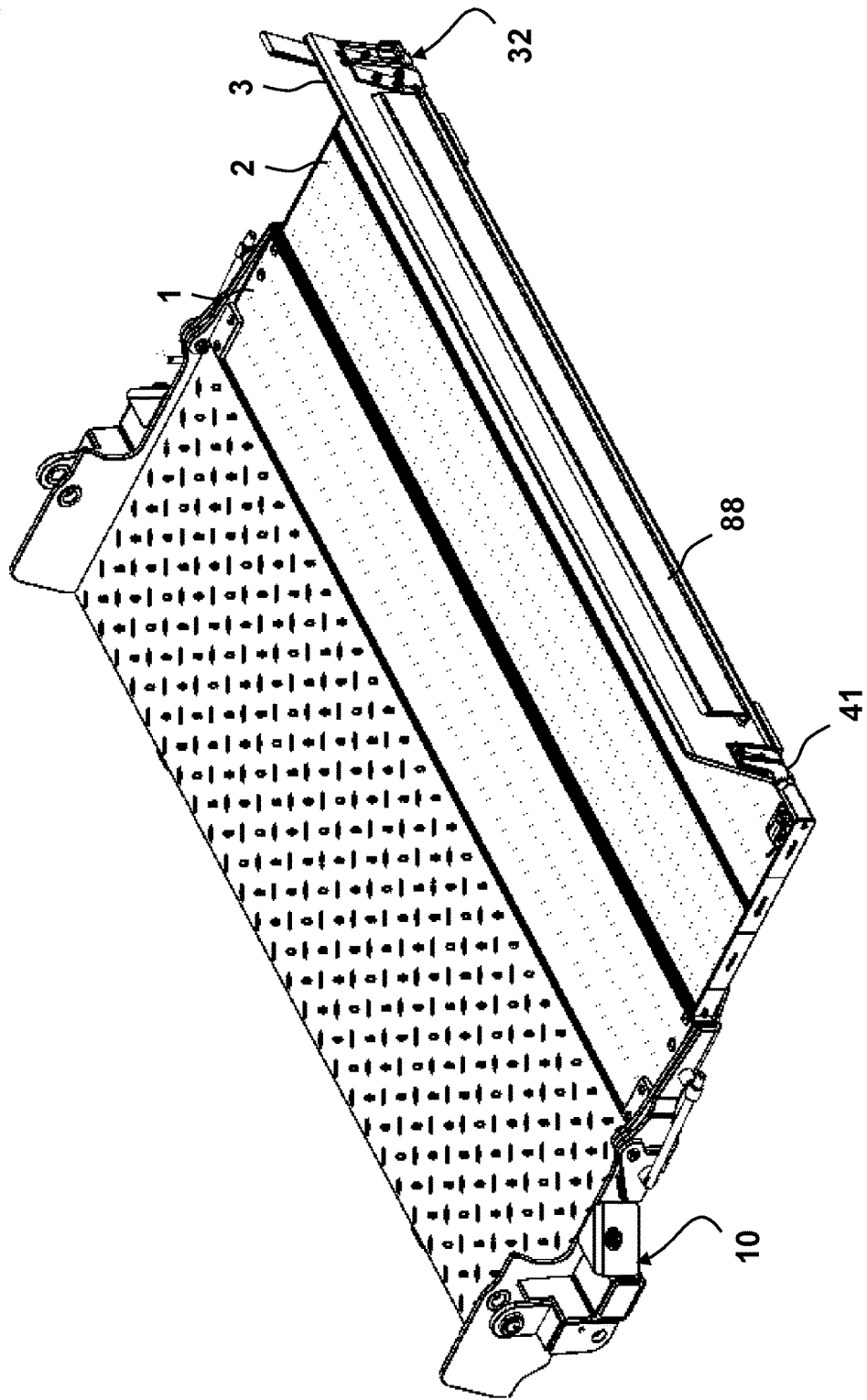
FIG. 20D illustrates a perspective view of the liftgate with the ramp in a retention position relative to the flipover, in accordance with an embodiment of the invention.
Figure 20E:
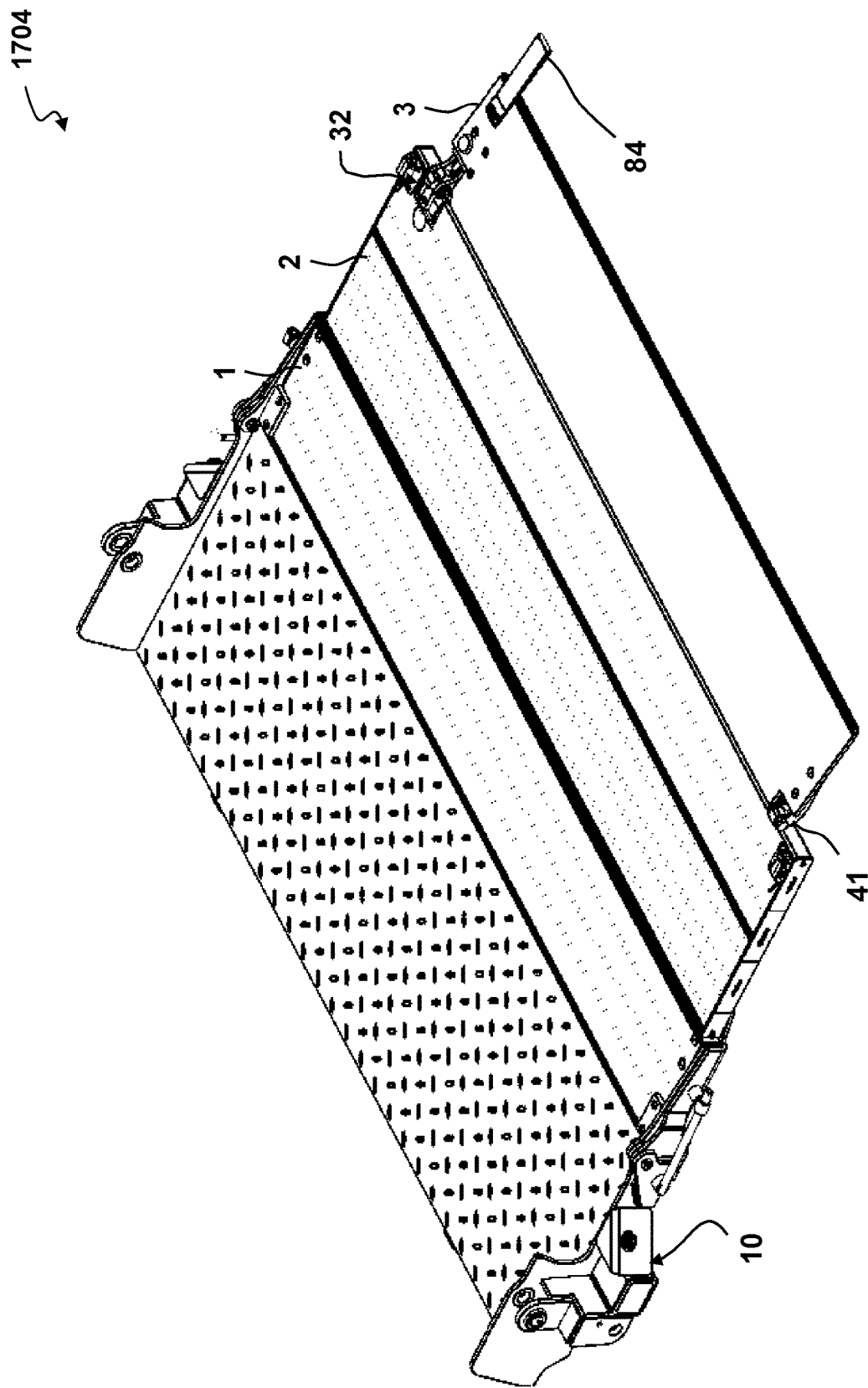
FIG. 20E illustrates a perspective view of the liftgate with the ramp in a ramp position relative to the flipover, in accordance with an embodiment of the invention.

FIG. 20A illustrates a perspective view of the liftgate 10 in a stowed position, in accordance with an embodiment of the invention. FIG. 20B illustrates a perspective view of the liftgate 10 in a partially unstowed position, in accordance with an embodiment of the invention. FIG. 20C illustrates a perspective view of the liftgate 10 in an unstowed position with the ramp 3 in a stowed position 1700 relative to the flipover 2, in accordance with an embodiment of the invention. FIG. 20D illustrates a perspective view of the liftgate 10 with the ramp 3 in a retention position 1702 relative to the flipover 2, in accordance with an embodiment of the invention. FIG. 20E illustrates a perspective view of the liftgate 10 with the ramp 3 in a ramp position 1704 relative to the flipover 2, in accordance with an embodiment of the invention.

The present invention has been described in considerable detail with reference to certain preferred versions thereof; however, other versions are possible. Therefore, the spirit and scope of the appended claims should not be limited to the description of the preferred versions contained herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A locking assembly for a ramp of a lift gate, the locking assembly comprising:
  an elongated adjustable locking arm, wherein the locking arm is pivotably disposed on a pivot point relative to the ramp, the locking arm including an adjustment mechanism for adjusting a length of the locking arm disposed on a proximal end of the locking arm for engaging a cam portion, wherein the length of the locking arm can be increased or decreased by adjusting the adjustment mechanism at the proximal end of the locking arm; and
  a resilient member for spring loading the locking arm, wherein a biasing tension in the resilient member urges the proximal end of the locking arm to pivotably engage with the cam portion to maintain the ramp in a selected position.

2. The locking assembly of claim 1, further comprising:
  at least one fastener for coupling the locking assembly to a first surface of the ramp, wherein the first surface of the ramp is disposed opposite from a second surface of the ramp, and wherein the second surface of the ramp is unobstructed in a ramp position of the selected position.

3. The locking assembly of claim 2, wherein the cam portion has multiple engagement surfaces for individually engaging with the locking arm, such that selective engagement of the locking arm with each engagement surface of the cam portion maintains the ramp in the selected position.

4. The locking assembly of claim 2, wherein the first surface of the ramp is disposed distal from a lift platform section in a stowed position of the selected position.

5. The locking assembly of claim 4, further comprising:
  a coupling member for rotatably coupling the ramp to the lift platform section of the lift gate, the coupling member including a channel in which the locking arm is pivotably disposed on a pivot axle along the length of the locking arm, such that the locking arm can pivot about the pivot axle for selectively engaging the cam portion.

6. The locking assembly of claim 5, wherein:
  the locking arm is pivotably disposed on said pivot axle along the length of the locking arm between the proximal end of the locking arm and a distal end of the locking arm; and
  upon exerting a force on the distal end of the locking arm to overcome the tension in the spring, the locking arm pivots to disengage the proximal end of the locking arm from the cam portion and allows the ramp to be rotated relative to the lift platform section.

7. The locking assembly of claim 6, wherein:
  when the proximal end of the locking arm engages with a first engagement surface of the cam portion, the ramp is maintained in the stowed position by the locking arm, such that the ramp is folded against a section of the lift platform section.

8. The locking assembly of claim 7, wherein:
  when the proximal end of the locking arm engages with a second engagement surface of the cam portion, the ramp is maintained in a retention position by the locking arm, such that the ramp is substantially transverse to the lift platform section.

9. The locking assembly of claim 8, wherein:
  when the proximal end of the locking arm engages with a third engagement surface of the cam portion, the ramp is maintained in a ramp position, such that the ramp is substantially aligned with the lift platform section.

10. The locking assembly of claim 6, wherein:
  upon exerting a force on the distal end of the locking arm to overcome the tension in the spring, the locking arm pivots to disengage the proximal end of the locking arm from the cam portion and allows the ramp to be rotated relative to the lift platform section between the stowed position, a retention position, the ramp position.

11. The locking assembly of claim 10, wherein:
  the distal end of the locking arm rotates into the channel as the proximal end of the locking arm rotates away to disengage the cam portion due to exertion of the force on the distal end of the locking arm;
  upon removing the force on the distal end of the locking arm, the resilient member pivots the locking arm to rotate the proximal end into engagement with the cam portion and maintain the ramp in the selected position relative to the lift platform section; and
  a bottom of the channel limits the rotational range of the distal end of the locking arm.

12. The locking assembly of claim 2, wherein:
  the adjustment mechanism is disposed on the proximal end of the locking arm, such that the adjustment mechanism allows selective adjustment of the length of a portion of the locking arm between the pivot point and the cam portion.

13. The locking assembly of claim 2, wherein:
  the adjustment mechanism allows adjusting the length of the locking arm to reduce a gap between the proximal end of the locking arm and an engagement surface of the cam portion.

14. The locking assembly of claim 2, wherein:
  when the proximal end of the locking arm engages with a first engagement surface of the cam portion, the ramp is maintained in a stowed position by the locking arm, such that the ramp is folded against a section of the a lift platform section; and
  the adjustment mechanism allows adjusting the length of the locking arm for engaging the cam portion to maintain the ramp fully folded against the lift platform section in a stowed position of the ramp.

15. A lift gate system, comprising:
  a lift platform section;
  a ramp, wherein the ramp is rotatably coupled to the lift platform section; and
  a locking assembly for maintaining the ramp in a selected position relative to the lift platform section, wherein the locking assembly comprises:
    an elongated adjustable locking arm, wherein the locking arm is pivotably disposed on a pivot point relative to the ramp, wherein the locking arm includes an adjustment mechanism for adjusting a length of the locking arm disposed on a proximal end of the locking arm for engaging a cam portion, wherein the length of the locking arm can be increased or decreased by adjusting the adjustment mechanism at the proximal end of the locking arm; and a resilient member for spring loading the locking arm, wherein a biasing tension in the spring urges the proximal end of the locking arm to pivotably engage with the cam portion to maintain the ramp in a selected position;

at least one fastener for coupling the locking assembly to a first surface of the ramp, wherein the first surface of the ramp is disposed opposite from a second surface of the ramp, and wherein the second surface of the ramp is unobstructed in a ramp position of the selected position.

16. The lift gate system of claim 15, wherein the cam portion has multiple engagement surfaces for individually engaging with the locking arm, such that selective engagement of the locking arm with each engagement surface of the cam portion maintains the ramp in the selected position.

17. The lift gate system of claim 15, further comprising:
a lifting mechanism for supporting and moving the lift platform section.

18. The lift gate system of claim 15, wherein:
when the proximal end of the locking arm engages with a first engagement surface of the cam portion, the ramp is maintained in a stowed position by the locking arm, such that the ramp is folded against a section of the lift platform section;

when the proximal end of the locking arm engages with a second engagement surface of the cam portion, the ramp is maintained in a retention position by the locking arm, such that the ramp is substantially transverse to the lift platform section; and when the proximal end of the locking arm engages with a third engagement surface of the cam portion, the ramp is maintained in a ramp position, such that the ramp is substantially aligned with the lift platform section.

19. A method, comprising:
maintaining a ramp of a lift gate in a selected position by engaging an elongated adjustable locking arm with a cam portion, the locking arm including an adjustment mechanism for adjusting a length of the locking arm disposed on a proximal end of the locking arm for engaging a cam portion of the ramp; and increasing or decreasing the length of the locking arm by adjusting the adjustment mechanism at the proximal end of the locking arm;

wherein the locking arm is spring loaded by a resilient member having a biasing tension that urges the proximal end of the locking arm to pivotably engage with the cam portion to maintain the ramp in a selected position;

wherein the cam portion has multiple engagement surfaces for individually engaging with the locking arm, such that selective engagement of the locking arm with each engagement surface of the cam portion maintains the ramp in the selected position; and wherein the locking assembly is coupled to a first surface of the ramp, wherein the first surface of the ramp is disposed opposite from a second surface of the ramp, and wherein the second surface of the ramp is unobstructed in a ramp position of the selected position.

\* \* \* \* \*